United States Patent
Karabinis et al.

(10) Patent No.: US 6,892,068 B2
(45) Date of Patent: May 10, 2005

(54) COORDINATED SATELLITE-TERRESTRIAL FREQUENCY REUSE

(75) Inventors: Peter D. Karabinis, Cary, NC (US); Rajendra Singh, Alexandria, VA (US); George Ronald Olexa, Gainesville, GA (US); Bahman Badipour, McLean, VA (US)

(73) Assignee: Mobile Satellite Ventures, LP, Reston, VA (US)

( * ) Notice: Subject to any disclaimer, the term of this patent is extended or adjusted under 35 U.S.C. 154(b) by 658 days.

(21) Appl. No.: 09/918,709

(22) Filed: Aug. 1, 2001

(65) Prior Publication Data

US 2002/0041575 A1 Apr. 11, 2002

Related U.S. Application Data

(60) Provisional application No. 60/222,605, filed on Aug. 2, 2000, provisional application No. 60/245,194, filed on Nov. 3, 2000, and provisional application No. 60/250,461, filed on Dec. 4, 2000.

(51) Int. Cl.$^7$ .................................................. H04Q 7/20
(52) U.S. Cl. ..................... 455/429; 455/426.1; 455/447; 455/448
(58) Field of Search ................................ 455/427, 429, 455/430, 431, 447, 448, 426.1, 12.1

(56) References Cited

U.S. PATENT DOCUMENTS

| | | |
|---|---|---|
| 3,963,990 A | 6/1976 | DiFonzo |
| 4,119,964 A | 10/1978 | Fletcher et al. |
| 4,144,496 A | 3/1979 | Cunningham et al. |
| 4,168,496 A | 9/1979 | Lichtblau |
| 4,292,685 A | 9/1981 | Lee |
| 4,396,948 A | 8/1983 | Fernsler et al. |
| 4,425,639 A | 1/1984 | Acampora et al. |
| 4,506,383 A | 3/1985 | McGann |
| 4,672,655 A | 6/1987 | Koch |
| 4,819,227 A | 4/1989 | Rosen |

(Continued)

FOREIGN PATENT DOCUMENTS

| | | |
|---|---|---|
| AU | 616363 | 10/1991 |
| CA | 2120908 | 3/1994 |
| CA | 2157182 | 7/1995 |

(Continued)

OTHER PUBLICATIONS

Araki, Noriyuki; Minamisono, Kenichi; Oodo, Masayuki; Miura, Ryu. "Frequency Sharing of FSS and HAPS in the Reverse Band Working." *AIAA International Communications Satelltie Systems Conference and Exhibit*, Apr. 10–14, 2000. *Collection of Technical Papers* vol. 2. American Institute of Aeronautics and Astronautics, pp. 1074–1081. (Abstract).

Chang, John W. "Visibility Considerations in Frequency Sharing with Low Earth Orbit Satellites." *Engineering Institute of Canada, Canadian Conference on Electrical and Computer Engineering*. Vols. 1 and 24. (Abstract).

Krishnamarchari, Bhaskar. "Channel Allocation." www.ee.cornell.edu/~bhaskar/msthesis/node19.htm. May 11, 1999.

(Continued)

*Primary Examiner*—Lee Nguyen
(74) *Attorney, Agent, or Firm*—Myers Bigel Sibley & Sajovec

(57) ABSTRACT

A system and method of operation for efficiently reusing and/or sharing at least a portion of the frequency spectrum between a first satellite spot beam and a second satellite spot beam, and/or an underlay terrestrial network associated with a second satellite spot beam. The spectrum is efficiently reused and/or shared between respective spot beams and/or associated underlay terrestrial systems in a manner minimizes interference between the respective satellite and terrestrial systems.

149 Claims, 26 Drawing Sheets

U.S. PATENT DOCUMENTS

| | | |
|---|---|---|
| 4,823,341 A | 4/1989 | Rosen |
| 4,870,408 A | 9/1989 | Zdunek et al. |
| 4,879,711 A | 11/1989 | Rosen |
| 4,901,307 A | 2/1990 | Gilhousen et al. |
| 4,956,875 A | 9/1990 | Bernard et al. |
| 4,979,170 A | 12/1990 | Gilhousen et al. |
| 4,985,706 A | 1/1991 | Schukat |
| 5,010,317 A | 4/1991 | Schwendeman et al. |
| 5,044,006 A | 8/1991 | Cyrulnik |
| 5,073,900 A | 12/1991 | Mallinckrodt |
| 5,073,971 A | 12/1991 | Schaeffer |
| 5,081,703 A | 1/1992 | Lee |
| 5,093,925 A | 3/1992 | Chanroo |
| 5,111,534 A | 5/1992 | Benner |
| 5,142,691 A | 8/1992 | Freeburg et al. |
| 5,193,101 A | 3/1993 | McDonald et al. |
| 5,193,102 A | 3/1993 | Meidan et al. |
| 5,208,829 A | 5/1993 | Soleimani et al. |
| 5,216,427 A | 6/1993 | Yan et al. |
| 5,247,699 A | 9/1993 | Hartman |
| 5,257,398 A | 10/1993 | Schaeffer |
| 5,268,694 A | 12/1993 | Jan et al. |
| 5,276,908 A | 1/1994 | Koohgoli et al. |
| 5,301,188 A | 4/1994 | Kotzin et al. |
| 5,303,286 A | 4/1994 | Wiedeman |
| 5,303,287 A | 4/1994 | Laborde |
| 5,317,593 A | 5/1994 | Fulghum et al. |
| 5,327,572 A | 7/1994 | Freeburg |
| 5,339,330 A | 8/1994 | Mallinckrodt |
| 5,355,520 A | 10/1994 | Freeburg et al. |
| 5,367,304 A | 11/1994 | Jan et al. |
| 5,394,561 A | 2/1995 | Freeburg |
| 5,408,496 A | 4/1995 | Ritz et al. |
| 5,410,728 A | 4/1995 | Bertiger et al. |
| 5,423,084 A | 6/1995 | Vatt |
| 5,428,818 A | 6/1995 | Meidan et al. |
| 5,444,449 A | 8/1995 | Poskett et al. |
| 5,446,756 A | 8/1995 | Mallinckrodt |
| 5,452,471 A | 9/1995 | Leopold et al. |
| 5,455,961 A | 10/1995 | Nakagawa |
| 5,469,468 A | 11/1995 | Schilling |
| 5,473,601 A | 12/1995 | Rosen et al. |
| 5,475,734 A | 12/1995 | McDonald et al. |
| 5,483,666 A | 1/1996 | Yamada et al. |
| 5,490,284 A | 2/1996 | Itoh et al. |
| 5,511,233 A | 4/1996 | Otten |
| 5,524,280 A | 6/1996 | Douthitt et al. |
| 5,526,404 A | 6/1996 | Wiedeman et al. |
| 5,535,430 A | 7/1996 | Aoki et al. |
| 5,535,432 A | 7/1996 | Dent |
| 5,535,438 A | 7/1996 | Sevic |
| 5,548,800 A | 8/1996 | Olds et al. |
| 5,552,920 A | 9/1996 | Glynn |
| 5,559,866 A | 9/1996 | O'Neill |
| 5,564,076 A | 10/1996 | Auvray |
| 5,574,969 A | 11/1996 | Olds et al. |
| 5,584,046 A | 12/1996 | Martinez et al. |
| 5,586,165 A | 12/1996 | Wiedeman |
| 5,594,718 A | 1/1997 | Weaver, Jr. et al. |
| 5,594,720 A | 1/1997 | Papadopoulos et al. |
| 5,612,703 A | 3/1997 | Mallinckrodt |
| 5,619,503 A | 4/1997 | Dent |
| 5,619,525 A | 4/1997 | Wiedeman et al. |
| 5,625,624 A | 4/1997 | Rosen et al. |
| 5,625,672 A | 4/1997 | Yamada |
| 5,625,878 A | 4/1997 | Löppönen et al. |
| 5,630,757 A | 5/1997 | Gagin et al. |
| 5,641,134 A | 6/1997 | Vatt |
| 5,649,292 A | 7/1997 | Doner |
| 5,666,648 A | 9/1997 | Stuart |
| 5,669,062 A | 9/1997 | Olds et al. |
| 5,675,629 A | 10/1997 | Raffel et al. |
| 5,694,416 A | 12/1997 | Johnson |
| 5,701,584 A | 12/1997 | Dupuy |
| 5,703,874 A | 12/1997 | Schilling |
| 5,710,973 A | 1/1998 | Yamada |
| 5,721,500 A | 2/1998 | Karanicolas |
| 5,729,538 A | 3/1998 | Dent |
| 5,732,359 A | 3/1998 | Baranowsky, II et al. |
| 5,739,874 A | 4/1998 | Badger et al. |
| 5,745,084 A | 4/1998 | Lusignan |
| 5,752,164 A | 5/1998 | Jones |
| 5,757,767 A | 5/1998 | Zehavi |
| 5,757,789 A | 5/1998 | Dent |
| 5,758,090 A | 5/1998 | Doner |
| 5,758,261 A | 5/1998 | Wiedman |
| 5,761,605 A | 6/1998 | Tawil et al. |
| 5,765,098 A | 6/1998 | Bella |
| 5,774,787 A | 6/1998 | Leopold et al. |
| 5,774,805 A | 6/1998 | Zicker |
| 5,790,070 A | 8/1998 | Natarajan et al. |
| 5,794,138 A | 8/1998 | Briskman |
| 5,802,474 A | 9/1998 | Faruque |
| 5,812,539 A | 9/1998 | Dent |
| 5,812,947 A | 9/1998 | Dent |
| 5,812,968 A | 9/1998 | Hassan et al. |
| 5,815,809 A | 9/1998 | Ward et al. |
| 5,822,680 A | 10/1998 | Stuart et al. |
| 5,825,325 A | 10/1998 | O'Donovan et al. |
| 5,826,190 A | 10/1998 | Krutz et al. |
| 5,828,963 A | 10/1998 | Grandhi et al. |
| 5,832,379 A | 11/1998 | Mallinckrodt |
| 5,832,380 A | 11/1998 | Ray et al. |
| 5,835,857 A | 11/1998 | Otten |
| 5,838,669 A | 11/1998 | Gerakoulis |
| 5,841,766 A | 11/1998 | Dent et al. |
| 5,844,894 A | 12/1998 | Dent |
| 5,848,060 A | 12/1998 | Dent |
| 5,848,359 A | 12/1998 | Furtaw |
| 5,852,721 A | 12/1998 | Dillon et al. |
| 5,854,985 A | 12/1998 | Sainton et al. |
| 5,859,838 A | 1/1999 | Soliman |
| 5,859,841 A | 1/1999 | Gitlits |
| 5,864,316 A | 1/1999 | Bradley et al. |
| 5,864,579 A | 1/1999 | Briskman |
| 5,867,765 A | 2/1999 | Nilsson |
| 5,867,789 A | 2/1999 | Olds et al. |
| 5,878,346 A | 3/1999 | Ray et al. |
| 5,884,181 A | 3/1999 | Arnold et al. |
| 5,887,261 A | 3/1999 | Csapo et al. |
| 5,894,590 A | 4/1999 | Vatt et al. |
| 5,901,357 A | 5/1999 | D'Avello et al. |
| 5,907,541 A | 5/1999 | Fairholm et al. |
| 5,907,809 A | 5/1999 | Molnar et al. |
| 5,911,120 A | 6/1999 | Jarett et al. |
| 5,912,641 A | 6/1999 | Dietrich |
| 5,915,207 A | 6/1999 | Dao et al. |
| 5,920,804 A | 7/1999 | Armbruster et al. |
| 5,920,819 A | 7/1999 | Asanuma |
| 5,924,037 A | 7/1999 | Mao |
| 5,926,745 A | 7/1999 | Threadgill et al. |
| 5,926,758 A | 7/1999 | Grybos et al. |
| 5,926,762 A | 7/1999 | Arpee et al. |
| 5,929,804 A | 7/1999 | Jones et al. |
| 5,936,570 A | 8/1999 | Ghazvinian et al. |
| 5,937,332 A | 8/1999 | Karabinis |
| 5,937,352 A | 8/1999 | Courtney et al. |
| 5,940,033 A | 8/1999 | Locher et al. |
| 5,940,753 A | 8/1999 | Mallinckrodt |
| 5,940,765 A | 8/1999 | Haartsen |
| 5,949,766 A | 9/1999 | Ibanez-Meier et al. |

| | | | | | |
|---|---|---|---|---|---|
| 5,956,619 A | 9/1999 | Gallagher et al. | DE | 4424412 | 1/1996 |
| 5,959,984 A | 9/1999 | Dent | DE | 19648178 | 6/1998 |
| 5,960,351 A | 9/1999 | Przelomiec | DE | 19751869 | 7/1998 |
| 5,960,352 A | 9/1999 | Cherpantier | DE | 19819422 | 11/1998 |
| 5,960,364 A | 9/1999 | Dent | DE | 19735527 | 3/1999 |
| 5,963,561 A | 10/1999 | Lu | DE | 69129938 | 3/1999 |
| 5,963,862 A | 10/1999 | Adiwoso et al. | DE | 29900867 | 9/1999 |
| 5,970,410 A | 10/1999 | Carney et al. | DE | 69230393 | 7/2000 |
| 5,974,323 A | 10/1999 | Doner | EP | 1411991 | 10/1975 |
| 5,974,324 A | 10/1999 | Henson | EP | 00104577 | 9/1983 |
| 5,995,832 A | 11/1999 | Mallinckrodt | EP | 0304890 | 3/1989 |
| 5,995,840 A | 11/1999 | Dorenbosch et al. | EP | 484662 | 5/1992 |
| 5,995,841 A | 11/1999 | King et al. | EP | 277205 | 8/1992 |
| 5,999,818 A | 12/1999 | Gilbert et al. | EP | 0569693 | 3/1993 |
| 6,002,935 A | 12/1999 | Wang | EP | 0578075 | 6/1993 |
| 6,008,760 A | 12/1999 | Shattil | EP | 0616437 | 2/1994 |
| 6,009,332 A | 12/1999 | Haartsen | EP | 597225 | 5/1994 |
| 6,011,951 A | 1/2000 | King et al. | EP | 311919 | 6/1994 |
| 6,018,658 A | 1/2000 | Blachier | EP | 0637895 | 7/1994 |
| 6,018,663 A | 1/2000 | Karlsson et al. | EP | 0662758 | 1/1995 |
| 6,019,318 A | 2/2000 | Cellier et al. | EP | 0687117 | 5/1995 |
| 6,021,309 A | 2/2000 | Sherman et al. | EP | 483545 | 6/1995 |
| 6,023,463 A | 2/2000 | Wiedeman et al. | EP | 707389 | 4/1996 |
| 6,032,041 A | 2/2000 | Wainfan et al. | EP | 712215 | 5/1996 |
| 6,035,178 A | 3/2000 | Chennakeshu et al. | EP | 732814 | 9/1996 |
| 6,038,455 A | 3/2000 | Gardner et al. | EP | 0506255 | 11/1996 |
| 6,049,548 A | 4/2000 | Bruno et al. | EP | 0750406 | 12/1996 |
| 6,052,558 A | 4/2000 | Cook et al. | EP | 0752766 | 1/1997 |
| 6,052,560 A | 4/2000 | Karabinis | EP | 0762669 | 3/1997 |
| 6,052,586 A | 4/2000 | Karabinis | EP | 0767547 | 4/1997 |
| 6,061,562 A | 5/2000 | Martin et al. | EP | 782360 | 7/1997 |
| 6,067,453 A | 5/2000 | Adiwoso et al. | EP | 0831599 | 3/1998 |
| 6,075,777 A | 6/2000 | Agrawal et al. | EP | 937340 | 5/1998 |
| 6,078,814 A | 6/2000 | Jeffries et al. | EP | 0858177 | 8/1998 |
| 6,084,865 A | 7/2000 | Dent | EP | 0866569 | 9/1998 |
| 6,085,093 A | 7/2000 | Vasudevan et al. | EP | 0869625 | 10/1998 |
| 6,088,341 A | 7/2000 | Hinedi et al. | EP | 0869628 | 10/1998 |
| 6,088,416 A | 7/2000 | Perahia et al. | EP | 0872966 | 10/1998 |
| 6,088,572 A | 7/2000 | Vatt et al. | EP | 0876005 | 11/1998 |
| 6,088,592 A | 7/2000 | Doner et al. | EP | 0883252 | 12/1998 |
| 6,091,936 A | 7/2000 | Chennakeshu et al. | EP | 0910178 | 4/1999 |
| 6,091,955 A | 7/2000 | Aalto et al. | EP | 471656 | 5/1999 |
| 6,094,178 A | 7/2000 | Sanford | EP | 0915575 | 5/1999 |
| 6,097,708 A | 8/2000 | Mao | EP | 926912 | 6/1999 |
| 6,101,385 A | 8/2000 | Monte et al. | EP | 650270 | 12/1999 |
| 6,112,083 A | 8/2000 | Sweet et al. | EP | 0967740 | 12/1999 |
| 6,112,085 A | 8/2000 | Garner et al. | EP | 0971488 | 1/2000 |
| 6,119,011 A | 9/2000 | Borst et al. | EP | 0977376 | 2/2000 |
| 6,122,291 A | 9/2000 | Robinson et al. | EP | 0987913 | 3/2000 |
| 6,122,499 A | 9/2000 | Magnusson | EP | 994632 | 4/2000 |
| 6,125,260 A | 9/2000 | Wiedeman et al. | EP | 0998060 | 5/2000 |
| 6,126,116 A | 10/2000 | Cellier | EP | 0999662 | 5/2000 |
| 6,128,497 A | 10/2000 | Faruque | EP | 1006678 | 6/2000 |
| 6,134,437 A | 10/2000 | Karabinis et al. | EP | 1006679 | 6/2000 |
| 6,134,442 A | 10/2000 | Borst et al. | EP | 1011210 | 6/2000 |
| 6,138,010 A | 10/2000 | Rabe et al. | EP | 650271 | 8/2000 |
| 6,141,566 A | 10/2000 | Gerdisch et al. | EP | 0701337 | 8/2000 |
| 6,154,654 A | 11/2000 | Mao | EP | 1030467 | 8/2000 |
| 6,154,655 A | 11/2000 | Borst et al. | EP | 1032141 | 8/2000 |
| 6,157,621 A | 12/2000 | Brown et al. | EP | 1035664 | 9/2000 |
| 6,157,811 A | 12/2000 | Dent | EP | 1037399 | 9/2000 |
| 6,157,834 A | 12/2000 | Helm et al. | EP | 1037400 | 9/2000 |
| 6,223,041 B1 | 4/2001 | Egner et al. | EP | 1037402 | 9/2000 |
| 6,735,437 B2 * | 5/2004 | Mayfield et al. ............ 455/427 | EP | 1037403 | 9/2000 |
| | | | EP | 1047216 | 10/2000 |
| | FOREIGN PATENT DOCUMENTS | | EP | 1052787 | 11/2000 |
| CA | 2043127 | 5/1996 | EP | 1059826 | 12/2000 |
| CA | 2178897 | 2/1997 | FR | 2627035 | 8/1989 |
| CA | 2226883 | 8/1998 | FR | 2687873 | 3/1994 |
| CA | 2199598 | 9/1998 | GB | 1411991 | 10/1975 |
| CA | 2106568 | 7/2001 | GB | 2304495 | 3/1997 |

| | | |
|---|---|---|
| GB | 2341515 | 3/2000 |
| JP | 49-71810 | 7/1974 |
| JP | 50-122110 | 9/1975 |
| JP | 54-47512 | 4/1979 |
| JP | 60-85634 | 5/1985 |
| JP | 60-212040 | 10/1985 |
| JP | 64-500478 | 2/1989 |
| JP | 1-500710 | 3/1989 |
| JP | 1-128632 | 5/1989 |
| JP | 1-170199 | 7/1989 |
| JP | 2-1629 | 1/1990 |
| JP | 2-500317 | 2/1990 |
| JP | 4-207529 | 7/1992 |
| JP | 4-347947 | 12/1992 |
| JP | 5-37449 | 2/1993 |
| JP | 5-122092 | 5/1993 |
| JP | 5-503624 | 6/1993 |
| JP | 5-505082 | 7/1993 |
| JP | 5-505292 | 8/1993 |
| JP | 6-6856 | 1/1994 |
| JP | 6-120870 | 4/1994 |
| JP | 6-169275 | 6/1994 |
| JP | 6-177815 | 6/1994 |
| JP | 6-177823 | 6/1994 |
| JP | 6-237209 | 8/1994 |
| JP | 6-276141 | 9/1994 |
| JP | 6-311089 | 11/1994 |
| JP | 6-326650 | 11/1994 |
| JP | 7-22990 | 1/1995 |
| JP | 7-115408 | 5/1995 |
| JP | 7-505512 | 6/1995 |
| JP | 07-222237 | 8/1995 |
| JP | 07-231287 | 8/1995 |
| JP | 8-65739 | 3/1996 |
| JP | 8-214360 | 8/1996 |
| JP | 8-214362 | 8/1996 |
| JP | 8-214364 | 8/1996 |
| JP | 8-289360 | 11/1996 |
| JP | 8-510609 | 11/1996 |
| JP | 9-506228 | 6/1997 |
| JP | 9-205678 | 8/1997 |
| JP | 10-93326 | 4/1998 |
| JP | 10-94042 | 4/1998 |
| JP | 10-98447 | 4/1998 |
| JP | 10-506517 | 6/1998 |
| JP | 10-209939 | 8/1998 |
| JP | 10-210463 | 8/1998 |
| JP | 10-508732 | 8/1998 |
| JP | 10-233792 | 9/1998 |
| JP | 10-509851 | 9/1998 |
| JP | 10-308972 | 11/1998 |
| JP | 10-322756 | 12/1998 |
| JP | 10-322759 | 12/1998 |
| JP | 10-341479 | 12/1998 |
| JP | 11-103271 | 4/1999 |
| JP | 11-225369 | 8/1999 |
| JP | 11-509065 | 8/1999 |
| JP | 11-313365 | 11/1999 |
| JP | 11-331929 | 11/1999 |
| JP | 11-331930 | 11/1999 |
| JP | 11-355839 | 12/1999 |
| JP | 2000-36783 | 2/2000 |
| JP | 2000-49753 | 2/2000 |
| JP | 2000-68921 | 3/2000 |
| JP | 2000-78651 | 3/2000 |
| JP | 2000-196564 | 7/2000 |
| JP | 2000-295160 | 10/2000 |
| MX | 153346 | 9/1986 |
| MX | 9102297 | 11/1992 |
| MX | 175230 | 7/1994 |
| MX | 176552 | 11/1994 |
| MX | 9302661 | 11/1994 |
| MX | 177607 | 4/1995 |
| MX | 9306817 | 4/1996 |
| MX | 9404184 | 8/1996 |
| MX | 9708291 | 6/1998 |
| MX | 192777 | 7/1999 |
| MX | 9401381 | 7/1999 |
| MX | 9905993 | 12/1999 |
| WO | 90/13186 | 11/1990 |
| WO | 91/13502 | 9/1991 |
| WO | 91/13521 | 9/1991 |
| WO | 94/18804 | 8/1994 |
| WO | 95/16332 | 6/1995 |
| WO | 95/19078 | 7/1995 |
| WO | 95/27381 | 10/1995 |
| WO | 96/08878 | 3/1996 |
| WO | 96/12377 | 4/1996 |
| WO | 96/13952 | 5/1996 |
| WO | 96/14692 | 5/1996 |
| WO | 96/16488 | 5/1996 |
| WO | 96/19049 | 6/1996 |
| WO | 96/21332 | 7/1996 |
| WO | 96/34503 | 10/1996 |
| WO | 96/37082 | 11/1996 |
| WO | 97/07601 | 2/1997 |
| WO | 97/12489 | 4/1997 |
| WO | 97/14260 | 4/1997 |
| WO | 97/24884 | 7/1997 |
| WO | 97/26767 | 7/1997 |
| WO | 97/28618 | 8/1997 |
| WO | 97/32360 | 9/1997 |
| WO | 97/32440 | 9/1997 |
| WO | 97/32442 | 9/1997 |
| WO | 98/11748 | 3/1998 |
| WO | 98/14026 | 4/1998 |
| WO | 98/20618 | 5/1998 |
| WO | 98/20619 | 5/1998 |
| WO | 98/20629 | 5/1998 |
| WO | 98/28947 | 7/1998 |
| WO | 98/44644 | 10/1998 |
| WO | 98/44656 | 10/1998 |
| WO | 98/52364 | 11/1998 |
| WO | 99/00916 | 1/1999 |
| WO | 99/04589 | 1/1999 |
| WO | 99/10994 | 3/1999 |
| WO | 99/22543 | 5/1999 |
| WO | 99/23718 | 5/1999 |
| WO | 99/31815 | 6/1999 |
| WO | 99/31832 | 6/1999 |
| WO | 99/34636 | 7/1999 |
| WO | 99/48308 | 9/1999 |
| WO | 99/52230 | 10/1999 |
| WO | 00/04659 | 1/2000 |
| WO | 00/21217 | 4/2000 |
| WO | 00/47010 | 8/2000 |
| WO | 00/51367 | 8/2000 |

OTHER PUBLICATIONS

Mele, Jim. "Trucking a Winner in ARDIS Acquistion." Intertec Publishing Corporation. Jan. 15, 1998, www.fleetowner.com/edit/news/980102.htm.

Ayyagari, Deepak and Anthony Ephremides. "A Satellite–Augmented Cellular Network Concept." *Wireless Networks 4* (1998):189–198.

Sempere, Javier Gozalves. "Overview of the GSM System." 1997. www.comms.eee.strath.ac.uk/~gozalvez/gsm/gsm.

Rickerson, Don and Mark Rhoads. "Symphony or Calliope–Frequency Management with Mobile Satellite Services." *IEEE* (1996): 943–947.

Vermeer, M. "Some Simulated Noise Inversion Studies of Satellite Geopotential Missions Involving "Criterion Functions" in the Frequency Domain." *Journal of Geology*, vol. 70, No. 7, Apr. 1996. Germany: Springer–Verlag, pp. 397–409. (Abstract).

James, M. C. "Interference Considerations in Frequency Sharing Between Low Earth Orbit Satellites and the Geostationary Fixed Satellite and Terrestrial Service," *International Journal of Satellite Communications*, vol. 13, No. 3. May–Jun. 1995. United Kingdom: IEE, pp. 171–176. (Abstract).

Cosmas, J. B. Evans. C. Evci, W. Herzig, H. Persson, J. Pettifor, P. Polese, R. Rheinschmitt and A. Samukic. "Overview of the Mobile Communications Programme of RACE II," *Electronics & Communication Engineering Journal*, No. 4, Aug. 1995, pp. 155–167.

Re, Enrico Del and Piero Iannucci. "The GSM Procedures in an Integrated Cellular/Satellite System," *IEEE Journal on Selected Areas in Communications*, vol. 13, pNo.2, Feb. 1995, pp. 421–430.

Yu–Dong Yao. "Interference Analysis of Mobile Satellite Systems with Frequency Reuse." *VTC 1994. 'Creating Tomorrow's Mobile Systems.' vol. 3. IEEE $44^{th}$ Vehicular Technology Conference*. New York: IEEE pp. 1621–1624. (Abstract).

Hu, Lo–Rong and Stephen S. Rappaport. "Personal Communications Systems Using Multiple Hiearchical Cellular Overlays," *Third International Conference on Universal Personal Communications*, Sep. 27–Oct. 1, 1994, pp. 397–401.

Priscoli, Francesco Delli. "Architecture of an Integrated GSM–Satellite Systems," *European Transactions on Telecommunications and Related Technologies*, vol., No. 5, Sep.–Oct. 1994, pp. 91/625–99/633.

Charbonnier, A., J. Hubert, J. Attal, M. Cohen and C. Evci. "Perspectives for Mobile Communication," *Commutation & Transmission Special Issue*, 1993, pp. 109–121.

Priscoli, Francesco Delli. "Network Aspects Relevant to the Integration Between the GSM Network and a Satellite System," *ICUPC*, 1993, pp. 339–343.

Baranowsky II, Patrick W. "MSAT and Cellular Hybrid Networking," *Proceedings of the Third International Mobile Satellite Conference*, Jun. 16–18, 1993, pp. 149–154.

Hendrix, C. E.; Kulon, G.; Anderson, C.S.; Heinze, M. A. "Multigigabit Transmission Through Rain in a Dual Polarization Frequency Reuse System: An Experimental Study." *IEEE Transactions on Communications*, vol. 41, No. 12. Dec. 1993. pp. 1830–1807. (Abstract).

Cohen, M.; Michel, C.; Rouffet, D.; Tanguy, Y. "Frequency Sharing Between LEO Systems." *Fourth IEE Conference on Telecommunications*, Conference Publication No. 371, 1993, London: IEE, pp. 312–317. (Abstract).

Kondo, H.; Nakajima, S.; Komagata, H. "Frequency Shared Access Control for Multi–Beam Mobile Satellite Communications Systems." *SUPERCOMM/ICC '92. Discovering a New World of Communications*. vol. 2, 1992, New York: IEEE, pp. 755–759. (Abstract).

Baker, A. N. "Frequency Reuse in Land Mobile–Satellite Systems." *IEE Colloquium on 'Land Mobile Satellite Systems,'* Digest No. 154, 1992, London: IEE, pp. 5/1–5. (Abstract).

Sato, S.; Iso, A.; Orikasa, T.; Sugimoto, T. "Frequency Reuse and Mesh Reflector Mass of Multi–Beam Antenna Having Different Elliptical Beams on Transmitting and Receiving for Mobile Communication Satellites." *Transactions of the Institute of Electronics, Information and Communication Engineers B–II*, vol. J75BII, No. 2, Feb. 1992, pp. 150–152. (Abstract).

Bernhardt, Richard C. "Call Performance of a TDMA Portable Radio System with Frequency Reuse." *GLOBECOM '91. IEEE Global Telecommunications Conference*, Phoenix, Arizona, Dec. 2–5, 1991. Conference Record vol. 2, New York: Institute of Electrical and Electronics Engineers, Inc. pp. 987–991. (Abstract).

Bernhardt, Richard C. "Call Performance in a Frequency Reuse Digital Portable Radio System." *IEEE Transactions Vehicular Technology*, vol. 40, No. 4, Nov. 1991, pp. 777–785. (Abstract).

Rappaport, T. S.; Milstein. L. B. "Effects of Path Loss and Fringe User Distribution on CDMA Cellular Frequency Reuse Efficiency." *GLOBECOM '90: IEEE Global Telecommunications Conference and Exhibition. 'Communications; Connecting the Future'.* vol. 3, 1990, New York: IEEE, pp. 500–506 vol. 1. (Abstract).

Boutin, L.; Lecours, M.; Pelletier, M.; Delisle, G. Y. "Effects of Fade Distribution on a Mobile Satellite Down–Link and Up–Link Performance in a Frequency Reuse Cellular Configuration." *International Journal of Satellite Communications*, vol. 9, No. 3, May–Jun. 1991, pp. 167–170. (Abstract).

Bernhardt, Richard C. "Time–Slot Management in Frequency Reuse Digital Portable Radio Systems." *$40^{th}$ IEEE Vehicular Technology Conference. On the Move in the 90's*, 1990, New York: IEEE, pp. 282–286. (Abstract).

Sultan, Nizar. "Four Ocean Satellites– Solution to Significant Increase in Frequency Reuse for Multibeam Global Coverage." *IAF International Astronautical Congress, $41^{st}$ Dresden, Federal Republic of Germany*, Oct. 6–12, 1990. (Abstract).

Sultan, N.; Wood, P. J. "Erlang Reuse Concept: Figure of Merit for Frequency Reuse Applied to Mobile Satellite Systems." *Space Technology*, vol. 9, No. 4, 1989, pp. 375–381. (Abstract).

Jayasuriya, D.A.R.; Lynch, S. B. "Comparison of Frequency Sharing Aspects of Satellites in Elliptical Orbits and the Geostationary Orbit." *International Conference on Satellite Systems for Mobile Communications and Navigation, $4^{th}$*, London, England, Oct. 17–19, 1988. pp. 154–157. (Abstract).

Takasugi, Toshio. "Review of CCIR Volumes.. IX—Fixed Service Using Radio–Relay Systems. IV/IX—Frequency Sharing and Coordination Between Systems in the Fixed–Satellite Service and Radio–Relay Systems." *Radio Research Laboratory Journal*. vol. 34, Nov. 1987, pp. 141–171. (No Abstract).

Colombo, Gianni; Settimo, Franco; Vernucci, Antonio. "Rearrangement Procedures in Regenerative Multibeammobile Communications Satellites with Frequency Reuse." *Jet Propulsion Lab., Proceedings of the Mobile Satellite Conference*, pp. 381–386. (Abstract).

Borgne, Michel. "Cross–Polarization Interference Cancellers for a Frequency Reuse Radio Channel." *Annales des Telecommunications*, vol. 42, Jan.–Feb. 1987, pp. 39–52. (Abstract).

Durkin, John; Withers, David J. "Frequency Band Sharing and WARC–ORB–85." *ICC '86 Proceedings of the International Conference on Communications,* Toronto, Canada, Jun. 22–25, 1986. Conference Record. vol. 1, pp. 42–46. (Abstract).

Oliveri, P.G.; Ayers, D. R. "Analysis of DSCS (Defense Satellite Communications System) 3 SHF Super High Frequency) Upgrades. vol. 1, Part A; Analysis of Frequency Reuse Via Polarization Diversity." (Abstract).

Bornemann, W.; English, W.J.; Balling, P. "Synthesis of Spacecraft Array Antennas for Intelsat Frequency Reuse Multiple Contoured Beams." *IEEE Transactions on Antennas and Propagation.* vol, AP–33, Nov. 1985, pp. 1186–1193. (Abstract).

Rotholz, E; White, B.E. "A Frequency–Routed Satellite Concept Using Multiple Orthogonally–Polarized Beams for Frequency Reuse." *Milcom 83' Proceedings of the Military Communications Conference,* Washington, DC. Oct. 31–Nov. 2, 1983, vol. 1, pp. 140–154. (Abstract).

Gould, Richard G.; Kelleher, John J. "Frequency Sharing Between the Broadcasting—Satellite Service and other Radiocommunication Services." *IEEE Journal on Selected Areas in Communication,* vol. SAC–3, Jan. 1985, pp. 25–35.

Kinpara, A. "Analysis of Frequency Sharing Between the Broadcasting Satellite Service and the Inter–Satellite Service Newly Allocated in the Vicinity of 23 GHz." *International Symposium on Space Technology and Science, 13th ,* Tokyo, Japan, Jun. 28–Jul. 3, 1982. Tokyo, AGNE Publishing Inc., pp. 829–836. (No Abstract).

Barclay, L. W. "Radio Regulatory Aspects of Frequency Sharing." *AGARD Propagation Aspects of Frequency Sharing, Interference and System Diversity* 6 p. (Abstract).

Visher, P. S. "Satellite Clusters and Frequency Reuse." *NTC '81; National Telecommunications Conference,* New Orleans, LA, Nov. 29–Dec. 3, 1981, Record. vol. 1. New York, Institute of Electrical and Electronics Engineers, Inc. pp. B5.4.1–B5.4.3. (Abstract).

Whitworth, J. E. "A Direct Broadcast Satellite System for Unites States—DBS/FS Frequency Sharing." *COSMAT Technical Review,* vol. 11, Fall 1981, pp. 255–264. (Abstract).

Marsh, A. L.; Parthasarathy, R.; Casey, J. P. "The Adaptation of Earth Stations in the Intelsat System for Frequency Reuse Through Dual Polarization." *International Conference on Radio Spectrum Conservation Techniques,* London, England, Jul. 7–9, 1980. London, Institute of Electrical Engineers, pp. 132–136. (Abstract).

Hines, O. T. "14.5–14.8 GHz Frequency Sharing by Data Relay Satellite Uplinks and Broadcasting–Satellite Uplinks." *IEEE Transactions on Aerospace and Electronic Systems,* vol. AES–17, May 1981, pp. 401–409. (Abstract).

Butts, C.J. "A Frequency Reuse K–Band 60–Foot Antenna System for the TDRSS Ground Segment." *ICC '80 Conference on Communications,* Seattle, Washington, Jun. 8–12, 1980. Conference Record. vol. 2. New York, Institute of Electrical and Electronics Engineers, Inc., pp. 25.2.1–25.2.5. (Abstract).

Sullivan, T. M. "Frequency Sharing Between Land Transportable Earth Stations and Terrestrial Stations." *ICC '80; International Conference on Communications,* Seattle, Washington, Jun. 8–12, 1980. Conference Reocrd. vol. 1. New York, Electrical and Electronics Engineers, Inc., pp. 7.2.1–7.2.3. (Abstract).

Banes, S. P. "Carrier—Interference Ratios for Frequency Sharing between Satellite Systems Transmitting Frequency Modulated and Digital Television Signals." *NTC '79 National Telecommunication Conference,* Washington, DC, Nov. 27–29, 1979, Conference Record. vol. 3. Piscataway, New Jersey, Institute of Electrical and Electronics Engineers, Inc., pp. 57.5.1–57.5.6 (Abstract).

Kreutel, R. W., Jr.: Difonzo, D. F.; English, W. J.; Gruner, R. W. "Antenna Technology for Frequency Reuse Satellite Communications." *IEEE, Proceedings,* vol. 65, Mar. 1977, pp. 370–378. (Abstract).

Makino, H.; Orino, Y.; Orui, S.; Fuketa, H.; Inoue, T. "A New Adaptive Control System for Compensating Cross–Polarization–Couplings on the Up and/or Down Path in Frequency Reuse Satellite Communications System." *Communications Satellite Systems Conference, 8th ,* Orlando, Florida, Apr. 20–24, 1980. New York, American Institute of Aeronautics and Astronautics, Inc., pp. 280–289. (Abstract).

Roger, J.; Aubry, C.; Poitevin, J. "Beam–Waveguide Feed for Satellite Communications Earth Station with Frequency Resue." *European Microwave Conference, 6th ,* Rome, Italy, Sep. 14–17, 1976. Sevenoaks, Kent, England, Microwave Exhibitions and Publishers, Ltd., pp. 69–173.

Afifi, M. S. "Idealized Radiators for Frequency Reuse Applications." *International Conference on Communications, 12th ,* Philadelphia, PA, Jun. 14–16, 1976, Conference Record. vol. 1. New York, Institute of Electrical and Electronics Engineers, Inc., pp. 4–15 to 4–20. (Abstract).

Taormina, F.; Mccarty, D. K.; Crail, T.; Nakatani, D. "Intelsat IVA Communications Antenna–Frequency Reuse Through Spatial Isolation." *International Conference on Communications, 12th ,* Philadelphia, PA, Jun. 14–16, 1976, vol. 1. New York, Institute of Electrical and Electronics Engineers, Inc. pp. 4–10 to 4–14. (Abstract).

Foldes, P. "Modifications of Feed Systems for Frequency Reuse." *Microwave Journal,* vol. 19, Jul. 1976, pp. 35–38. (Abstract).

Duncan, J. W.; Hamada, S. J.; Ingerson, P. G. "Dual Polarization Multiple Beam Antenna for Frequency Reuse Satellites." *American Institute of Aeronautics and Canadian Aeronautics and Space Institute. Communications Satellite Systems, Conference, 6th ,* Montreal, Canada, Apr. 5–8, 1976. (Abstract).

Martinon, R. "Evaluation of Propagation from a System Viewpoint for Communication Satellites Operating above 10 GHz, with Frequency Reuse by Dual–Orthogonal Polarizations." *ESA Frequency Re–use Transmission Expt. at 180 Mbps over the Jungfrau Link,* pp. 155–204. (Abstract).

Sites, M. J. "Frequency Sharing Between Small Terminal SCPC Systems and Broadcast and Fixed Satellite Services." *National Telecommunications Conference,* New Orleans, LA, Dec. 1–3, 1975, Conference Record. vol. 2, New York Institute of Electrical and Electronics Engineers, Inc. pp. 43–16, 43–17. (No Abstract).

Lu, H. S. "The Effect of Tolerances on the Isolation of Frequency Reuse Antennas." *IEEE Transactions on Antennas and Propagation,* vol. AP–23, Jan. 1975, pp. 115–118. (Abstract).

Foldes, P.; Raab, A. "Study of Multiple Beam Frequency Reuse Antennas." *EASCON '74; Electronics and Aerospace Systems Convention,* Washington, DC, Oct. 7–9, 1974, Record. New York, Institute of Electrical and Electronics Engineers, Inc., pp. 527–533. (Abstract).

Kreutel, R. W.; English, W. J. "Design and Measurements of Satellite Antenna Systems for Frequency Reuse." *EASCON '74; Electronics and Aerospace Systems Convention,* Washington, DC, Oct. 7–9, 1974, Record. New York, Insitute of Electrical and Electronics Engineeers, Inc., pp. 513–518. (Abstract).

Laborde, E.; Vilar, E.; Vazquez, A. "Choice of Polarization in Orthogonal Polarization Frequency Reuse Satellite Links." *Electrical Communication,* vol. 49, No. 3, 1974, pp. 289–299. (Abstract).

Kreutel, R. W. "Antenna Design for Frequency Reuse SATCOM Systems." *National Telecommunications Conference,* Atlanta, Georgia, Nov. 26–28, 1973, Conference Record. vol. 2. New York, Institute of Electrical and Electronics Engineers, Inc., pp. 24C–1 to 24C–5. (Abstract).

Dodel, H.; Pontano, B. "Frequency Reuse in Collocated Earth and Terrestrial Stations." *COMSAT Technical Review,* vol. 3. Fall 1973, pp. 443–448.

Aein, J. M. "Power Balancing in Systems, Employing Frequency Reuse." *COMSAT Technical Review,* vol. 3, Fall 1973, pp. 277–299. (Abstract).

Matsushita, Misao; Sawabe, Eiichi. "A Study of Frequency Sharing Between Satellite and Terrestrial Broadcasting Systems." *Electronics and Communication in Japan,* vol. 55, Jun. 1972, pp. 77–85.

Kane, D. A.; Jeruchim, M. C. "Orbital and Frequency Sharing Between the Broadcasting Satellite Service and the Fixed–Satellite Service." *Annual International Conference on Communications,* $8^{th}$, Philadelphia, PA, Jun. 19–21, 1972, Conference Record. New York, Institute of Electrical and Electronics Engineers, Inc., pp. 18–9 to 18–14. (No Abstract).

Hufford, G. A.; Longley, A. G.; Montgomery, J. L.; Crombie, D.D. "Frequency Sharing Between Broadcast Satellites and Tropospheric Scatter Systems." *EMC at the Crossroads; International Electromagnetic Compatibility Symposium,* Arlington Heights, ILL, Jul. 18–20, 1972, Conference Record. New York, Institute of Electrical and Electronics Engineers, Inc., pp. 39–41. (No Abstract).

Kaneda, S.; Fujio, T. "Required Carrier–to–Interference Ratios for Frequency Sharing Between Frequency–Modulation Television Signal and Amplitude–Modulation Vestigial Sideband Television Signal." *International Symposium on Space Technology and Science,* $9^{th}$, Tokyo, Japan, May 17–22, 1971. Tokyo, AGNE Publishing, Inc., 1971, pp. 795–804. (No Abstract).

Weiss, Hans J. "Frequency Sharing and Coordination." *EASCON'71; Electronics and Aerospace Systems, Convention,* Washington, DC, Oct. 6–8, 1971. New York, Institute of Electrical and Electronics Engineers, Inc., pp. 143–148.

International Search Report for PCT/US01/24046.

Katzela, I. and M. Nagshineh. "Channel Assignment Schemes for Cellular Mobile Telecommunication Systems: A Comprehensive Survey." *IEEE Personal Communications Magazine,* Jun. 1996, pp. 10–31.

* cited by examiner

NORMAL MODE OPERATION

REVERSED MODE OPERATION

COORDINATED SATELLITE-TERRESTRIAL FREQUENCY REUSE

RELATED APPLICATION

This application claims priority from U.S. provisional application Ser. No. 60/222,605 filed on Aug. 2, 2000 and entitled "System and Method of Satellite-Terrestrial Frequency Reuse", from U.S. provisional application Ser. number U.S. Patent Application No. 60/245,194 filed Nov. 3, 2000 and entitled "Coordinated Satellite-Terrestrial Frequency Reuse", and from U.S. provisional application Ser. No. 60/250,461 filed on Dec. 4, 2000 and entitled "System And Method Of Satellite-Terrestrial Frequency Reuse", each of which are hereby incorporated by reference.

DESCRIPTION

BACKGROUND OF THE INVENTION

1. Field of the Invention

The present invention generally relates to frequency assignment, reuse and/or sharing among communications systems having both a terrestrial and a satellite component (dual-mode) and, more particularly, to a satellite-terrestrial communications system and method of operation thereof that provides frequency assignment, reuse and/or sharing between the respective portions of the satellite system and/or terrestrial underlay systems associated therewith, while substantially reducing interference therebetween.

2. Background Description

In satellite-terrestrial systems that reuse the same spectrum, there is a need to efficiently allocate at least a portion of the frequency spectrum of, for example, a first satellite coverage area to, for example, a terrestrial network associated with a terrestrial coverage area. The present invention provides a system and method for efficiently assigning, reusing and/or sharing the spectrum between satellite and/or terrestrial systems in a manner that facilitates efficient frequency spectrum usage, while minimizing interference between the respective satellite and terrestrial systems. The present invention can also be applied to multiple satellite systems as well, in addition to, or instead of, terrestrial systems.

FIG. 1 shows a prior art satellite radiotelephone system, as shown in U.S. Pat. No. 6,052,586, incorporated herein by reference. As shown in FIG. 1, a satellite radiotelephone system includes a fixed satellite radiotelephone system 110 and a mobile satellite radiotelephone system 130. The fixed satellite radiotelephone system 110 uses a first satellite 112 to communicate with a plurality of fixed radiotelephones 114a, 114b and 114c in a first communication area 116.

Fixed satellite radiotelephone communication system 110 communicates with the plurality of fixed radiotelephones 114a–114c using a first air interface 118 (e.g., at C-band). Control of the fixed satellite system 110 may be implemented by a feeder link 122 which communicates with a gateway 124 and the public switched (wire) telephone network (PSTN) 126.

The feeder link 122 may include communication channels for voice and data communications, and control channels. The control channels are indicated by dashed lines in FIG. 1. The control channels may be used to implement direct communications between fixed radiotelephones, as shown for example between radiotelephones 114a and 114b. The control channels may also be used to effect communications between a fixed satellite radiotelephone 114c and a mobile radiotelephone or a wire telephone via gateway 124 and PSTN 126. The feeder link 122 may use the same air interface or a different air interface from the first air interface 118.

Still referring to FIG. 1, mobile satellite radiotelephone system 130 includes a second satellite 132 that communicates with a plurality of mobile radiotelephones 134a–134d which are located in a second communication area 136. Mobile satellite radiotelephone system 130 communicates with mobile radiotelephones 134 using a second air interface 138 (e.g., at L-band or S-band). Alternatively, the second air interface 138 may be the same as the first air interface 118. However, the frequency bands associated with the two air interfaces will generally be different.

A feeder link 142 may be used to communicate with other satellite, cellular or wire telephone systems via gateway 144 and PSTN 126. As with fixed satellite system 110, the feeder link 142 may include communication channels shown in solid lines and control channels shown in dashed lines. The control channels may be used to establish direct mobile-to-mobile communications, for example, between mobile radiotelephones 134b and 134c. The control channels may also be used to establish communications between mobile phones 134a and 134d and other satellite, mobile or wire telephone systems.

As with the fixed satellite radiotelephone system 110, the mobile satellite radiotelephone system 130 may employ more than one satellite 132 and will generally communicate with large numbers of mobile radiotelephones 134. The fixed and mobile satellite radiotelephone system may also use a common satellite.

Still referring to FIG. 1, a congested area may be present in the mobile satellite radiotelephone system 130 where a large number of mobile radiotelephones 134e–134i are present. As is also shown in FIG. 1, this congested area may be in an overlapping area 128 between first communication area 116 and second communication area 136. If this is the case, excess capacity from fixed satellite radiotelephone system 110 may be offloaded to mobile satellite radiotelephone system 130.

Capacity offload may be provided by at least one fixed retransmitting station 150a, 150b, that retransmits communications between the fixed satellite radiotelephone system 110 and at least one of the mobile radiotelephones. For example, as shown in FIG. 1, first fixed retransmitting station 150a retransmits communications between satellite 112 and mobile radiotelephones 134e and 134f. Second fixed transmitting station 150b retransmits communications between the satellite 112 and mobile radiotelephones 134g, 134h and 134i. The fixed retransmitting station need not be located in an overlapping area as long as it can retransmit communications between the fixed satellite radiotelephone system in the first area, and the mobile radiotelephones.

The fixed retransmitting stations communicate with the satellite 112 using first air interface 118. However they communicate with the mobile radiotelephones using the second air interface 138. Accordingly, from the standpoint of the mobile radiotelephones 134e–134i, communication is transparent. In other words, it is not apparent to the mobile radiotelephones 134e–134i, or the users thereof, that communications are occurring with the fixed satellite radiotelephone system 110 rather than with the mobile satellite radiotelephone system 130. However, additional capacity for the mobile satellite radiotelephone system 130 in the congested areas adjacent the fixed retransmitting stations 150 may be provided.

As shown in FIG. 1, a mobile radiotelephone can establish a communications link via the facilities of the fixed satellite radiotelephone system, even though the mobile radiotelephone is designed, manufactured and sold as a terminal intended for use with the mobile satellite radiotelephone system. One or more operators may offer both mobile and fixed telecommunications services over an overlapping geographic area using two separate transponders in separate satellites or within the same "hybrid" satellite, with one transponder supporting mobile satellite radiotelephones and the other supporting fixed satellite radiotelephones. As capacity "hot spots" or congestion develops within certain spot beams of the mobile radiotelephone system, the fixed system, with its much higher capacity, can deploy fixed retransmitting stations to relieve the capacity load of the mobile system.

FIG. 2A shows a seven-cell frequency reuse pattern which may be used by the mobile satellite radiotelephone system 130. Within each of the relatively large mobile system cells, each typically being on the order of 400–600 kilometers in diameter, frequencies used by adjacent cells may be locally retransmitted by the retransmitting station at reduced, non-interfering power levels, and reused as shown in FIGS. 2B and 2C, thus substantially increasing the effective local capacity.

Accordingly, fixed retransmitting stations, located within the fixed system's footprint or coverage area, receive signals from the fixed satellite and retransmit these signals locally. Frequency translation to bring the signals within the mobile system's frequency band will generally be provided. In the reverse direction, the fixed retransmitting stations receive signals from mobile radiotelephones and retransmit signals from the mobile radiotelephones to the fixed satellite system. Again, frequency translation to bring the signals within the fixed system's frequency band will generally be provided.

The mobile radiotelephones are ordinarily used with the mobile satellite system. Accordingly, the fixed satellite system may need to be configured to support the air interface used by the mobile satellite radiotelephone system.

Alternatively, if different air interfaces are used by the fixed and mobile satellite radiotelephone systems, the fixed retransmitting station can perform a translation from one air interface to the other, for example, by demodulation and remodulation. The fixed retransmitting station then becomes a regenerative repeater which reformats communications channels as well as control channels. However, if the mobile and fixed systems both use substantially the same air interface, then the fixed retransmitting station can function as a non-regenerative repeater.

One embodiment may use the simplest fixed retransmitting station by having the fixed and mobile systems both utilize the same air interface standard. Alternatively, the fixed system is configured to support the mobile system air interface even though the fixed system may be using another air interface for fixed radiotelephone service.

FIG. 3 is another prior art system as shown in U.S. Pat. No. 5,995,832. FIG. 3 provides an overview of a communications system 310 showing the functional interrelationships of the major elements. The system network control center 312 directs the top level allocation of calls to satellite and ground regional resources throughout the system. It also is used to coordinate system-wide operations, to keep track of user locations, to perform optimum allocation of system resources to each call, dispatch facility command codes, and monitor and supervise overall system health. The regional node control centers 314, one of which is shown, are connected to the system network control center 312 and direct the allocation of calls to ground nodes within a major metropolitan region. The regional node control center 314 provides access to and from fixed land communication lines, such as commercial telephone systems known as the public switched telephone network (PSTN). The ground nodes 316 under direction of the respective regional node control center 314 receive calls over the fixed land line network, encode them, spread them according to the unique spreading code assigned to each designated user, combine them into a composite signal, modulate that composite signal onto the transmission carrier, and broadcast them over the cellular region covered.

Satellite node control centers 318 are also connected to the system network control center 312 via status and control land lines and similarly handle calls designated for satellite links such as from PSTN, encode them, spread them according to the unique spreading codes assigned to the designated users, and multiplex them with other similarly directed calls into an uplink trunk, which is beamed up to the designated satellite 320. Satellite nodes 320 receive the uplink trunks, frequency demultiplex the calls intended for different satellite cells, frequency translate and direct each to its appropriate cell transmitter and cell beam, and broadcast the composite of all such similarly directed calls down to the intended satellite cellular area. As used herein, "backhaul" means the link between a satellite 320 and a satellite node control center 318. In one embodiment, it is a K-band frequency while the link between the satellite 320 and the user unit 322 uses an L-band or an S-band frequency.

A "node" is a communication site or a communication relay site capable of direct one or two-way radio communication with users. Nodes may include moving or stationary surface sites or airborne or satellite sites.

User units 322 respond to signals of either satellite or ground node origin, receive the outbound composite signal, separate out the signal intended for that user by despreading using the user's assigned unique spreading code, de-modulate, and decode the information and deliver the call to the user. Such user units 322 may be mobile or may be fixed in position. Gateways 324 provide direct trunks that is, groups of channels, between satellite and the ground public switched telephone system or private trunk users. For example, a gateway may comprise a dedicated satellite terminal for use by a large company or other entity. In the embodiment of FIG. 3, the gateway 324 is also connected to that system network controller 312.

All of the above-discussed centers, nodes, units and gateways are full duplex transmit/receive performing the corresponding inbound (user to system) link functions as well in the inverse manner to the outbound (system to user) link functions just described.

Referring now to FIG. 4, which is another embodiment as shown in U.S. Pat. No. 5,995,832, a block diagram of a communications system 440 which does not include a system network control center 312 is presented. In this system, the satellite node control centers 442 are connected directly into the land line network as are also the regional node control centers 444. Gateway systems 446 are also available as in the system of FIG. 3, and connect the satellite communications to the appropriate land line or other communications systems. The user unit 322 designates satellite node 442 communication or ground node 450 communication by sending a predetermined code. Alternatively, the user unit could first search for one type of link (either ground or satellite) and, if that link is present, use it. If that link is not present, use the alternate type of link.

The specification of U.S. Pat. No. 5,995,832 states that "[m]easures incorporated in the invention to maximize bandwidth utilization efficiency include the use of code division multiple access (CDMA) technology which provides an important spectral utilization efficiency gain and higher spatial frequency reuse factor made possible by the user of smaller satellite antenna beams. In regard to power efficiency, which is a major factor for the satellite-mobile links, the satellite transmitter source power per user is minimized by the use of forward-error-correcting coding, which in turn is enabled by the above use of spread spectrum code division multiple access (SS/CDMA) technology and by the use of relatively high antenna gain on the satellite."

The specification of U.S. Pat. No. 5,995,832 also states that "[i]n a system in accordance with the invention, the cluster size is one. That is, each cell uses the same, full allocated frequency band. This is possible because of the strong interference rejection properties of spread spectrum code division multiple access technology (SS/CDMA)." With regard to determining the position of user units 322, the specification of U.S. Pat. No. 5,995,832 states that "[a]ccurate position determination can be obtained through two-dimensional multi-lateration. Each CDMA mobile user unit's transmitted spreading code is synchronized to the epoch of reception of the pilot signal from its current control site, whether ground or satellite node."

However, in contrast to the prior art systems described, for example, in FIGS. 1–4, the present invention does not utilize in one embodiment frequency translation between fixed and mobile systems. In addition, the present invention provides, for example, a robust satellite-terrestrial frequency assignment and/or reuse scheme in another embodiment. Further, the present invention optionally utilizes a first frequency as a downlink frequency between a satellite and a first fixed and/or mobile user terminal and as an uplink frequency between a second fixed and/or mobile user terminal and a base station, and a second frequency as an uplink between the first fixed and/or mobile user terminal and the satellite and as a downlink between the base station and the second fixed and/or mobile user terminal. Finally, the present invention is not limited, for example, to the use of CDMA technology. Other advantages and features of the invention are described below, that may be provided independently and/or in one or more combinations.

SUMMARY OF THE INVENTION

It is a feature and advantage of the present invention to provide, for example, a satellite-terrestrial communication system and method of operation thereof that facilitates efficient spectrum assignment, usage, sharing, and/or reuse.

It is another feature and advantage of the present invention to provide, for example, a satellite-terrestrial communications system and method of operation thereof that minimizes interference between the satellite and terrestrial systems.

It is still another feature and advantage of the present invention to provide, for example, a satellite-terrestrial communication system and method of operation thereof that enables at least a portion of the frequencies associated with an area of coverage to be utilized by a terrestrial system having overlapping coverage with a second area of coverage.

It is yet another feature and advantage of the present invention to provide, for example, a satellite-terrestrial communications system and method of operation thereof that enables a terrestrial underlay system associated with a first area of coverage to reuse and/or share in a substantially central portion thereof at least a portion of the frequency spectrum of one or more adjacent areas of coverage of the satellite system.

It is another feature and advantage of the present invention to provide, for example, a two system communication system wherein frequencies associated with a central portion of a first area of coverage for a first communication system are assigned, reused and/or shared in a second area of coverage associated with a second communication system.

It is another feature and advantage of the present invention to enable, for example, assignment, reuse and/or reassignment of satellite uplink and downlink channels in a non-paired manner.

It is another feature and advantage of the present invention to provide, for example, a method by which the size of satellite spot beams and/or terrestrial cell sizes can be determined.

It is another feature and advantage of the present invention to, for example, invert the frequencies between the satellite system and an underlay terrestrial system, whereby a first frequency is used, for example, as a downlink frequency between a satellite and a first fixed and/or mobile user terminal, and as an uplink frequency between a second fixed and/or mobile user terminal and a base station. In addition, a second frequency is used, for example, as an uplink between the first fixed and/or mobile user terminal and the satellite and as a downlink between the base station and the second fixed and/or mobile user terminal.

The present invention optionally provides both a terrestrial frequency assignment and/or reuse plan, and a satellite frequency assignment and/or reuse plan.

In one embodiment of the present invention, a first spot beam or set of spot beams can reuse in a substantially central portion or pre-designated portion thereof, at least a portion of the frequency spectrum of one or more adjacent or nearby spot beams. The remaining portion of the spot beam is partitioned into, for example, a number of substantially equal sized subareas/subcells (hereinafter "subareas") extending radially from approximately the periphery of the central portion to or substantially to the spot beam boundary. Each of the central portions and the subareas will generally, although not necessarily, comprise one or more terrestrial cells. In addition, the terrestrial cells may cover at least a portion of one or more subareas and/or spot beams. Other configurations of subareas may also be used. The number of subareas is optionally equal to the number of adjacent cells or spot beams. For example, in a cluster size of seven, the center cell or spot beam will comprise a substantially central portion and six substantially equal size subareas, whereas in a cluster size of four, the cells or spot beams will comprise a substantially central portion and three substantially equal sized subareas. Any number of subareas, however, may alternatively be used.

In another embodiment, the spot beam channels selected for terrestrial assignment and/or reuse are optionally selected beginning with the spot beam(s) farthest or substantially farthest away from the subarea of the spot beam under consideration, and proceeding to the spot beams closest (e.g., adjacent to) the spot beam subarea under consideration. The system and method of the present invention in this embodiment therefore generally maximizes the separation between the satellite frequencies that are reused terrestrially within the terrestrial cells.

In accordance with another embodiment of the invention, satellite-terrestrial frequency assignment and/or reuse utilizes the inter-spot beam isolation (e.g., the isolation between the various spot beams). Thus, the terrestrial system associated with a particular spot beam and/or one or more subareas within a spot beam and/or one or more terrestrial cells preferably use satellite channels that are not utilized by the spot beam since the spot beam provides an isolation that can be utilized in reducing interference. In other words, one aspect of the present invention takes the co-channel, co-beam interference and "transfers" it to co-channel, adjacent beam interference.

This feature of the present invention advantageously minimizes interference between adjacent satellites/spot beams and adjacent cells. The transmissions by the terrestrial network(s) will generally, to a certain extent and depending on the local attenuation, be "heard" by the associated satellite.

It should be understood that the present invention can utilize and/or be deployed with all satellite (e.g., low-Earth orbit (LEO), mid-Earth orbit (MEO), geosynchronous orbit (GEO), etc.) and cellular terrestrial technologies (e.g., time division multiple access (TDMA), code division multiple access (CDMA), Global System for Mobile Communications (GSM), etc.). The present system may also assign, share and/or reuse frequencies of other domestic, foreign, and/or international satellite and/or terrestrial systems, subject to, for example, national, foreign, and/or international government regulatory approval.

Additional aspects of the present invention relate to determining the size of the satellite spot beam cells and/or terrestrial cells. In accordance with the present invention, satellite spot beams are optionally sized by a 3 dB loss rule. Specifically, spot beam size is optionally determined by locating points that are substantially equidistant from and have approximately a 3 dB loss vis-à-vis a substantially or effective central portion of the spot beam having maximum gain (e.g., where received satellite signal strength is maximum). Spot beams and/or terrestrial cells can also be sized by using for example, a bit error rate. For example, with voice communication, spot beams and/or terrestrial cells can be sized in accordance with a bit error rate in the range of, for example, $10^{-2}$ to $10^{-3}$ For data communications, spot beams and/or terrestrial cells can be sized in accordance with a bit error rate in the range of, for example, $10^{-2}$ to $10^{-3}$. This approach may result, for example, in systems using different protocols and/or air interfaces (e.g., CDMA, GSM) having different sized spot beams and/or terrestrial cells.

In accordance with the present invention, the size of the substantially central portion of the spot beam where any/all channels of adjacent spot beams can be reused is preferably equal to an area comprising approximately 25% of the spot beam. For example, if circle having radius r is used to approximate the area associated with, for example, a hexagonal shaped spot beam in a seven cell configuration, the central portion will be approximately equal to 0.5 r (of the circle), which corresponds to an area equal to 25% of the circle. Other percentages of the central portion and/or shapes of the cells may alternatively be used.

In another embodiment of the present invention, the central portion of the first cell is optionally omitted. The spot beams are instead partitioned into a number of substantially equal sized subareas, whereby each subarea can terrestrially reuse adjacent spot beam channels, except for those channels associated with a spot beam adjacent to the subarea.

Specifically, within any given satellite spot beam, satellite spot beam channels are used for satellite transmissions, whereas the terrestrial transmissions within that spot beam preferably use all satellite channels except those allocated to the present spot beam. That is, within any given satellite spot beam, the frequency channels used in a first spot beam are preferably not used in the underlay terrestrial system associated with the first spot beam.

For example, an area of coverage by a satellite system may comprise seven spot beams, with each spot beam having nine channels. Thus, the system would have sixty three channels that could potentially be assigned, shared and/or reused between the satellite and the respective underlay terrestrial systems or between satellite systems. The satellite may use, for example, nine (9) of the channels, and the remaining fifty four (54) channels can therefore be allocated to one or more respective underlay terrestrial systems associated with each respective spot beam. In such a system, the nine channels associated with, for example, a first spot beam are preferably not utilized by the underlay terrestrial system associated with the first spot beam. The general concept is to efficiently allocate (e.g., based on demand) the total frequency band (e.g., sixty three channels) between the terrestrial and satellite systems within each of the seven spot beams and each of the respective terrestrial underlay systems associated therewith, while minimizing interference therebetween.

The system in accordance with the present invention enhances spectrum usage by allocating and/or reusing at least a portion of the spectrum of, for example, at least a first satellite spot beam to an underlay terrestrial system preferably associated with or having overlapping coverage with, for example, at least a second satellite spot beam, a subarea thereof, and/or a terrestrial cell associated therewith. The satellite-terrestrial communications system of the present invention also minimizes interference between each of the respective satellite and terrestrial systems that assign, reuse or share a portion of the spectrum.

The present invention also provides a system and method for coordinating an assignment and/or reuse plan between satellite spot beams. If one spot beam gets too congested, it can borrow frequency spectrum from one or more other spot beams that have available capacity. The present invention thus provides different ways of assigning and/or reusing the same frequencies, and uses that fact to allow one or more satellite channel sets to be selected for terrestrial reuse within a terrestrial network on a substantially non-interfering basis with the satellite system.

In general, in accordance with one embodiment of the invention, each satellite channel is subdivided into uplink and downlink portions, and therefore, has respective uplink frequencies and downlink frequencies associated therewith. In a further aspect of the present invention, the uplink frequencies and downlink frequencies associated with a given channel do not have to be assigned pairwise. For example, the uplink frequencies of a first channel associated with spot beam A can be assigned or reused terrestrially in spot beam B, whereas and the downlink frequencies of the first channel associated with spot beam A can be assigned or reused terrestrially in spot beam C. Similarly, channels can also be assigned or reassigned for use in other spot beams and/or other satellite systems. Similarly, the uplink frequencies of a first channel associated with spot beam A can be assigned or reused terrestrially in a first subarea and/or terrestrial cell, for example, of spot beam B. In addition, the downlink frequencies of the first channel associated with spot beam A can be assigned or reused, for example, terrestrially in a second subarea and/or terrestrial cell of, for example, spot beam B. Similarly, channels can also be assigned or reassigned for user in other spot beams.

It should be understood that the present invention generally works regardless of cluster size, how many spot beams there are, or how many channels there are per spot beam. For example, a fourteen cell repeat pattern or other cell pattern for satellite and/or terrestrial systems could provide additional separation between the terrestrial networks and the satellite networks. However, the allocation of frequencies between the terrestrial network and the satellite network should be managed efficiently. For example, a large repeat pattern satellite and a small repeat pattern terrestrial network may give rise to inefficient use of spectrum on the satellite (unless, for example, there is sufficient excess spectrum), which could render the satellite spectrally limited rather than power limited.

In this regard, it will be realized that one optional technique that may be practiced with the present invention is increasing the terrestrial frequency reuse cluster size, which generally minimizes the interference between the satellite and terrestrial systems. For example, a traditional GSM type of pattern utilizes four cells with three sectors each. If instead, twenty-four channels, for example, are assigned across the cells, then one site in eight would have the same frequency, as opposed to one site in four having the same frequency (as with the traditional GSM pattern). Thus, the number of instances where the same frequency exists has been halved, and the amount of energy on an individual channel has also been reduced by half. In this example, the interference between the satellite and terrestrial systems would therefore be reduced by approximately 3 dB vis-à-vis the traditional GSM system.

Finally, an additional aspect of the present invention concerns inverting frequencies to minimize interference between the satellite and terrestrial systems. The frequency inversion technique involves reversing the satellite downlink and satellite up-link frequencies to become the terrestrial up-link ("return-link") and terrestrial down-link ("forward-link") frequencies, respectively, as described below in detail.

In particular, one embodiment of the present invention provides a method and system for at least one of assigning and reusing frequencies between one or more communication systems. The method preferably comprises the steps of configuring a first satellite spot beam having a first set of frequencies associated therewith. The first spot beam comprises a first substantially central portion and a first plurality of subareas, where each of the first plurality of subareas extend substantially from a periphery of the first substantially central portion to or near a circumference of the first satellite spot beam. Each subarea generally comprises one or more terrestrial cells, although not all subareas are necessarily required to have terrestrial cells associated therewith. A second satellite spot beam is preferably similarly configured. A terrestrial cell is configured within the first satellite spot beam having a third set of frequencies associated therewith. Finally, the method includes the step of at least one of assigning, reusing and borrowing, by the terrestrial system, at least one of a portion of the second set of frequencies and a portion of the first set of frequencies used in the first central portion, responsive to predetermined criteria associated with the third set of frequencies, including at least one of assigning, reusing and borrowing at least one of the second set of frequencies when the second set of frequencies are at least substantially geographically distant from the first satellite spot beam.

Another embodiment of the present invention provides a method and system for making a telephone call using a satellite-terrestrial communications system that at least one of assigns and reuses frequencies between a first satellite spot beam or spot beams and a second satellite spot beam or spot beams. A user utilizes a mobile terminal to dial a telephone number within an area of a first terrestrial cell located within or associated with a first satellite spot beam. The terrestrial cell has a first set of frequencies associated therewith. The first satellite spot beam comprises a first substantially central or predesignated portion, and a first plurality of subareas, wherein each of the first plurality of subareas extend substantially from a periphery of the first substantially central or predesignated portion to substantially near a circumference of the first satellite spot beam. Each of the subareas may comprise one or more terrestrial cells, which may at least partially overlap with one or more spot beams and/or subareas. A second spot beam is configured, which can optionally be configured differently than the first spot beam. If the first set of frequencies can not be utilized to establish a connection, then a connection is established between the first mobile terminal and the second terminal by at least one of assigning, reusing and borrowing, by the first spot beam, at least one of the second set of frequencies, responsive to predetermined criteria including at least one of assigning, reusing and borrowing at least one of the second set of frequencies when the mobile terminal is substantially geographically distant from the second satellite spot beam.

A third embodiment of the present invention provides a method and system for at least one of assigning and reusing frequencies. The method comprises the steps of configuring a first communications area having a first set of frequencies associated therewith. The first communication area preferably comprises a first substantially central or predesignated portion, and a first plurality of subareas, wherein each of the first plurality of subareas extend substantially from a periphery of the first substantially central portion or predesignated area to or substantially near a circumference of the first communications area. Each of the subareas may comprise one or more terrestrial cells, which may overlap with at least a portion of other spot beams and/or subareas. A second communications area is preferably similarly configured. A third communications area, having a third set of frequencies associated therewith, is preferably configured within the first communications area. Finally, the method includes the step of at least one of assigning, reusing and borrowing, by the third communications area, at least one of a portion of the second set of frequencies and a portion of the first set of frequencies used in the first central portion, responsive to predetermined criteria associated with the third set of frequencies, including at least one of assigning, reusing and borrowing at least one of the second set of frequencies when the second set of frequencies are at least substantially geographically distant from the first satellite spot beam.

A fourth embodiment of the present invention provides a system and method that involves assigning and reusing frequencies between one or more communication systems. A first satellite spot beam is configured having a first set of frequencies associated therewith. The first spot beam preferably comprises a first substantially central portion and a first plurality of subareas, wherein each of the first plurality of subareas extend substantially from a periphery of the first substantially central portion to substantially near a circumference of the first satellite spot beam. A second satellite spot beam is similarly configured. A terrestrial cell, having a third set of frequencies associated therewith, is configured within the first satellite spot beam. Finally, the method involves the step of at least one of assigning, reusing and borrowing, by the second satellite spot beam, at least one of a portion of the third set of frequencies responsive to predetermined criteria, including at least one of assigning, reusing and borrowing at least one of the third set of frequencies associated with the at least one terrestrial cell when the portion is at least substantially geographically distant from the second set of frequencies.

A fifth embodiment of the present invention also provides a system and method that involves assigning and reusing frequencies between one or more communication systems. A first satellite spot beam is preferably configured having a first set of frequencies associated therewith. The first spot beam comprises a first substantially central portion and a first plurality of subareas. Each of the first plurality of subareas preferably extend substantially from a periphery of the first substantially central portion to or near a circumference of the first satellite spot beam. A second satellite spot beam, having a second set of frequencies associated therewith, is configured. The second spot beam can optionally have a different configuration than the first satellite spot beam. A terrestrial cell, having a third set of frequencies associated therewith, is configured within the first satellite spot beam. Finally, the method involves the step of at least one of assigning, reusing and borrowing, by the terrestrial system, at least one of a portion of the second set of frequencies and a portion of the first set of frequencies used in the first central portion, responsive to predetermined criteria associated with the third set of frequencies, including at least one of assigning, reusing and borrowing at least one of the second set of frequencies when the second set of frequencies are at least substantially distant from the first satellite spot beam.

A sixth embodiment of the present invention also provides a system and method of at least one of assigning and reusing frequencies between one or more communication systems. A first satellite spot beam is configured having a first set of frequencies associated therewith. The first spot beam preferably comprises a first plurality of subareas, wherein each of the first plurality of subareas extend from a substantially center area of the first satellite spot beam to substantially near a circumference of the first satellite spot beam in a fan-like manner to form the first plurality of subareas. A second satellite spot beam, having a second set of frequencies associated therewith, is configured. The second spot beam can optionally have a different configuration than the first satellite spot beam. At least one terrestrial cell having a third set of frequencies associated therewith is configured within the first satellite spot beam. Finally the method involves the step of at least one of assigning, reusing and borrowing, by the terrestrial system, at least one of a portion of the second set of frequencies and a portion of the first set of frequencies used in the first central portion, responsive to predetermined criteria associated with the third set of frequencies, including at least one of assigning, reusing and borrowing at least one of the second set of frequencies when the second set of frequencies are at least substantially geographically distant from the first satellite spot beam.

In at least some of the above-described embodiments, the first plurality of subareas are substantially equal sized cells having a first size, and the second plurality of subareas are substantially equal sized cells having a second size. The first and second size may be substantially equal, or different.

The second set of frequencies, in accordance with at least some of the above-described embodiments, are substantially distant from the first satellite spot beam when they are at least one of assigned, reused and borrowed for use in those first plurality of subareas not sharing a common boundary with the second satellite spot beam. The first set of frequencies, in accordance with at least some of the above-described embodiments, that are used in the first central portion comprise at least one of those frequency sets respectively associated with satellite spot beams adjacent to or near the first satellite spot beam.

Further, at least some of the above-described embodiments, optionally assign, reuse and/or borrow frequencies based on prioritization rules such as, for example, the dynamic load and capacity constraints of cells that frequencies are taken from.

At least some embodiments of the above-described invention utilize a subscriber terminal positioned within the first central portion that can be assigned, reuse and/or borrow use any of the respective set of frequencies associated with the at least one second satellite spot beam. For example, a subscriber terminal positioned within or near the first central portion can be assigned, reuse and/or borrow use any of the respective set of frequencies associated with any spot beams adjacent and/or near the first satellite spot beam.

Further, at least some embodiments of the present invention include a subscriber terminal positioned within or near a subarea not sharing at least a portion of a common boundary with the second satellite spot beam. Such a subscriber unit can be assigned, reuse and/or borrow any of the second set of frequencies associated with the second satellite spot beam.

In addition, at least some embodiments of the present invention optionally assign, reuse and/or borrow frequencies based on predetermined criteria such as load balancing, maintaining a reserve of frequencies, and received signal strength interference.

At least some of the embodiments of the above-described invention optionally include a second terrestrial cell within the second satellite spot beam. The second terrestrial cell optionally has a fourth set of frequencies associated therewith. The second terrestrial cell at least one of assigns, reuses and borrows at least one of the first set of frequencies and the frequencies used in the second central portion, responsive to predetermined criteria associated with the fourth set of frequencies. The predetermined criteria optionally include at least one of assigning, reusing and borrowing at least one of the first set of frequencies when the first set of frequencies are at least substantially geographically distant from the second satellite spot beam.

The first central portion and the second central portion of at least some of the above-described embodiments optionally comprise approximately twenty five percent of the area covered by the first satellite spot beam and the second satellite spot beam, respectively.

Further, the first set of frequencies and the second set of frequencies optionally comprise a plurality of paired uplink and downlink frequencies. A downlink frequency of a frequency set can optionally be used in a first subarea of the first spot beam, and a corresponding one of the uplink frequencies can optionally be reused in a second subarea of the first or second spot beam.

In accordance with at least some of the above-described embodiments, the area of coverage of a spot beam comprises an area having a radius substantially equal to a distance from a center of the spot beam having a substantially maximum signal strength to a distance from the center of the spot beam where the signal strength of the spot beam is attenuated by approximately 3 dB. Further, the number of subareas is optionally equal to a number of spot beams comprising a cluster minus one. Other numbers of subareas can also be utilized.

Finally, one or more satellites can be used to configure the first and second spot beams. In communicating between a first subscriber terminal and a second subscriber terminal and/or other communication device, a network operations controller is preferably used to facilitate assignment, borrowing and/or reuse of frequencies between spot beams, communication areas, and/or terrestrial cells, central portions of spot beams and/or communication areas, subareas associated with spot beams, communication areas and/or terrestrial cells, and/or terrestrial cells within subareas.

Finally, an embodiment of the present invention provides a terrestrial communication system that uses satellite uplink and downlink frequencies, where a terrestrial cell site produces a signal at a satellite uplink frequency that is transmitted to a terrestrial terminal unit. The terminal cell site receives a signal at a satellite downlink frequency that was transmitted by the terrestrial terminal unit.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

DETAILED DESCRIPTION OF A PREFERRED EMBODIMENT OF THE INVENTION

Figure 1:
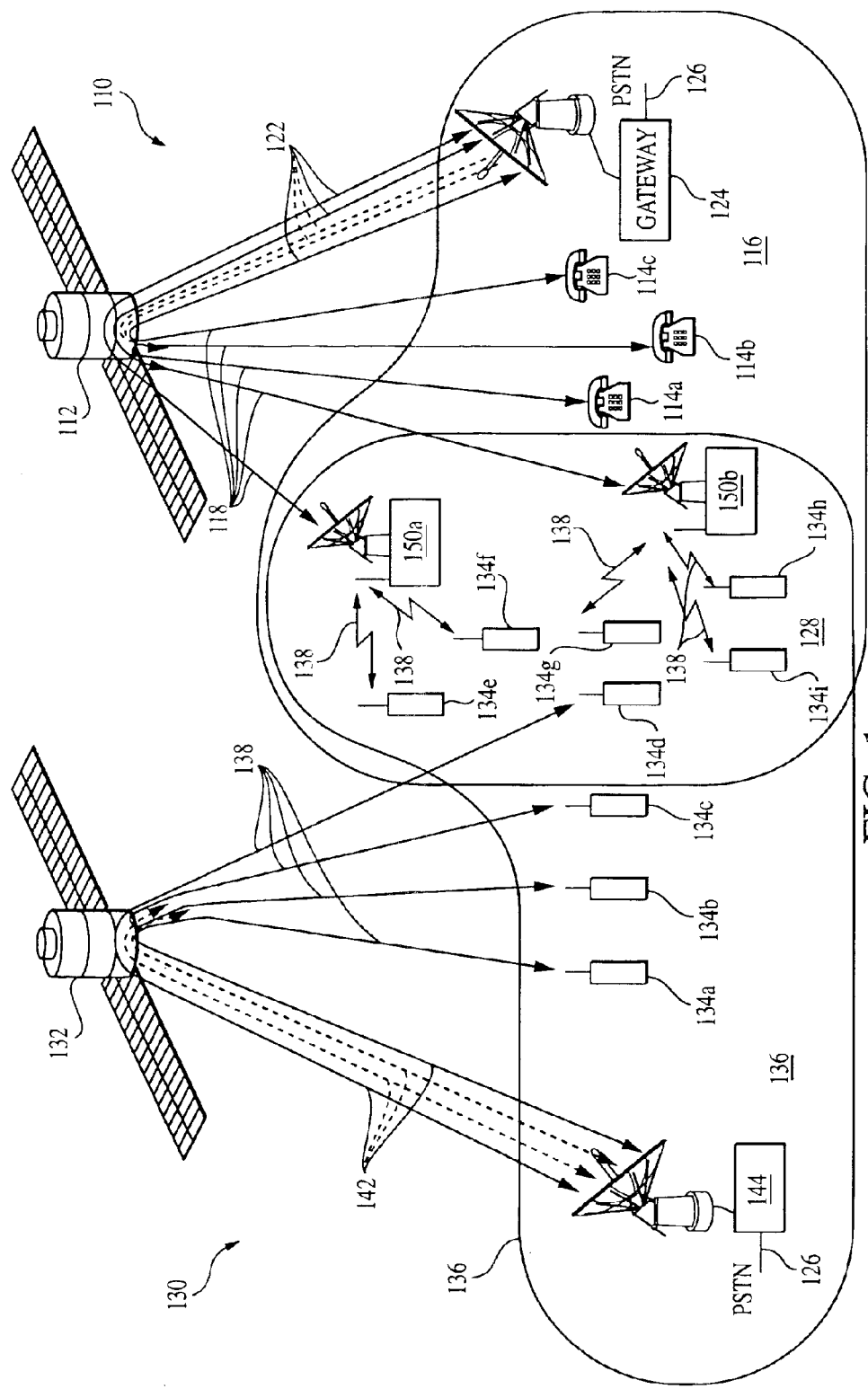
FIG. 1 is a prior art diagram of a satellite radiotelephone system.
Figure 2A:
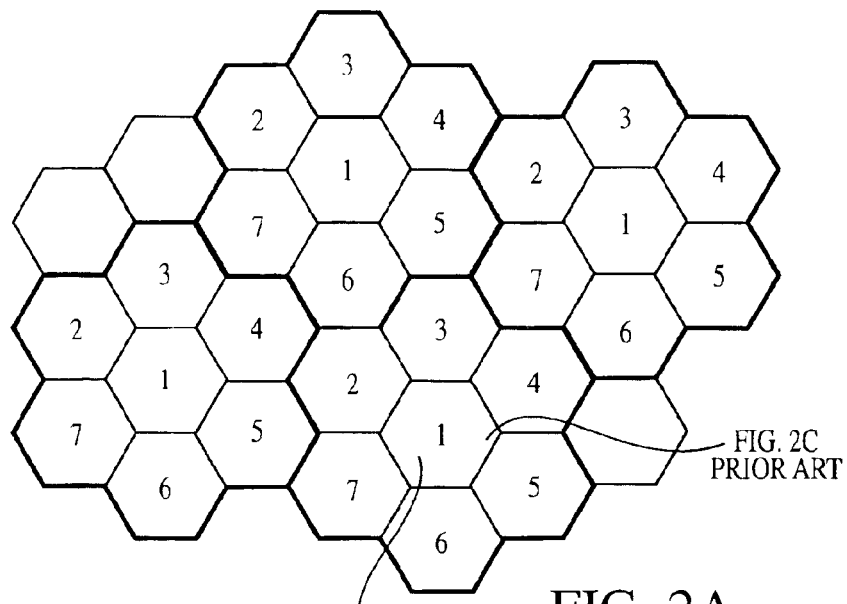
FIGS. 2A, 2B and 2C are prior art schematic diagrams of frequency reuse in the satellite radiotelephone systems shown in FIG. 1.
Figure 2B:
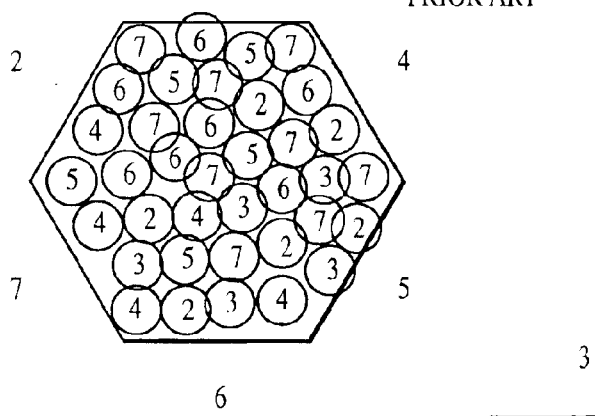
Figure 2C:
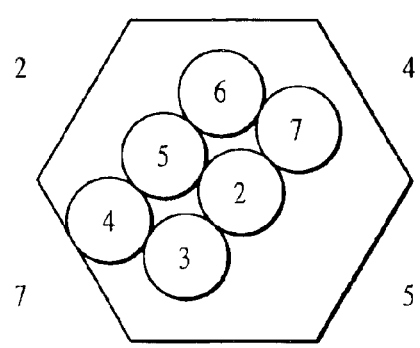
Figure 3:
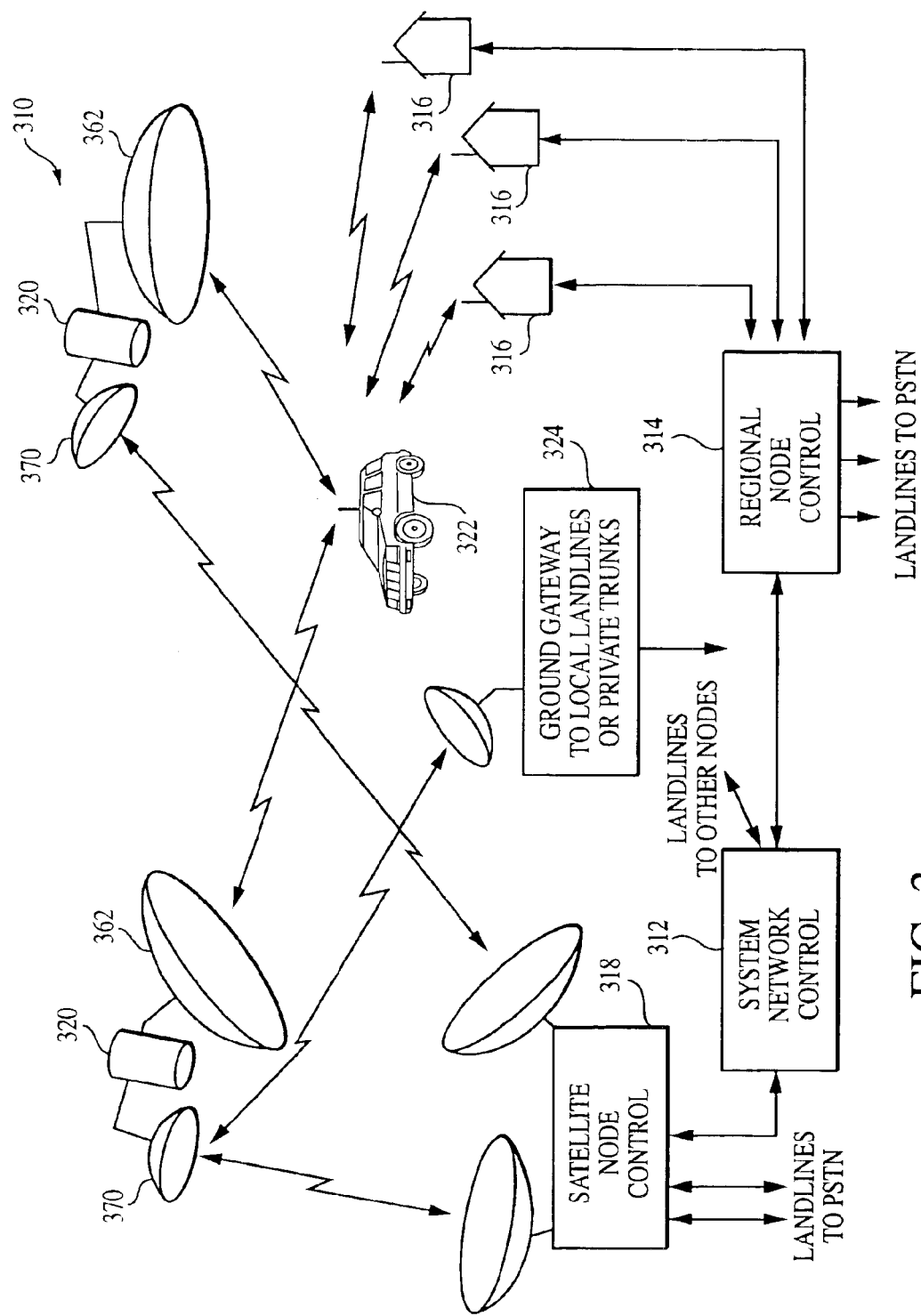
FIG. 3 is a diagram showing an overview of the principal elements of prior art communications system.
Figure 4:
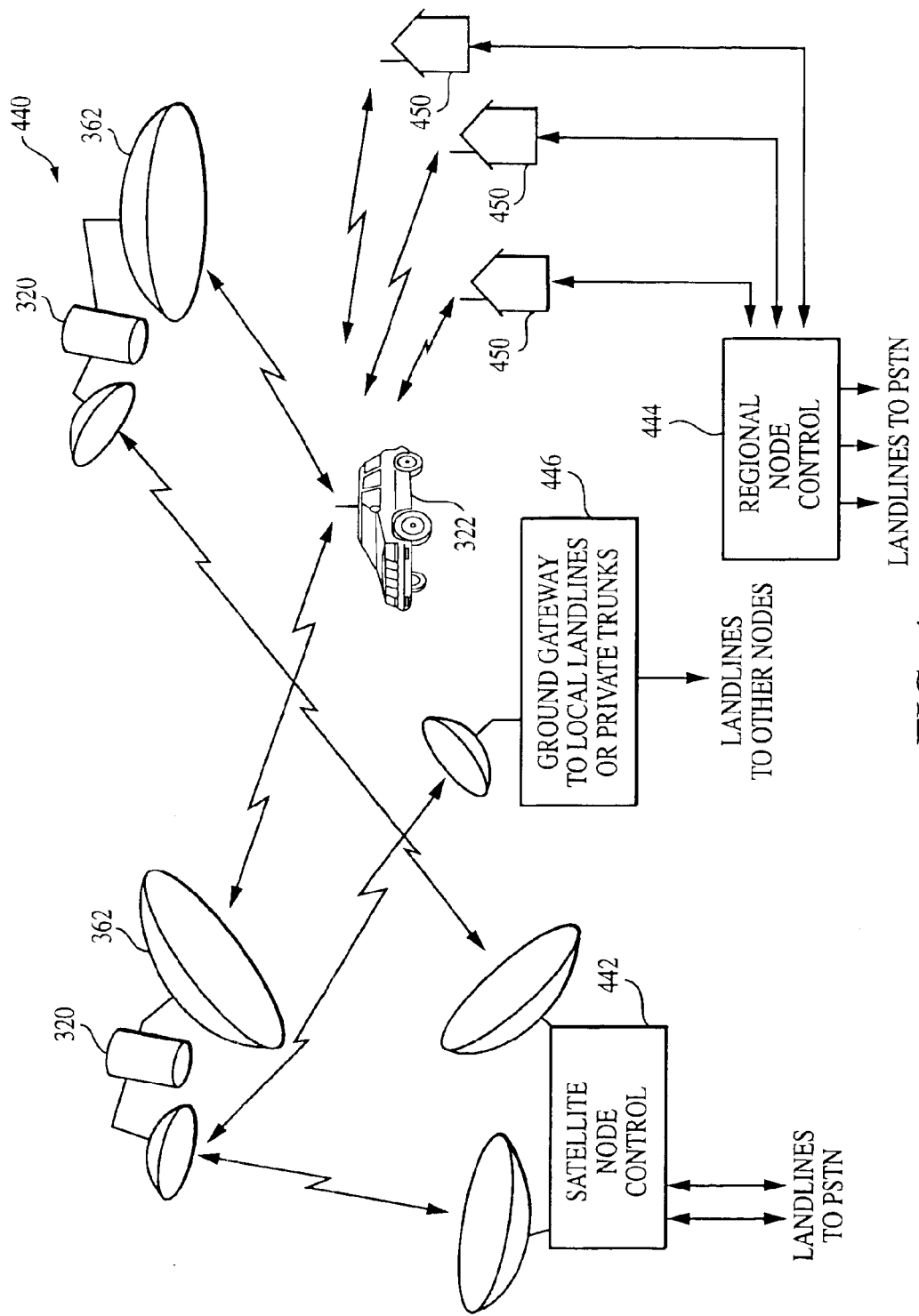
FIG. 4 is an overview block diagram of another embodiment of the prior art communications system shown in FIG. 3.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

Figure 5:
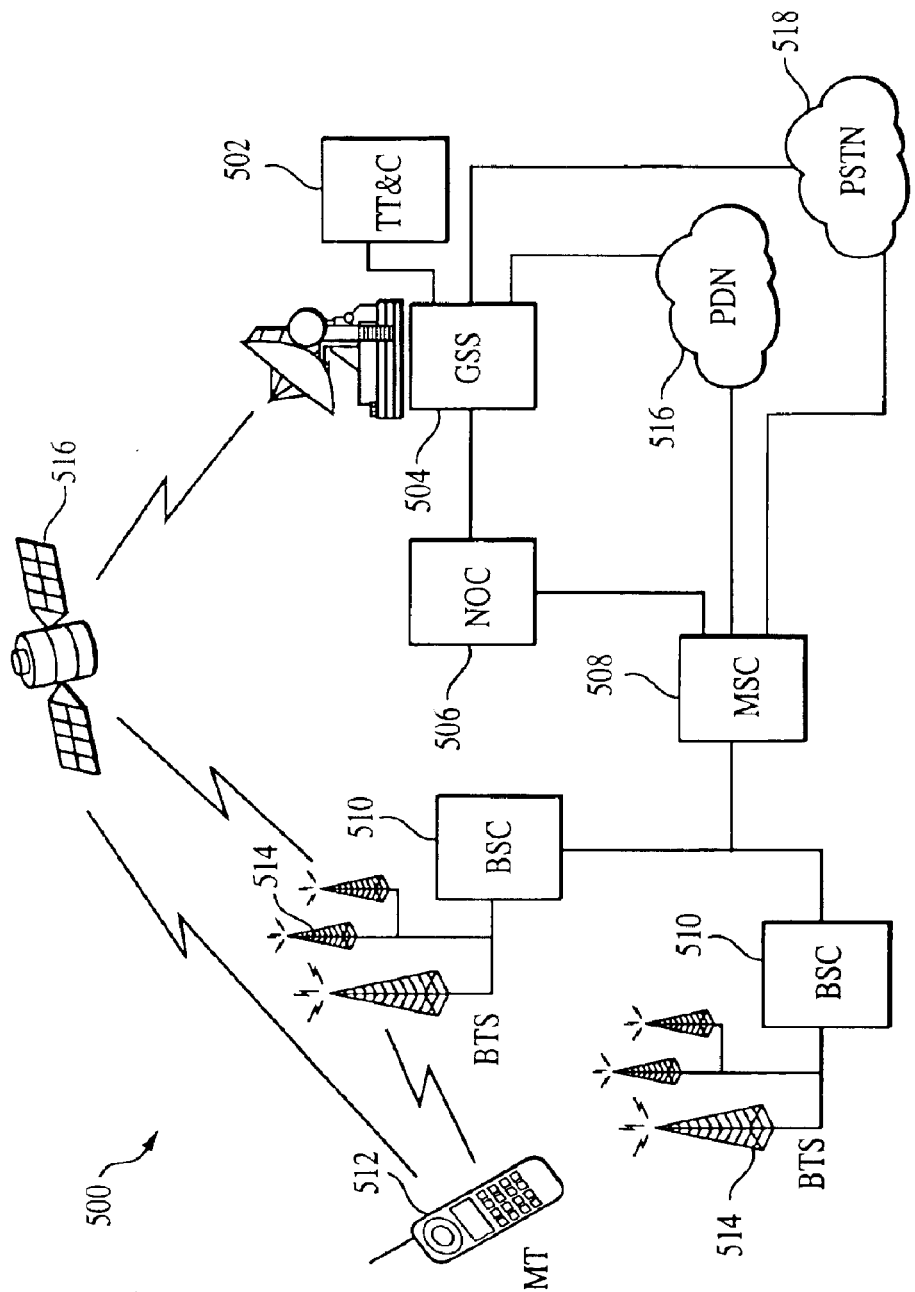
FIG. 5 is an exemplary high level block diagram of a system that can use and/or be used to produce the frequency reuse schemes in accordance with the present invention.

FIG. 5 shows an exemplary high level block diagram of a standard system 500 that can be used to implement the frequency assignment, reuse and/or reassignment, and other features of the present invention. The telemetry, tracking and command (TT&C) facility 502 is used to control and monitor the one or more satellites 516 of the system 500.

The terrestrial segment can optionally use, for example, digital cellular technology, consisting of one or more Gateway Station Systems (GSS) 504, a Network Operations Center (NOC) 506, one or more Mobile Switching Centers (MSC) 508, one or more Base Transceiver Stations (BTS) 514, and a variety of mobile, portable, and/or fixed subscriber terminals 512. The subscriber terminals 512 can be equipped with a Subscriber Identity Module (SIM) (not shown) or similar module that identifies the individual subscriber terminal 512. The subscriber terminals 512 are generally handheld devices that provide voice and/or data communication capability. Subscriber terminals 512 may also have additional capabilities and functionality such as, for example, paging. Equipping the subscriber terminals 512 with a SIM module can allow the user to have access to the system 500 by using any subscriber terminals 512 having a SIM.

The MSC 508 preferably performs the switching functions of the system 500, and also optionally provides connection to other networks (e.g., Public Data Network (PDN) 516, and/or Public Switched Telephone Network (PSTN) 518). BTSs 514 can be used in those areas where the satellite signal is attenuated by, for example, terrain and/or morphological features, and/or to provide in-building coverage. The BTSs 514 and BSCs 510 generally provide and control the air interface to the mobile terminals 512. It is preferred that the BTSs 514 use a wireless proprietary or standard wireless protocol that is very similar to that of the satellites 516. The BSC 510 generally controls one or more BTSs 514 and manages their radio resources. BSC 510 is principally in charge of handovers, frequency hopping, exchange functions and control of the radio frequency power levels of the BTSs 514.

NOC 506 can provide functions such as monitoring of system power levels to ensure that transmission levels remain within tolerances, and line monitoring to ensure the continuity of the transmission lines that interconnect the BSC 510 to the BTS 514, the MSC 508 to the PDN 516 and the PSTN 518, and the NOC 506 to other network components. The NOC 506 can also monitor the satellite 516 transponders to ensure that they are maintained within frequency assignment and power allocation tolerances. The NOC also optionally performs priority and preemption to ensure that communication resources are available and/or assigned, reused and/or borrowed in a timely manner to, for example, facilitate calls originating and/or transmitted to a subscriber terminal 512. To effectuate the dynamic channel assignment and priority and preemption features of the present invention, the NOC generally maintains cognizance of the availability of satellite and/or terrestrial resources and arranges for any necessary satellite reconfiguration and/or assignment and or reuse of frequencies to meet changed traffic patterns. U.S. Pat. Nos. 5,926,745, 5,815,809, 6,112,085, and 6,058,307 are incorporated herein by reference.

The system 500 will also have one or more satellites 516 that communicate with the satellite GSS 504 and the subscriber terminals 512. A typical GSS 504 will have an antenna to access the satellite. On the uplink transmission path, the GSS 504 will generally have upconverters that can translate the GSS 504 IF frequency to the feeder link frequency. On the downlink transmission path, the received signal is preferably amplified, and feeder link frequencies are translated to the common IF frequency.

Figure 6:
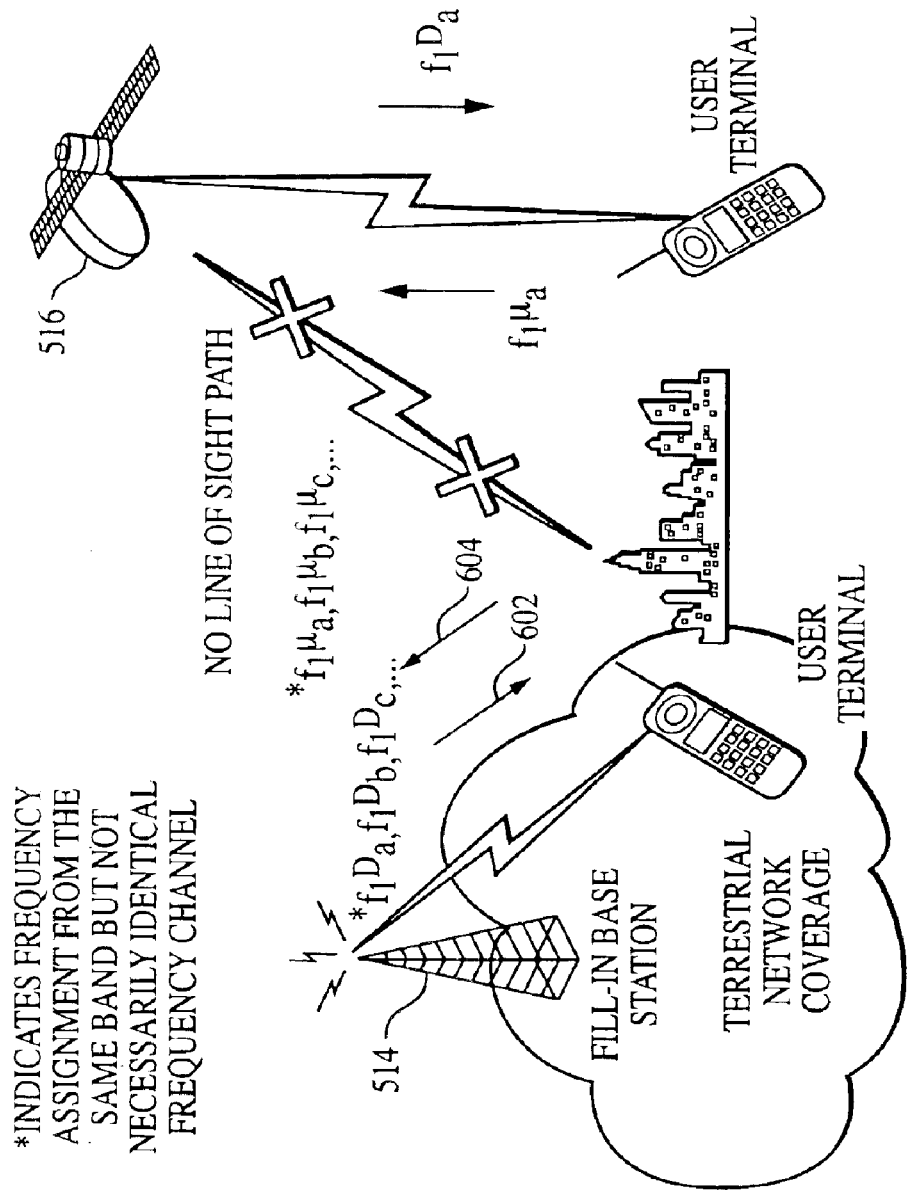
FIG. 6 is an exemplary illustration of how a base station can enhance network coverage, particularly in an area having no line of sight path (or reduced line of sight path) with a satellite.

FIG. 6 is an exemplary BTS 514 frequency plan. The nomenclature is provided as follows:

$f^U_{1a}$ and $f^D_{1a}$ superscripts U and D indicate uplink and downlink, respectively;

the numeric subscript (e.g., 1) indicates the frequency band; and the letter subscript (e.g., a) indicates the frequency channel within the frequency band.

The satellite frequency band generally comprises uplink and downlink frequencies, each of which in turn generally comprise a range of separated frequencies (e.g., 1626.5–1660.5 MHz for uplink, and 1525–1559 MHz for downlink). The present invention is not limited, however, to sharing frequencies within a single frequency band assigned and/or designated by, for example, a government regulatory agency. The present system may also therefore, share and/or reuse frequencies of other domestic, foreign, and/or international satellite and/or terrestrial systems, subject to, for example, national, foreign, and/or international government regulatory approval. In addition, as defined in connection with the present invention, a frequency comprises any set of frequencies that have been associated with a particular frequency band, and is not limited to a consecutive set or series of frequencies within a band. Further, a frequency band in alternative embodiments may comprise a logical set of frequencies that may be assigned to different communication systems, carriers, or in other predesignated frequency bands. That is, for example, a frequency band in the present invention may include frequencies that are assigned to other frequency bands, for example, for different purposes.

Conventionally, users communicating on uplink 604 and downlink 602 would use, for example, paired uplink and downlink channels $f^U_{1a}$ and $f^D_{1a}$, $f^U_{2a}$ and $f^D_{2a}$, $f^U_{3a}$ and $f^D_{3a}$, etc. Advantageously, in the present invention, different channels within the same frequency band are optionally assigned, reused and/or reassigned in a non-pairwise manner. For example, downlink 602 could be using $f^D_{1a}$, whereas uplink 604 could be using $f^U_{1b}$. Similarly, downlink 602 could be using $f^D_{1c}$ whereas uplink 604 could be using $f^U_{1d}$. These pairings are illustrative only, insofar as numerous other non-pairwise uplink 604 and downlink 602 combinations are available that can be used, for example, within different terrestrial cells within subareas, within different subareas of a spot beam, and/or between different spot beams.

Further, suppose that $f^U_{2a}$ and $f^D_{2a}$ are the uplink and downlink frequency bands associated with a second domestic or foreign satellite system. Users of system 500 communicating on downlink 602 and uplink 604 could use, for example, uplink and downlink frequencies $f^U_{1a}$ and $f^D_{2a}$, $f^U_{1c}$ and $f^D_{2b}$, $f^U_{1b}$ and $f^D_{2c}$, etc. In general, the present invention optionally uses one or more uplink and downlink channels that are from different frequency bands and/or associated with a different domestic and/or foreign satellite system.

Figure 7:
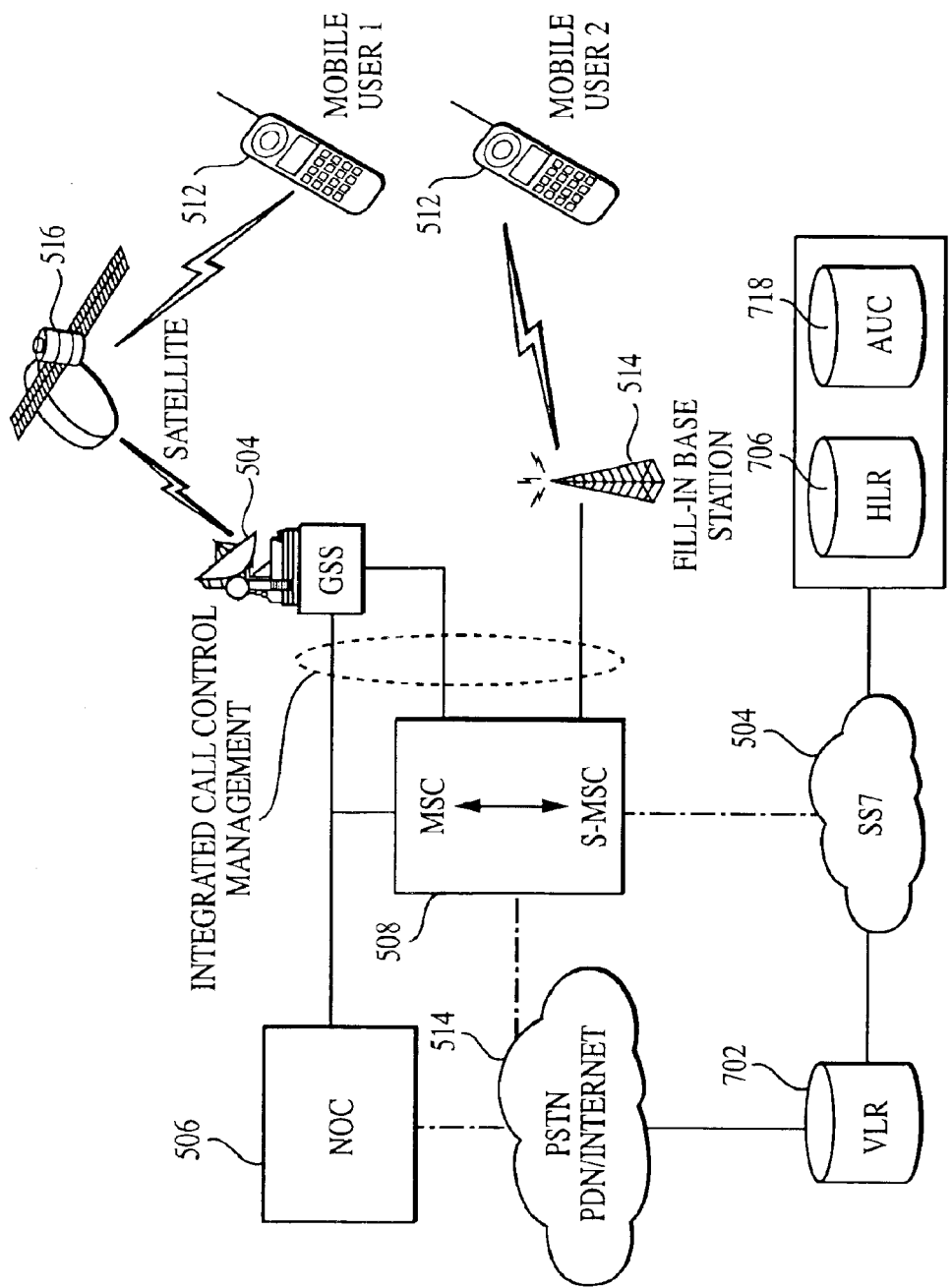
FIG. 7 is an exemplary high level block diagram illustrating an integrated satellite-terrestrial system that can use and/or be used to produce the frequency reuse schemes in accordance with the present invention.

FIG. 7 is an exemplary high level block diagram of a GSM system that can use the frequency reuse schemes in accordance with the present invention. As previously noted, the present invention is not limited to use with a GSM system, and can be deployed with all satellite (e.g., LEO, MEO, GEO, etc.) and cellular terrestrial technologies (e.g., TDMA, CDMA, GSM, etc.).

An exemplary Home Location Register (HLR) 706 comprises a database that stores information pertaining to the subscribers belonging to the coverage area of a MSC 508. The HLR 706 also stores the current location of these subscribers and the services to which they have access. In an exemplary embodiment, the location of the subscriber corresponds to the SS7 704 address of the Visitor Location Register (VLR) 702 associated to the subscriber terminal 512.

An exemplary VLR 702 contains information from a subscriber's HLR 706 in order to provide the subscribed services to visiting users. When a subscriber enters the covering area of a new MSC 508, the VLR 702 associated with this MSC 508 will request information about the new subscriber to its corresponding HLR 706. The VLR 702 will then have enough information in order to ensure the subscribed services without needing to ask the HLR 706 each time a communication is established. The VLR 702 is optionally implemented together with a MSC 508, so the area under control of the MSC 508 is also the area under control of the VLR 702.

The Authentication Center (AUC) 708 register is used for security purposes, and generally provides the parameters needed for authentication and encryption functions. These parameters help to verify the user's identity. Terrestrial cells 816 can also be positioned so that they cover at least a portion of two or more spot beams (e.g., 802, 804) and/or two or more subareas (e.g., 820, 822).

Figure 8A:
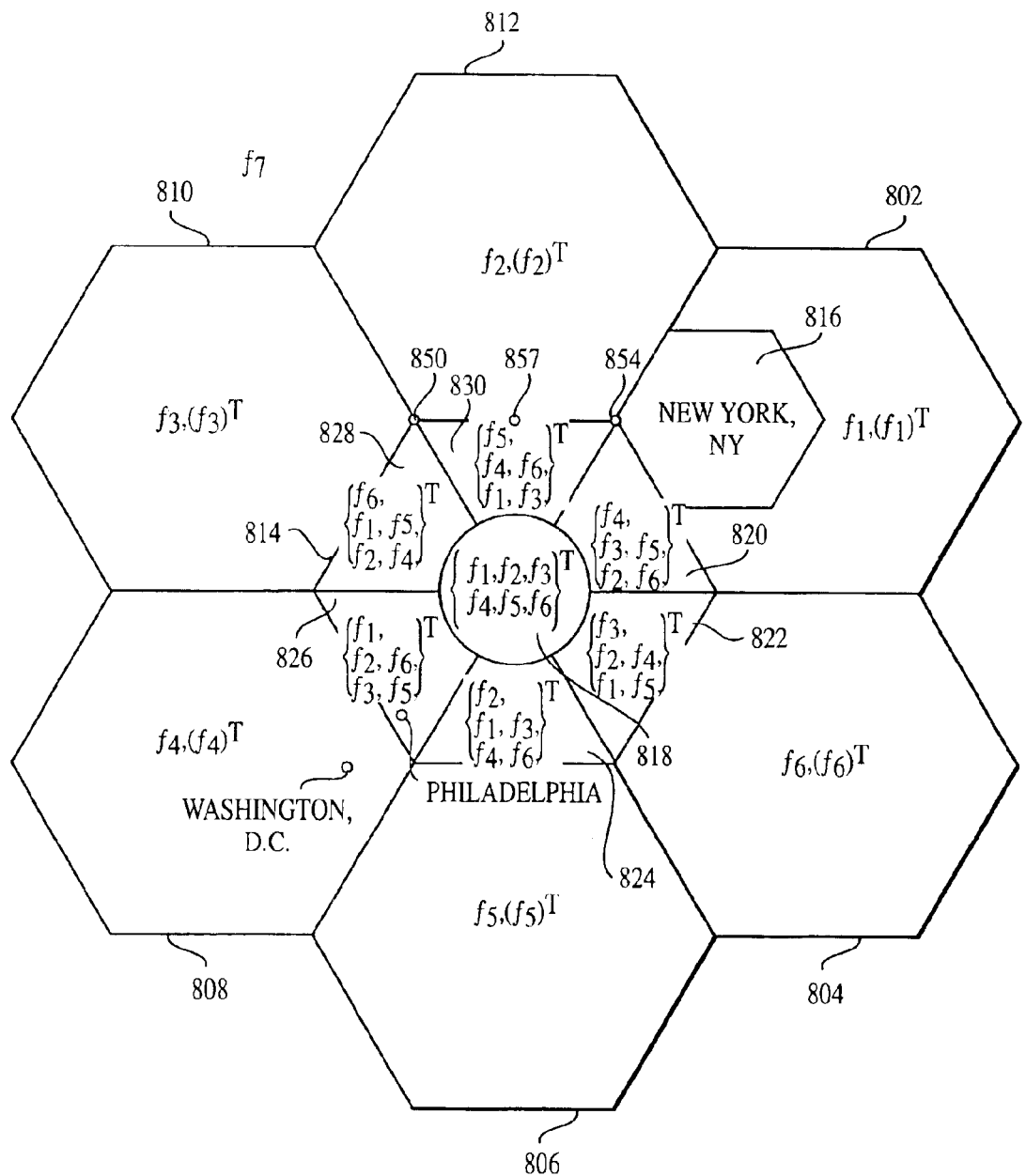
FIG. 8a shows a first exemplary embodiment of frequency reuse within a spot beam where frequencies from any or all surrounding spot beams can be reused in a substantially central portion thereof.

FIG. 8a shows a first exemplary embodiment of a frequency sharing and/or reuse scheme in accordance with the present invention. Generally, the capacity of a satellite network utilizing spot beams is directly proportional to the number of times a cluster of spot beams is replicated. Although FIG. 8a shows a cluster size N of seven (7) (i.e., seven spot beams) (802, 804, 806, 808, 810, 812, 814), the present invention can equally be practiced with other cluster sizes or numbers. FIG. 8a does not show the terrestrial system underlaying each of the respective spot beams (802–812), each of which will typically include at least one terrestrial cell 816.

The FIG. 8a embodiment advantageously enhances spectrum usage by allocating at least a portion of the spectrum of, for example, at least a first satellite spot beam (e.g., 802–812) to an underlay terrestrial system associated with or having overlapping coverage with, for example, at least a second satellite spot beam (e.g., 814), while minimizing interference between each of the respective satellite and terrestrial systems that reuse and/or share a portion of the spectrum. The present invention may optionally apply to any combination of systems having overlapping coverage, including terrestrial-terrestrial systems and/or satellite-satellite systems.

With regard to spot beams 802–814, a superscript T represents a terrestrial system, and the frequencies without a superscript T represent satellite systems. As shown, the terrestrial frequency sets (designated by $(f_3, f_2, f_4, f_1, f_5)^T$, etc.) associated with the spot beam 814 use, are assigned, or reuse in various combinations, $f_1, f_2, f_3, f_4, f_5,$ and/or $f_6$. For purposes of explaining at least one aspect of the present invention, it is assumed that each spot beam has a frequency set containing nine (9) 200 kHz channels $f_i=\{q_{i,1},q_{i,2},q_{i,3}, \ldots, q_{i,9}\}$ for i=1 ... 7), as discussed with reference to FIG. 5. Other quantities of channels and/or associated bandwidths thereof may optionally be used. It is also assumed that there is a spot beam to adjacent spot beam average isolation of, for example, 10 dB, although the present invention is also compatible with, or applies to, different spot beam isolations.

In this configuration, each spot beam (802–814) is assigned a set of frequencies that will be used exclusively by, or substantially used by or assigned to, the satellite network $f_i$. Likewise, the terrestrial network in each spot beam uses a set of frequencies exclusive to, or substantially used by or assigned to, the terrestrial network $(\bar{f}_i)^T$. For example, the satellite frequencies used in the center spot beam 814 is $f_7$, and the terrestrial frequencies in this spot beam can include all other frequency sets $\{f_1, f_2, f_3, \ldots, f_6\}=(\bar{f}_7)^T$. That is, the channels used by center spot beam 814 are preferably not used by the underlay terrestrial system associated with the spot beam 814. In this manner, the different channels are preferably allocated among the various spot beams (802–814) and associated underlay terrestrial systems such that any interference between them is minimized. Note that in this configuration the entire spectral allocation is shared or substantially shared between the satellite network and the terrestrial network in each of the seven spot beams 802–814, although other sharing or overlapping coverages are optionally used. Further, while center spot beam 814 has been designated in this embodiment, other spot beams that are not directly center to the spot beam/terrestrial coverage may be selected alternatively.

Spot beam 814 generally comprises two areas. The first is an area 818 generally central to spot beam 814, where channels from any or all of spot beams adjacent to spot beam 814 (i.e., spot beams 802, 804, 806, 808, 810 and/or 812) can be assigned, borrowed, and/or reused terrestrially. The second area comprises subareas 820, 822, 824, 826, 828, and 830. As shown in FIG. 8a, in areas 820–830, all frequencies can be assigned, borrowed, and/or reused terrestrially, but preferably not those frequencies used in an adjacent spot beam. For example, in subarea 822, channels associated with spot beams 810, 808, 812, 806, and 802 can be reused terrestrially. However, as previously noted, channels associated with spot beam 804 are preferably not used in subarea 822, or any terrestrial cells within subarea 822.

If, as previously assumed, each spot beam 802–814 has, for example, nine (200 kHz) channels associated therewith, there would be sixty three channels that could potentially be assigned, reallocated and/or reused between the satellite and/or the respective underlay terrestrial systems. The satellite 516 may use, for example, nine (9) of the channels per spot beam of the 7 cell reuse pattern, and the remaining fifty four (54) channels could therefore be allocated to the respective underlay terrestrial systems associated with the spot beams (802–814). Therefore, each spot beam subarea (820–830), excluding central area 818, will have 45 terrestrial channels available. Other division of channels may also be used.

For example, consider subarea 820. Since each of $f_2$, $f_3$, $f_4$, $f_5$ and $f_6$ has 9 channels, 45 terrestrial channels are thus available in subarea 820. Similarly, 45 channels are also available within subareas 822–830. It should be understood that this example is illustrative, and not limiting, insofar as the present invention generally works regardless of how many spot beams there are or how many channels there are per satellite coverage area and/or terrestrial coverage area.

Careful frequency planning can help to reduce interference through maximizing satellite-terrestrial frequency reuse distance. To demonstrate this concept, again consider a terrestrial network in the center spot beam in FIG. 8a. Suppose again that the terrestrial network has 45 available RF channels for reuse. Any satellite frequency sets that do not include channels associated with spot beam 814 can be used in the terrestrial network to provide adjacent beam isolation.

However, a random selection from the pool of 54 frequencies available for terrestrial use may result in areas where the distance between the terrestrial frequencies and satellite frequencies used in the adjacent spot beams is not substantially maximized. Selective assignment of terrestrial frequencies to the immediate area adjacent to each spot beam in accordance with the present invention can result in increased satellite-terrestrial channel reuse distance.

FIG. 8a shows an exemplary terrestrial frequency allocation that results in increased and possible substantially maximum terrestrial-satellite frequency distance. As shown, in each subarea (820, 822, 824, 826, 828, 830), the terrestrial frequency sets have been selected in order to maximize the frequency reuse distance from the satellite frequency sets in adjacent spot beams.

For example, with regard to subarea 820, spot beam 808, having assigned frequency set $f_4$, is the farthest away. The spot beams with next largest distance are 810 and 806, having the assigned satellite frequency sets $f_3$, and $f_5$, respectively. Finally, spot beams 802 and 804 have the assigned frequency sets $f_2$ and $f_6$, respectively. In general, the terrestrial network within each spot beam is preferably sectioned in the same way that has been done for spot beam 814.

With regard to frequency channels associated with spot beams 812 and 808 (and spot beams 802 and 806), frequency channels from spot beam 812 and 808 can be reused in subarea 822 in either order, or even randomly, since they are each substantially equidistant from subarea 822. Similarly, frequency channels from spot beams 812 and 808 can be used alternately (e.g., reusing a channel from spot beam 808, reusing a spot beam from channel 812, and repeating), or even randomly. The order in which frequency channels can be reused and/or reassigned, therefore, is virtually infinite.

Spot beams 802–814 can be positioned to cover predetermined areas. One or more spot beams 802–814 can also be dynamically configured/reconfigured to cover an area based on, for example, current and/or anticipated loading considerations.

As will be discussed with regard to FIGS. 14a and 14b, increasing terrestrial cluster size within a satellite spot beam can also be utilized to decrease co-channel interference.

In general, it is therefore preferred that the separation between the terrestrial channels and the satellite channels be maximized which, in turn, generally, tends to minimize the interference between adjacent spot beams (e.g., 802 and 804) and adjacent subareas (e.g., 820 and 822). However, even when these objectives are accomplished, the transmissions by the terrestrial network(s) will generally, to a certain extent and depending on the local attenuation, be "heard" by the associated satellite. Therefore, as shown in FIG. 8a, frequency reuse planning must be carefully done preferably along adjacent spot beam boundaries (e.g., 802 and 804) to ensure that interferences are minimized.

As described above, the present invention generally utilizes the inter-spot beam isolation (e.g., the isolation between the various spot beams), to reduce interference. In other words, an exemplary embodiment of the present invention takes the co-channel, co-beam and "transfers" it to co-channel, adjacent beam interference.

Within each spot beam (e.g., 802–814), the use of satellite frequencies by the terrestrial network results in co-channel/adjacent-beam interference. To utilize the isolation rendered by the availability of the spot beams, satellite terrestrial frequency reuse should preferably be implemented on adjacent spot beams. The resulting co-channel/adjacent beam interference will generally be approximately reduced by the spot beam to adjacent spot beam isolation factor. It should be noted, however, that in a cluster of, for example, seven spot beams, as shown in FIG. 8a, each spot beam 802–812 has six adjacent spot beams that can contribute to the interference received. The advantage of co-channel/adjacent beam technique over co-channel/co-beam technique lay with the fact that not all spot beams have equal service demand. Consequently, the distribution of interference between adjacent spot beams can reduce the average interference in a high service demand beam. Any energy that is being generated by the spot beam channels within a 814 spot beam (e.g., 814) can be attenuated by the antenna pattern of the spot beam 814 satellite.

The frequency reuse scheme in accordance with the present invention therefore enables the total frequency band to be efficiently allocated (e.g., based on demand) between the terrestrial and satellite systems within each of the seven spot beams (802–814) and each of the respective terrestrial underlay systems associated therewith, while minimizing interference therebetween.

Consider FIG. 8a from a geographic perspective. As shown, New York city falls within spot beam 802, as well as terrestrial cell 816, Philadelphia falls within spot beam 814 and subarea 826, and Washington, D.C. falls within spot beam 808. Although terrestrial cells 816 can be located anywhere within the satellite spot beams (802–814), they will generally be located in, for example, metropolitan areas (e.g., New York, N.Y.) where satellite coverage may be limited due to, for example, capacity constraints or no line of sight or reduced line of sight between a subscriber terminal 512 and a satellite 516. This is one illustrative configuration, and is not intended to limit the invention in any way. If desired, spot beams 802–814, subareas 820–830, and/or terrestrial cells 816 can optionally be increased, decreased, and/or varied in number, size, and/or arrangement to yield a virtually infinite number of configurations that may be tailored to suit one or more geographic areas.

In general, the channels associated with one particular spot beam or area of coverage can be reassigned for satellite and/or terrestrial reuse in conjunction with any other spot beam or area of coverage. If one spot beam (e.g., 814) gets too congested, it can borrow and/or reuse frequency spectrum from other spot beams (e.g., 802, 804, 806, 808, 810 and/or 812) that have available capacity. The frequencies being assigned are thus preferably location dependent upon, for example, the location of the spot beam. Thus, if spot beam 802 has nine frequencies and only three of the nine frequencies are needed for satellite transmission, the remaining six frequencies can dynamically be reassigned to either another system, such as a terrestrial system or other satellite system, or to increase capacity in, for example, an adjacent (i.e., 804, 812, and/or 814) or non-adjacent (i.e., 806, 808, and/or 810) satellite spot beam.

At some point, the spot beam 808 channels that are reused terrestrially within spot beam 814 will interfere with the spot beam 808 satellite transmissions. However, any potential interference can be minimized by managing the frequency reuse and the size of these networks.

As discussed above, it is preferred that those frequencies associated with a spot beam furthest away be reused first, and that those frequencies associated with a spot beam closest (i.e., adjacent) to the spot beam which will reuse the frequency be used last. Again referring to subarea 822 and/or any terrestrial cells having at least partially overlapping coverage therewith, it is therefore preferred that channels from spot beam 810 be reused first, then channels from spot beams 808 and 812 be reused, and then channels from spot beams 802 and 806 be reused. An alternative or in addition, frequencies may be reassigned responsive to the congestion load in adjacent or nearby cells such that substantially equidistant cells are selected based on lower congestion or capacity rate, and even cells that are closer may alternatively be selected over cells that are further away based on congestion, load and/or capacity constraints.

In highly populated areas where terrestrial coverage can present great spectral efficiency over the satellite coverage, the terrestrial cell site density will be high. Accordingly, the interference generated in these cell sites will also be high. In such circumstances, it is advantageous to trade part of the satellite frequency spectrum of the spot beam (and even part of adjacent spot beams) to the terrestrial network. Such a trade off results in lower co-channel interference levels. As an example of a frequency borrowing technique, consider the example discussed in the previous section where each of the terrestrial networks have been configured with 45 RF channels and the satellite network in the corresponding spot beam has been configured with nine (9) RF channels. To reduce the interference by increasing the cluster size, three (3) channels from the satellite network can be reassigned to the terrestrial network resulting in 48 channels for reuse terrestrially and six (6) channels for the corresponding satellite spot beam.

The channels within spot beam 808, for example, can also be used as a terrestrial frequency in, for example, spot beam 814. It is preferred that the channels in spot beam 808 are used in five of the six subareas, and/or respective terrestrial cells associated therewith, of spot beam 814 (i.e., subareas 820, 822, 824, 828 and 830). As shown in FIG. 8a, it is also preferred that the channels of spot beam 808 not be used in subarea 826 (i.e., in the subarea that is contiguous with and directly adjacent to the spot beam 808). However, in alternate embodiments, depending on load and/or capacity issues, directly adjacent cells may also be utilized for frequency assignment and/or reuse.

Figure 8B:
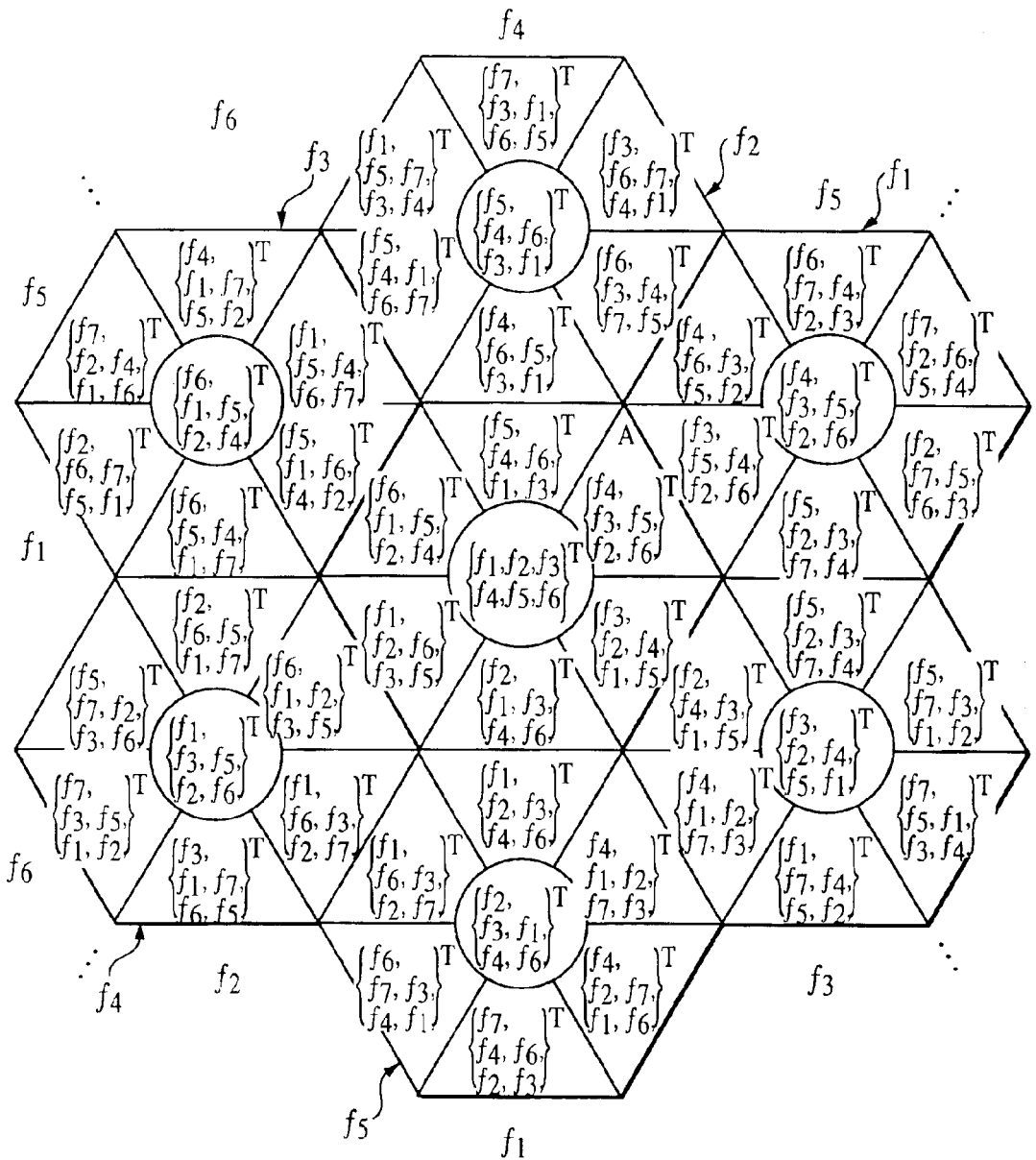
FIG. 8b shows a first exemplary embodiment of frequency reuse in a seven cell pattern.

FIG. 8b shows a first exemplary embodiment of frequency reuse in a seven cell pattern. As discussed with regard to FIG. 8a, the frequencies assigned, borrowed and/or reused are preferably taken from the spot beam furthest away from the assigned, reusing, or borrowing subarea and/or terrestrial cell(s) associated therewith.

Figure 8C:
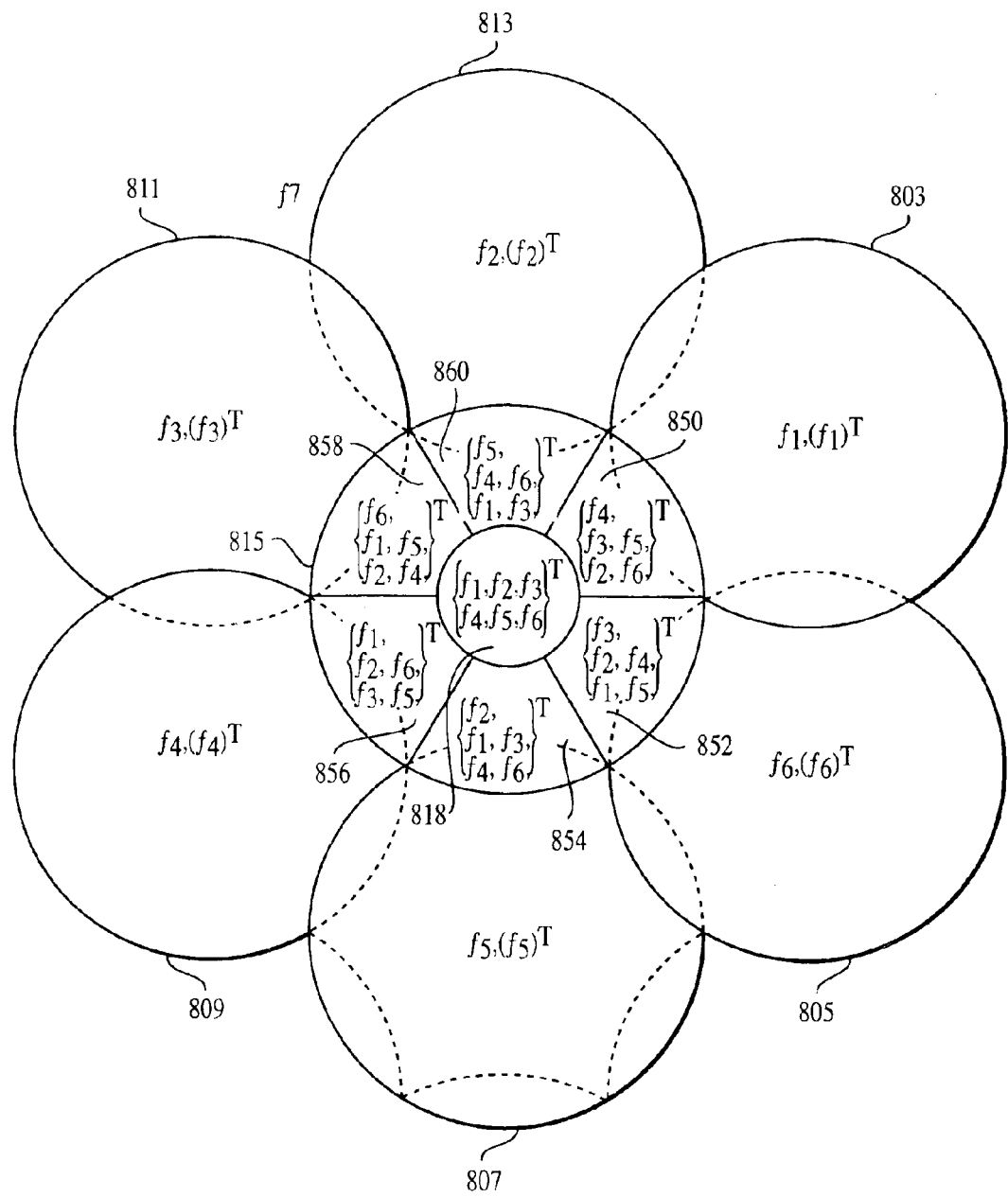
FIG. 8c shows a variation of the first exemplary embodiment wherein the spot beams are depicted as being circular.

FIG. 8c shows a variation of the first exemplary embodiment shown in FIG. 8a. In FIG. 8c, spot beams 803, 805, 807, 809, 811, 813, and 815 are depicted as being circular, and respectively correspond to spot beams 802, 804, 806, 808, 810, 812, and 814 shown in FIG. 8a. Similarly, subareas 850, 852, 854, 856, 858, and 860 respectively correspond to subareas 820, 822, 824, 826, 828, and 830 shown in FIG. 8a. In FIG. 8c, subareas 850–860 have a different shape than subareas 820–830 shown in FIG. 8a, and generally extend from the center portion 818 to the dashed line of the respective adjacent subcell that partially overlaps with the area of coverage of spot beam 815. Aspects of the present invention discussed in connection with FIG. 8a pertaining to frequency borrowing, assignment and reuse are also generally applicable to FIG. 8c.

Figure 9:
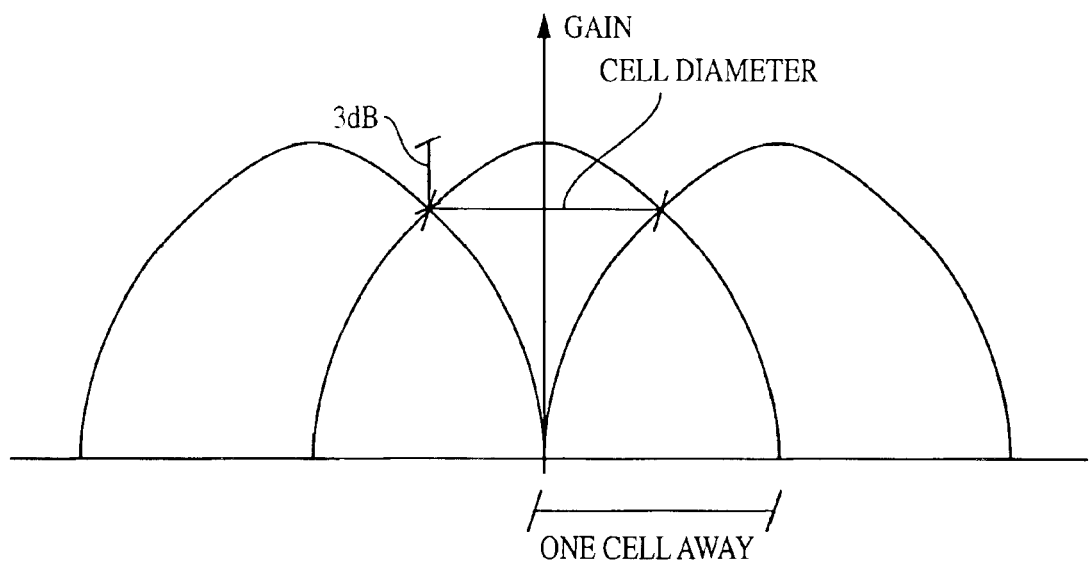
FIG. 9 illustrates an exemplary method by which spot beam size can be determined in accordance with the present invention.

FIG. 9. shows an exemplary method by which the size of satellite spot beams (802–814) can be determined. Specifically, as shown in FIG. 9, cell size (e.g., cell diameter) can be determined as being approximate to the distance corresponding to a 3 dB loss. That is, an exemplary radius of a satellite spot beam (802–814) in accordance with the present invention is preferably determined as being approximately equal to the distance over which maximum signal strength decreases by approximately 50%. Therefore, assuming that satellite 516 can generate, for example, seven spot beams having substantially equal power, the radius of each spot beam (802–814) is determined from a point of maximum gain to the points having approximately a 3 dB loss. Other signal strength decrease percentages and/or techniques for determining the size and shape of the satellite cells, and/or center areas may optionally be used.

Figure 10:
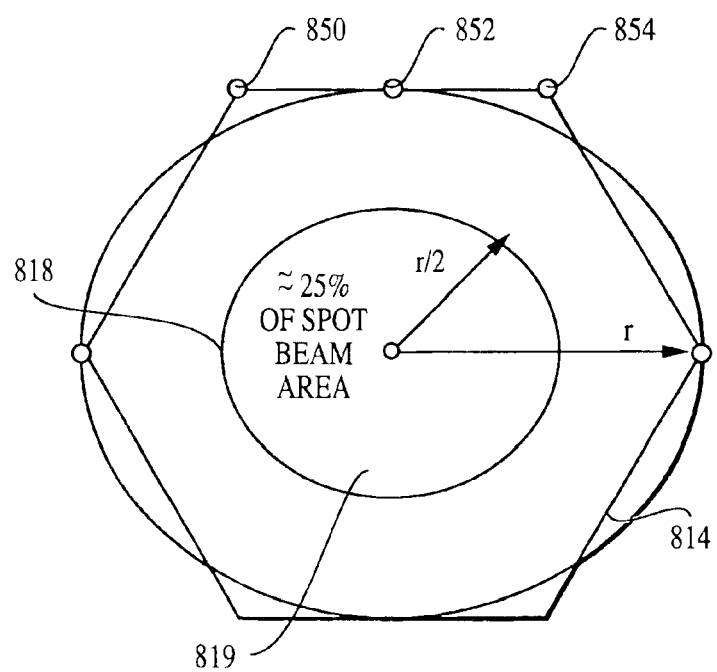
FIG. 10 shows an exemplary way of determining the size of a center area of a spot beam where frequencies from any of one or more adjacent spot beams can be reused.

FIG. 10 shows an exemplary method by which a substantially central area 818 is determined. Specifically, in accordance with the present invention, we have determined that channels from all adjacent spot beams (802–814) can be reused in an area 818 that is equal to approximately 25% of the area of spot beam 814. Insofar as an infinite number of line segments, each having a different distance and radius, can be drawn from center 819 of spot beam 814 to one of its adjacent sides (e.g., segment 850, 854), there can be an infinite number of substantially equal areas within a spot beam (802–812) where channels from all adjacent spot beams can be reused. In accordance with one embodiment, we have determined that the maximum radius will correspond to a radius extending from the center or substantially the center of spot beam 814 (at 819) to point 850 (or 854), and a minimum area will correspond to a radius extending from the center of spot beam 815 (at 819) to point 852, which bisects segment 850, 854. Other methods of determining the size and/or shape of area 818 may also be used, and area 818 may be of any shape including, for example, rectangular, hexagonal, and the like.

Figure 11A:
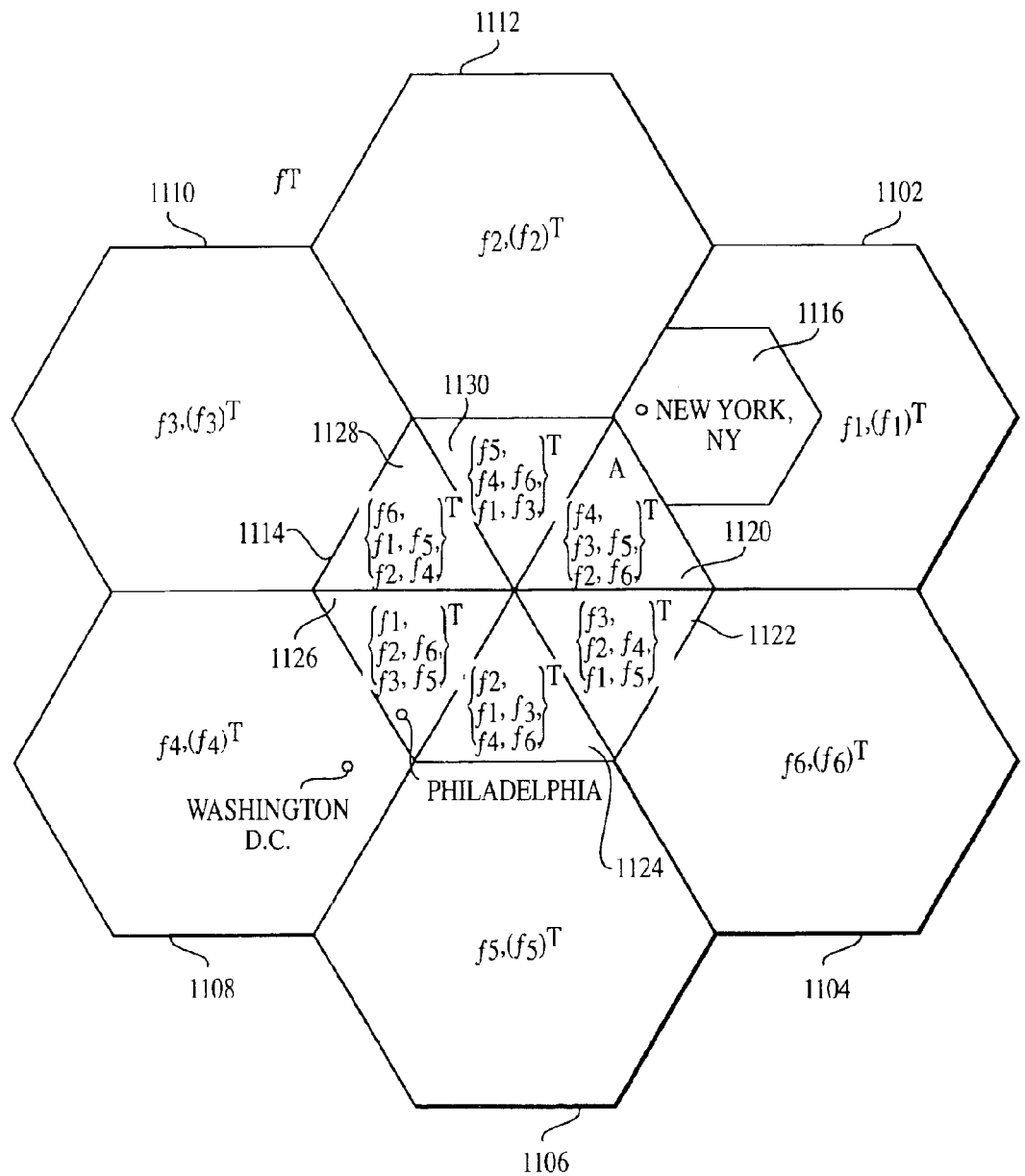
FIG. 11a shows a second exemplary embodiment of terrestrial frequency reuse within a satellite spot beam.

FIG. 11a shows a second exemplary embodiment of frequency reuse within a satellite spot beam. Although FIG. 11a differs from FIG. 8a in that FIG. 11a does not have a central area 818 as shown in FIG. 8a, terrestrial cells along the interior boundaries of spot beam 814 may nevertheless utilize all frequencies ($f_1$–$f_6$). Other aspects of the invention pertaining to, for example, frequency assignment, reuse and/or borrowing discussed in connection with the FIG. 8a embodiment are generally applicable to the embodiment shown in FIG. 11a. That is, the embodiment shown in FIG. 11a advantageously enhances spectrum usage by allocating at least a portion of the spectrum of, for example, at least a first satellite spot beam (e.g., 1102–1112) to an underlay terrestrial system preferably associated with or having overlapping coverage with, for example, at least a second satellite spot beam (e.g., 1114), while minimizing interference between each of the respective satellite and terrestrial systems that reuse and/or share a portion of the spectrum. FIG. 11a may also optionally apply to any combination of systems having overlapping coverage, including terrestrial-terrestrial systems and/or satellite-satellite systems. In addition, frequencies may be reassigned responsive to the congestion load in adjacent or nearby spot beams, subareas, and/or terrestrial cells such that, for example, substantially equidistant spot beams and/or subareas are selected based on lower congestion or capacity rate, and even subareas that are closer may alternatively be selected over subareas that are further away based on congestion, load and/or capacity constraints.

Figure 11B:
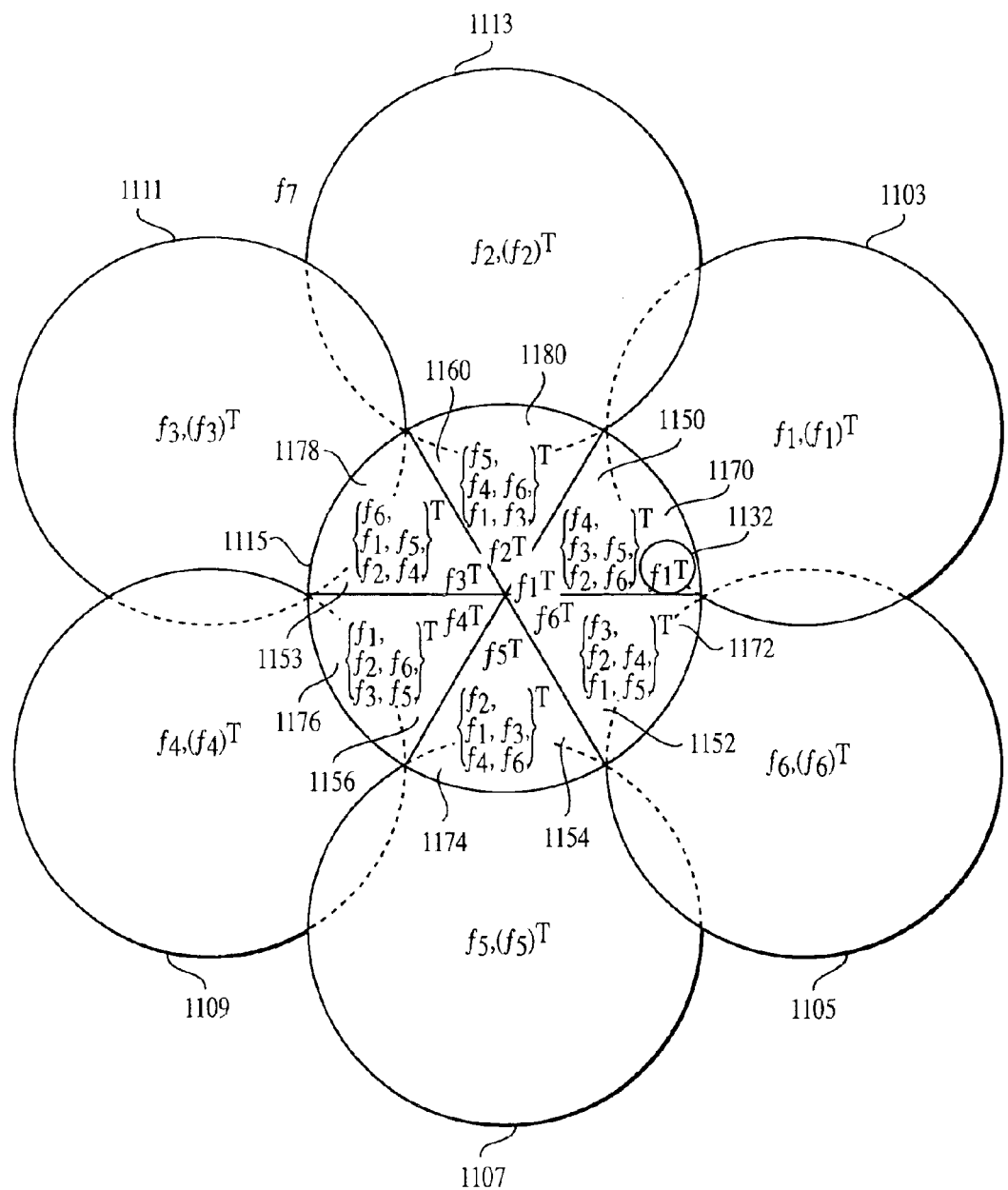
FIG. 11b shows a variation of the second exemplary embodiment wherein the spot beams are depicted as being circular.

FIG. 11b shows a variation of the second exemplary embodiment shown in FIG. 11a. Spot beams 1103, 1105, 1107, 1109, 1111, 1113, and 1115 are depicted as being circular, and respectively correspond to spot beams 1102, 1104, 1106, 1108, 1110, 1112, and 1114 shown in FIG. 11a. Similarly, subareas 1150, 1152, 1154, 1156, 1158, and 1160 respectively correspond to subareas 1120, 1122, 1124, 1126, 1128, and 1130 shown in FIG. 11a. In FIG. 11b, subareas 1150–1160 have a different shape than subareas 1120–1130 shown in FIG. 11a. In FIG. 11b, subareas generally extend from the center or substantially the center of spot beam 1115 to the dashed line of the respective adjacent subcell having partially overlapping coverage with spot beam 1115.

Further, in areas where spot beams overlap (e.g., 1170, 1172, 1174, 1176, 1178, and 1180), there may be increased interference due to the overlapping coverage of the respective spot beams. In subareas 1150–1160, all frequencies associated with adjacent spot beams 1103–1113 could be used. This could depend, for example, on the need for spectrum terrestrially and frequency separation distance. For example, in subarea 1150, although frequencies $f_4$, $f_3$, $f_5$, $f_2$ and $f_6$ are first preferably borrowed, assigned and/or reused terrestrially, f1 may also be borrowed, assigned and/or reused terrestrially. If any of the $f_1$ frequencies are borrowed, assigned or reused terrestrially in subarea 1150, it is preferred that, in order to reduce interference, they be borrowed, assigned or reused in one or more terrestrial cells near the center of spot beam 1115. However, the $f_1$ frequencies can also be used in a terrestrial cell 1132 near area 1170 but within subcell 1152. Other aspects of the present invention discussed in connection with FIG. 11a pertaining to frequency borrowing, assignment and reuse are also generally applicable to FIG. 11b.

Figure 12:
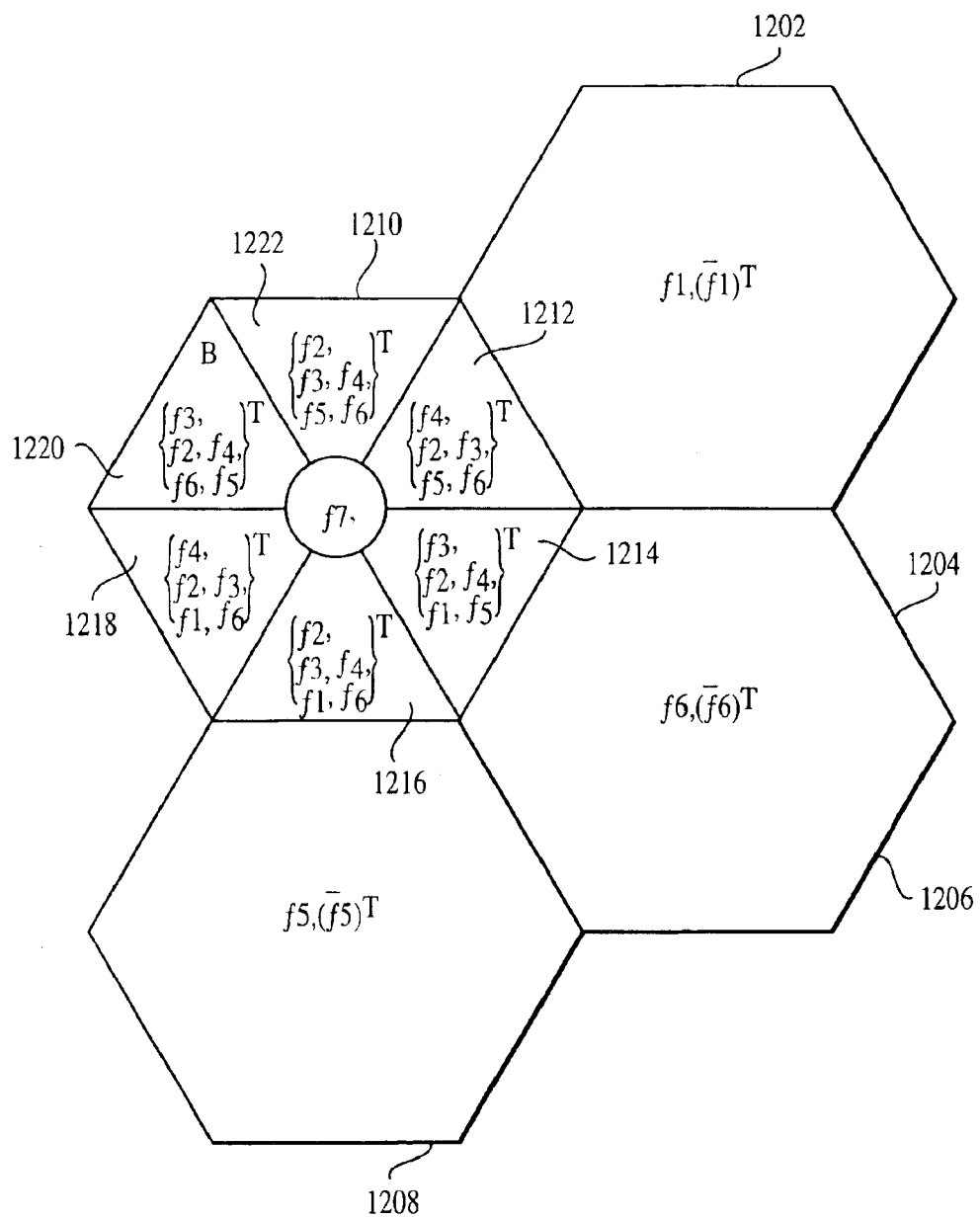
FIG. 12 shows an exemplary method by which frequencies can be allocated in an area that does not have a full complement of spot beams.

As shown in FIG. 12, satellite spot beams at the edge of the service area (1202, 1204, 1206, 1208, 1210) do not have the full complement of six neighbors. As such, the terrestrial network within the areas covered by this type of spot beams will have slightly different configuration. FIG. 12 shows an exemplary terrestrial network frequency plan for such a spot beam.

Spot beam 1210, having assigned frequency channels $f_7$, has only three adjacent spot beams 1202, 1204, 1206. Spot beams with frequency channels $f_2$, $f_3$, and $f_4$ are missing from the cluster. As a result, the $f_2$, $f_3$, and $f_4$ frequency channels can be assigned to all subareas (1212, 1214, 1216, 1218, 1220, 1222) of spot beam 1210. The remaining terrestrial frequency assignments for subareas 1212–1222 follow the procedure described above with regard to FIG. 8a, with the exception of subarea 1220. In subarea 1220, there are two choices for one frequency channel assignment, $f_5$ and $f_1$, either of which can be assigned to subarea 1220. This is because both $f_1$ and $f_5$ are equidistant from subarea 1220. Accordingly, assignment of frequencies can be based on load and/or capacity issues in the spot beams with frequencies $f_1$ and $f_5$, as well as other methods of determining which of the spot beams with frequencies $f_1$ and $f_5$ are preferred.

Figure 13:
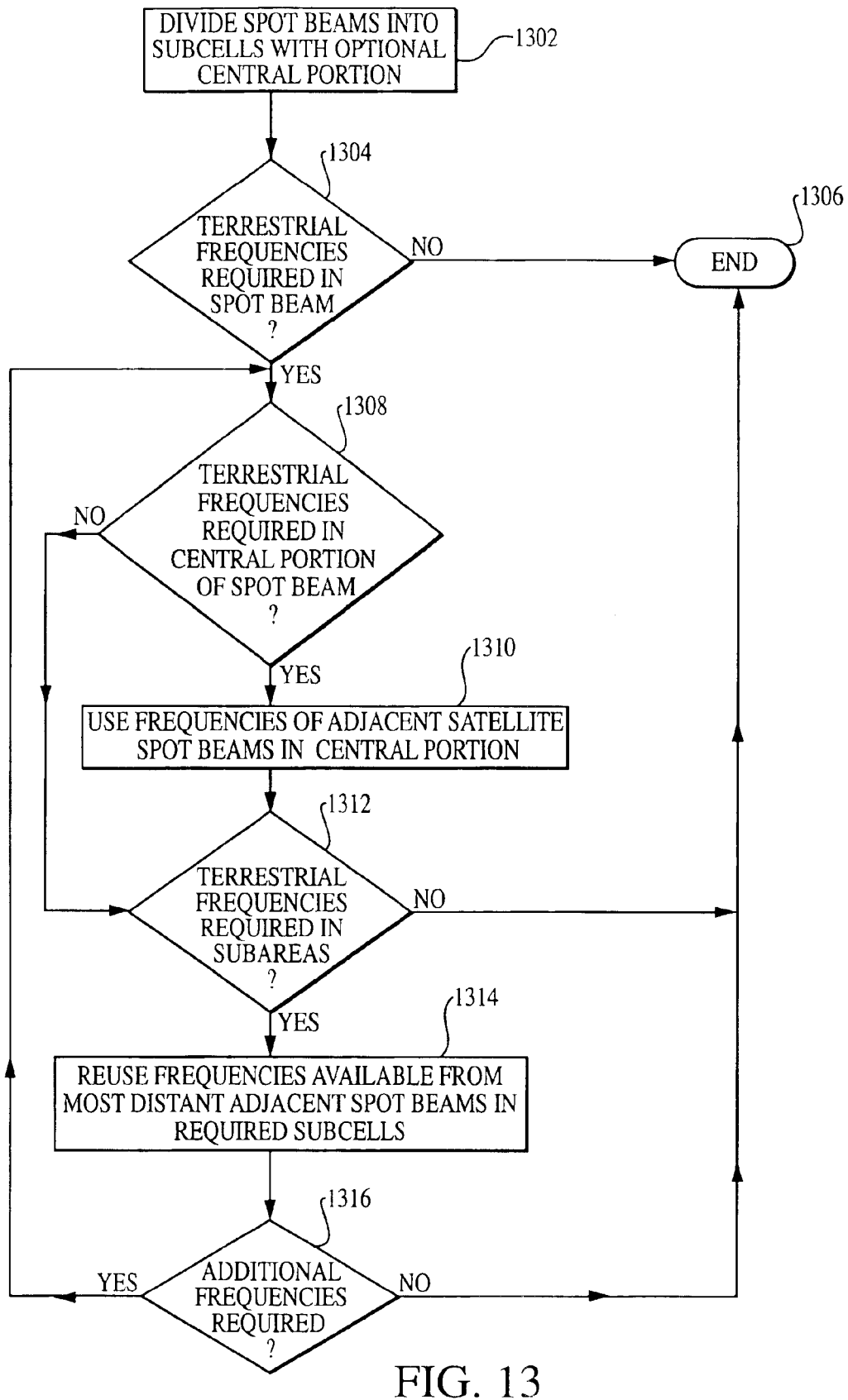
FIG. 13 is an exemplary flowchart illustrating a preferred method of reusing frequencies.

FIG. 13 is an exemplary flowchart illustrating a process of assigning and/or reusing frequencies. In step 1302, spot beams are divided into a number of subareas. Different sized and/or different shaped cells may alternatively be used. In accordance with one embodiment of the present invention, the spot beam may also have an optional central portion 818 as shown in FIG. 8a. A determination is then made at step 1304 as to whether underlay terrestrial frequencies are required in the spot beam. If not, the process ends at step 1306.

If terrestrial frequencies are required, then a determination is made at step 1308 as to whether frequencies are required in a central portion of the spot beam. If yes, then frequencies of other spot beams can be used in the central portion of the spot beam at step 1310, whereafter the method proceeds to decision step 1312. If frequencies are not required in a central portion of the spot beam, then at decision step 1312 a determination is made as to whether terrestrial frequencies are required in any of the subareas. If yes, then at step 1314 frequencies are reused from the most distant spot beams relative to each required subarea (as previously discussed with regard to and indicated in FIG. 8a). At decision step 1316, a determination is made whether additional frequencies are required. If so, the process returns to decision step 1308. If not, the process ends at step 1306.

Figure 14:
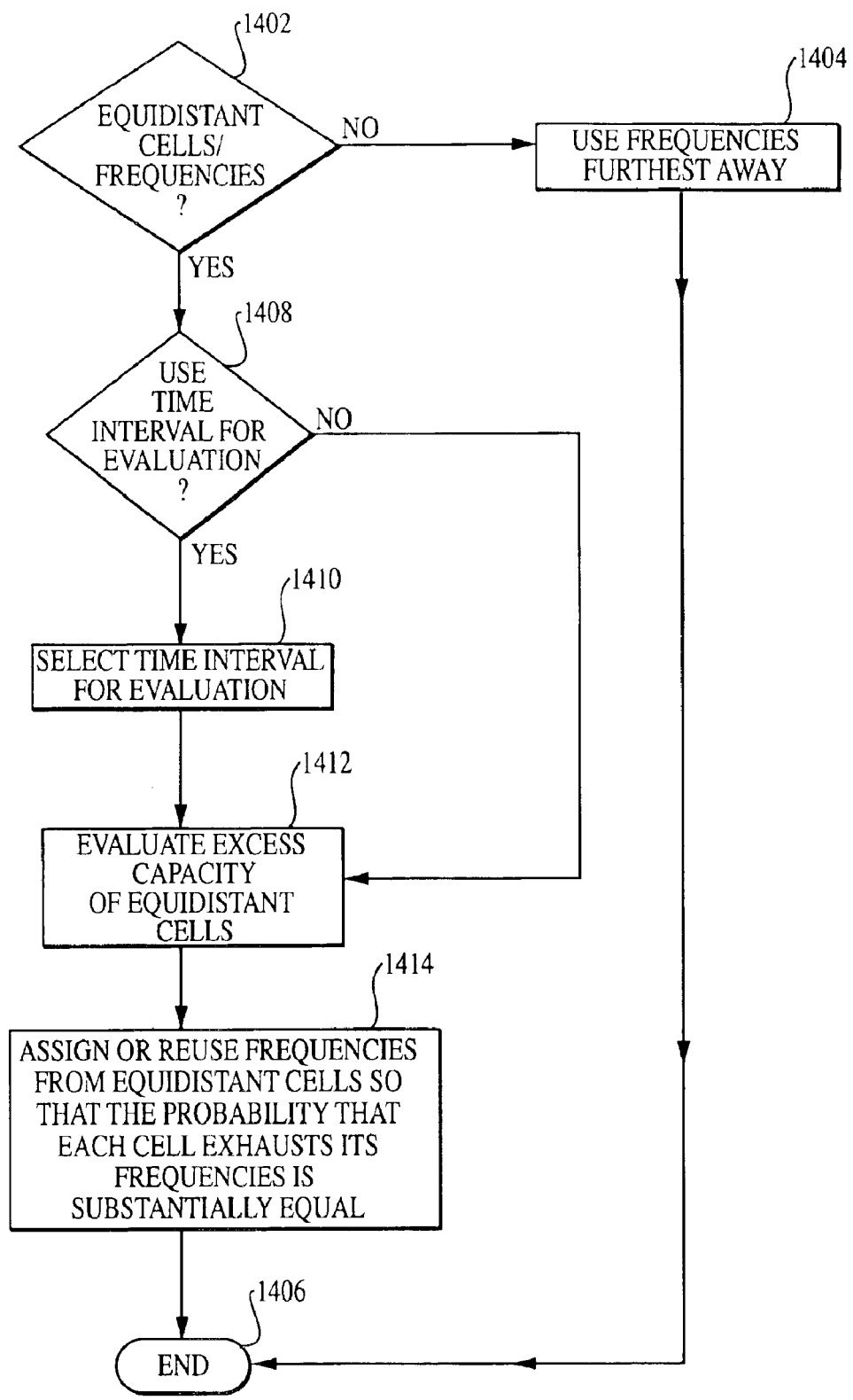
FIG. 14 is an exemplary flowchart illustrating a method by which frequencies can be assigned when they are equidistant from a cell or subarea to which they are assigned.

FIG. 14 is an exemplary flowchart illustrating a method by which frequencies can be assigned when they are equidistant from a cell or subarea to which they are assigned. At decision step 1402, a determination is made whether the cell or coverage area to which the frequencies are to be assigned, reused and/or shared is substantially equidistant from the cell or coverage area from which they are taken. If not, the frequencies associated with a cell or coverage area furthest away from the coverage area to which the frequencies are to be assigned, reused and/or shared are preferably used, as discussed with regard to FIG. 13. the process then ends at step 1406.

If the cell or coverage area to which the frequencies are to be assigned, reused and/or shared is substantially equidistant from the cell or coverage area from which they are taken, at decision step 1408 a time interval for which the frequencies can be borrowed can optionally be utilized. If a time interval is selected at decision step 1408, the time interval may consider, for example, historical usage patterns when evaluating excess capacity of equidistant cells at step 1412. For example, with regard to FIG. 12, spot beams 1202 and 1208 are equidistant from subarea 1220. If, for the time period under consideration, spot beam 1208 has a historically higher usage than spot beam 1202, frequencies can first be borrowed from spot beam 1202. Other factors such as signal to interference ratio, and signal strength can also be used in determining the order in which frequencies are assigned, reused and/or shared. If a time interval is not used, then, at step 1412, the assignment, reuse and/or sharing determination is preferably based on, for example, current loading considerations. As discussed with regard to step 1412, other factors such as signal to interference ratio, and signal strength can also be used in determining the order in which frequencies are assigned, reused and/or shared. At step 1414, frequencies are assigned, reused or borrowed such that the probability that each cell from which frequencies are taken has substantially the same probability that frequencies will not be exhausted therein. When a time interval is selected at step 1410, step 1414 will generally take into consideration historical usage, as discussed above. When a time interval is not chosen, probabilities will generally be evaluated based upon, for example, current usage.

Figure 15:
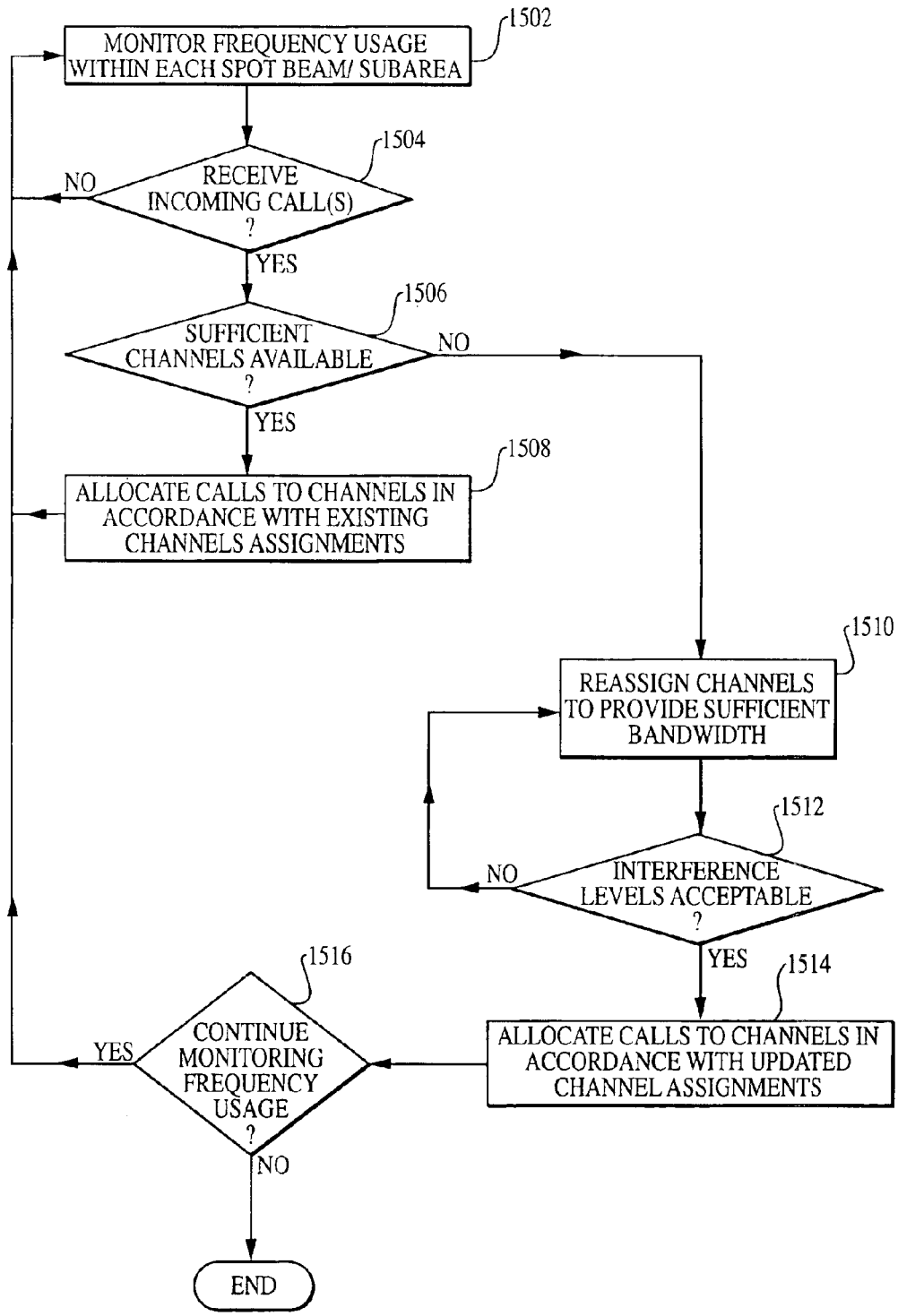
FIG. 15 is an exemplary flowchart illustrating a method by which frequencies can be dynamically assigned.

FIG. 15 is an exemplary flowchart illustrating a method by which frequencies can be dynamically assigned. At step 1502, frequency usage is monitored within each spot beam and/or subarea. When, as determined at decision step 1504 that there are incoming calls, a determination is made at decision step 1506 whether sufficient channels are available. If so, then frequencies are allocated in accordance with existing channel assignments. If sufficient channels are not available, then, at step 1510, frequencies are assigned, reused and/or shared to provide sufficient bandwidth. As discussed with regard to FIG. 14, one criteria by which frequencies can be assigned, reused and/or shared can be based on substantially equalizing the probability that each cell from which frequencies are borrowed frequencies will not be exhausted. As indicated at decision step 1512, channels can again be reassigned if, for example, interference levels are not acceptable. At step 1514, calls are allocated to channels in accordance with updated channel assignments, after which the process either returns to step 1502 or terminates, as determined at decision step 1516.

Figure 16:
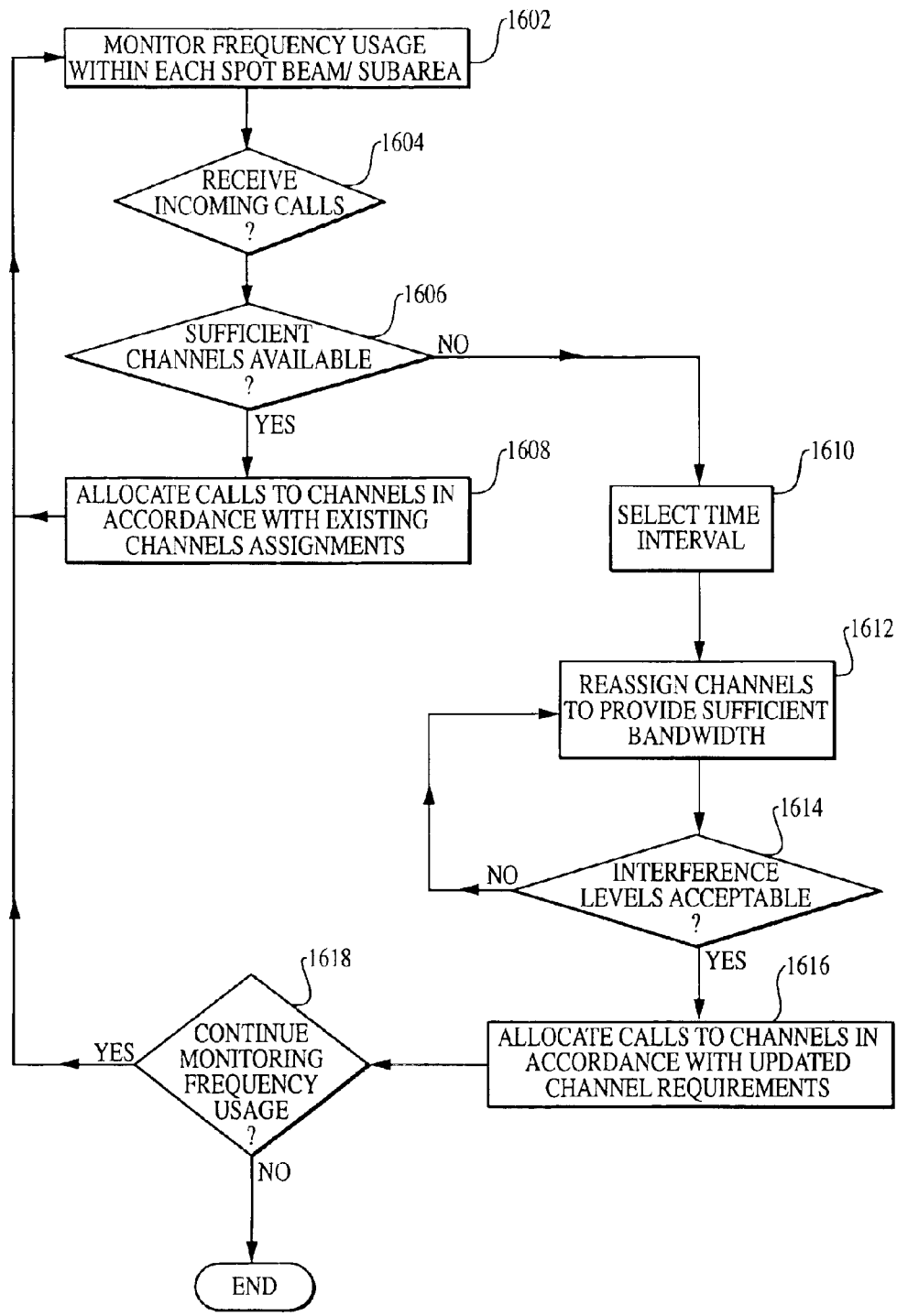
FIG. 16 is an exemplary flowchart illustrating a method by which frequencies can be preemptively reassigned based on, for example, load balancing and/or capacity issues.

FIG. 16 is an exemplary flowchart illustrating a method by which frequencies can be preemptively reassigned based on, for example, load balancing and/or capacity issues. At step 1602, frequency usage is monitored within each spot beam and/or subarea. When, as determined at decision step 1604 that there are incoming calls, a determination is made at decision step 1606 whether sufficient channels are available. If so, then at step 1608 frequencies are allocated in accordance with existing channel assignments. If sufficient channels are not available, then, at step 1610, a time interval is selected. At step 1612, and based upon the time interval selected at step 1610, frequencies are assigned, reused and/or shared to provide sufficient bandwidth. As discussed with regard to FIG. 14, one criteria by which frequencies can be assigned, reused and/or shared, based on a selected time interval, can be that of substantially equalizing the probability that each cell from which frequencies are borrowed frequencies will not be exhausted. This, in turn, can be based, for example, on historical usage patterns for the affected area(s) and/or selected time interval. As indicated at decision step 1614, channels can again be reassigned at step 1612 if, for example, interference levels are not acceptable. At step 1616, calls are allocated to channels in accordance with updated channel assignments, after which the process either returns to step 1602 or terminates, as determined at decision step 1618.

Figure 17A:
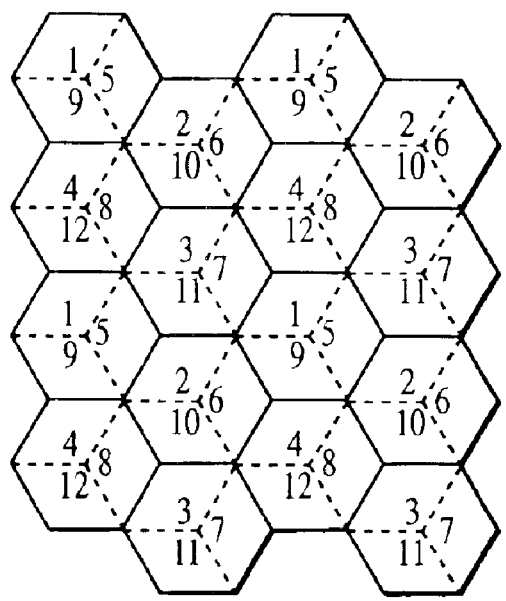
FIGS. 17a and 17b illustrate different exemplary cluster size and channel number combinations that can be used in accordance with the present invention.
Figure 17B:
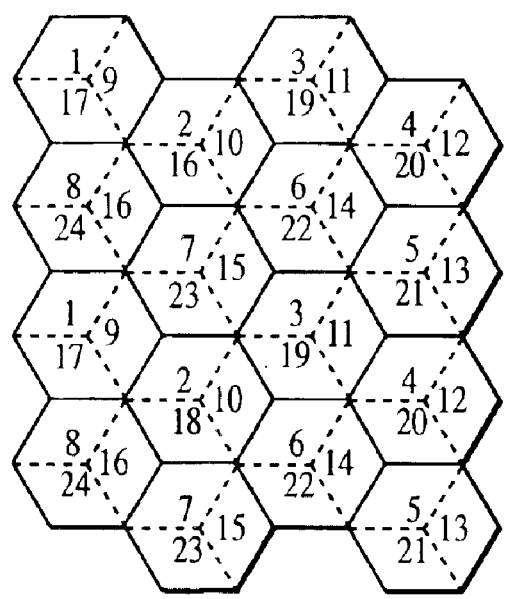

As shown in FIGS. 17a and 17b, one technique and alternative embodiment that may be practiced with the present invention is increasing the cluster size. This will generally minimize the interference between the satellite and terrestrial systems.

FIG. 17a shows a traditional GSM type of pattern of four cells with three sectors each. If instead, as shown in FIG. 17b, twenty-four channels are assigned across the cells, then one site in eight has the same frequency, as opposed to one site in four having the same frequency as with the traditional GSM pattern of FIG. 17a. Thus, the number of instances where the same frequency exists has been halved, and the amount of energy on an individual channel has also been reduced by approximately half. In this example, the interference between the satellite and terrestrial systems would be reduced by approximately 3 dB vis-à-vis the traditional GSM system.

Cross network interference occurs when a channel is utilized both in the terrestrial network and in the satellite network, either in the co-beam configuration or in the adjacent-beam configuration. The severity of such interference depends on the power received by the competing network. In particular, the terrestrial networks use or reuse an RF channel or channels many times in an area covered by a given satellite spot beam or beams. Each occurrence of this channel gives rise to increased co-channel interference for the satellite network.

In the case of the co-beam configuration, the co-channel interference can be approximated by MI, where M is the number of times a channel is reused and I is the interference power of one source. For the adjacent-beam configuration the co-channel interference from one adjacent beam can be approximated by $\alpha$MI, where $\alpha$ accounts for the fraction of power leaked from the adjacent beam. Thus, in both co-beam and adjacent beam configuration, the co-channel interference is directly proportional to the number of times a particular frequency is reused terrestrially.

Again with regard to FIGS. 17a and 17b, by increasing the cluster size for the terrestrial network, the reuse of a particular frequency is reduced. To illustrate the point, consider a terrestrial network as shown in FIG. 17a that has 12 available RF channels for reuse with a cluster size of four and three sectors per cell site. In each terrestrial cluster, the skyward energy from one sector will or may interfere with all satellite co-channels in the adjacent spot beams (in the same spot beam for co-beam configuration). FIG. 17b shows a terrestrial network with 16 cell sites (48 sectors), each RF channel is repeated four times in this network. In this same 16 site network, if twenty-four RF channels are used, for example, in a cluster of 8, then the number of co-channel sectors is reduced from 4 to 2. In general, this type of tradeoff between bandwidth and interference can be employed with the present invention to reduce co-channel interference.

Figure 18A:
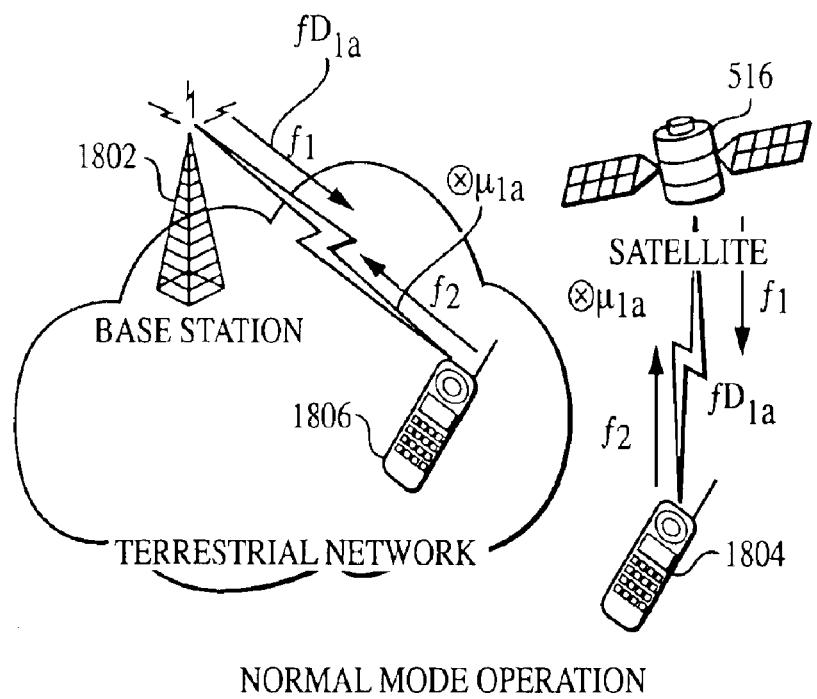
FIGS. 18a and 18b shows an exemplary aspect of the present invention pertaining to how uplink and downlink frequencies can be inverted.
Figure 18B:
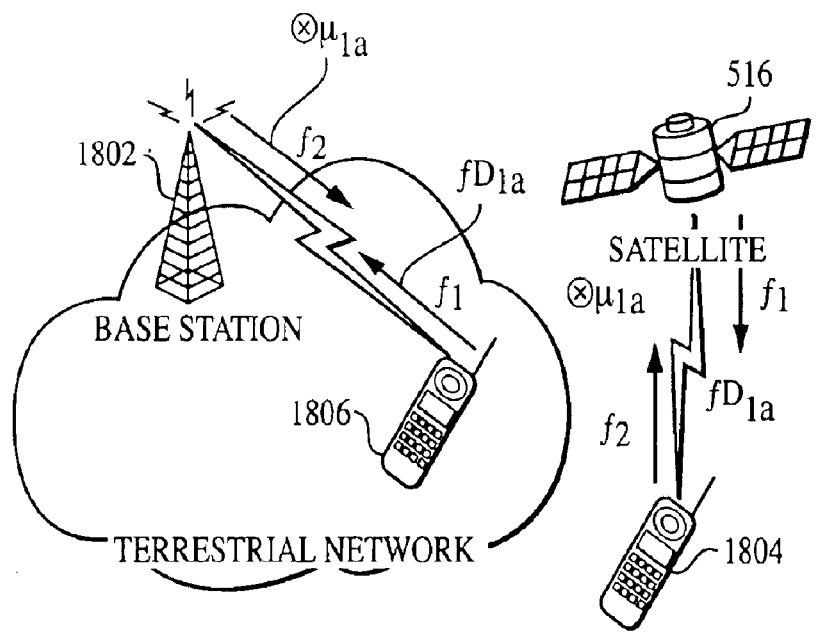
Figure 19:
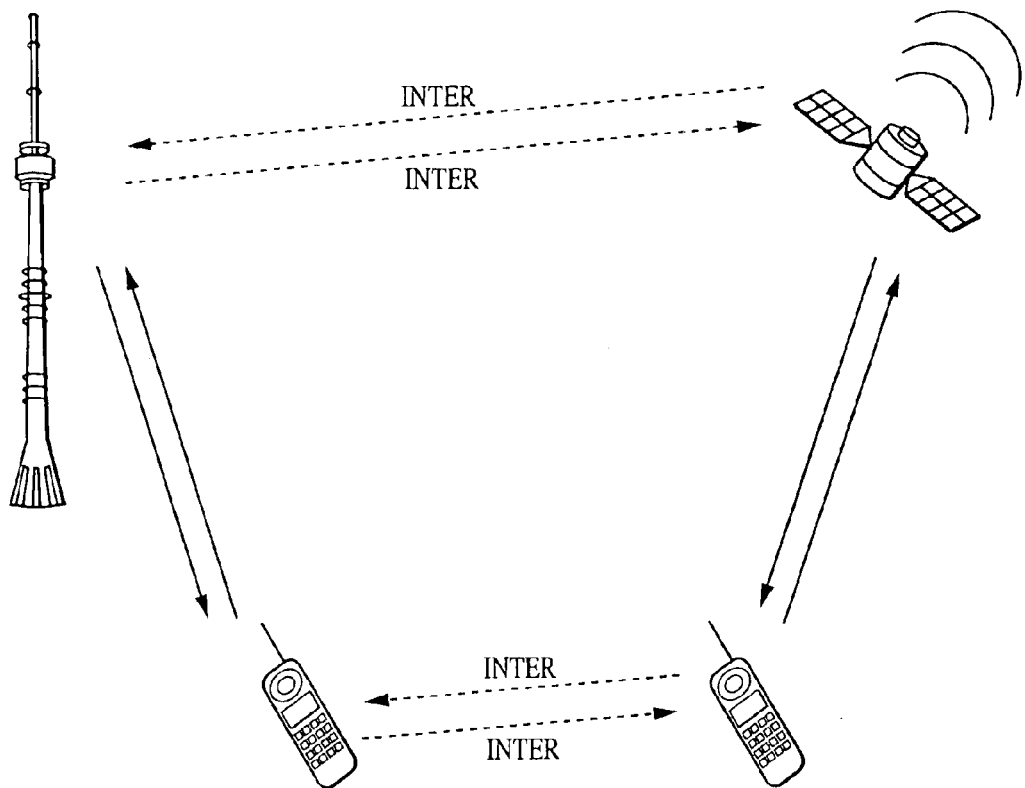
FIG. 19 shows the interference paths between the satellite, base station, and user terminals.

The frequency inversion technique, as shown in FIGS. 18a and 18b, involves reversing the satellite down-link ($F_1$) and satellite up-link ($F_2$) frequencies to become the terrestrial up-link ("return-link") and terrestrial down-link ("forward-link") frequencies, respectively. As a result, there will be two possible interference paths, as shown in FIG. 19: (1) between the satellite 516 and base stations 1802, as return-link to down-link interference on $F_1$, and as up-link to forward-link interference on $F_2$; and (2) between the satellite user terminals 1804 and terrestrial user terminals 1806, as down-link to return-link interference on $F_1$, and as forward-link to up-link interference on $F_2$. The system and method according to the present invention eliminates or substantially reduces both of these possible interferences, as will be described herein. It should be understood that the system may comprise one or more base station antennas (and associated base stations) and one or more satellites, although only one of each are shown in FIG. 19. It should also be understood that the system may comprise one or more satellite handsets and one or more base station handsets, although only one of each are shown in FIG. 19.

Figure 20:
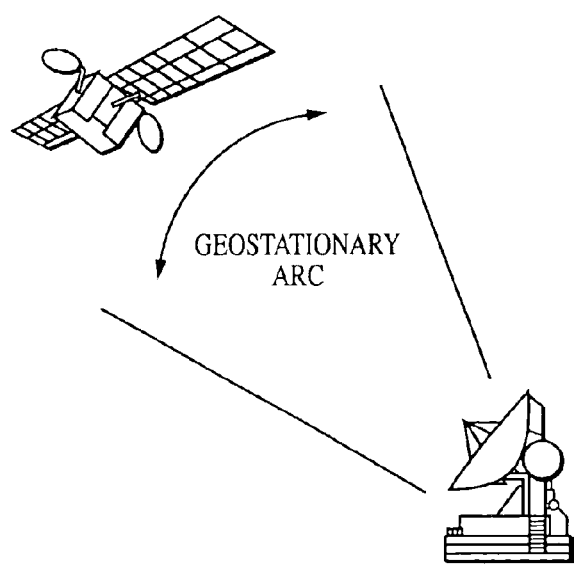
FIG. 20 shows the user of a base station antenna having a null in the geostationary arc.

As shown in FIG. 20, interference between the satellite 516 and base stations 1802 (i.e., return-link to down-link and up-link to forward-link interference) is substantially reduced or eliminated, preferably by using a base station antenna having a substantially reduced gain in the geostationary arc (i.e., the elevation angle above the horizon from a base station to the satellite). Unlike a user terminal 1804, 1806, which is mobile and may be oriented differently from user to user, a base station 1802 does not move and therefore forms a substantially fixed angular relationship with respect to the satellite. Within North America, the geostationary arc typically varies from approximately 30° to 70°, depending, for example, on the latitude of the base station. To fully take advantage of this fact, it is preferred that the base station antenna pattern have a null, and therefore significantly reduced gain, in the geostationary arc portion of its vertical pattern. As an analogy, one could consider the satellite to be in a "blind spot" with respect to the base station. The additional signal attenuation achieved from this technique substantially reduces or eliminates interference between the satellite and terrestrial base stations. This technique will facilitate terrestrial coverage and at the same time substantially reduce or eliminate interference to the satellite system.

To further enhance the performance of the system, a technique for optimally or substantially optimally locating and orienting base stations will preferably be used, to advantageously utilize the horizontal gain pattern of the antenna. The benefits of using this technique, for example, are that frequency reuse will be maximized or substantially maximized, thereby enhancing the overall capacity of the system, and further reducing or eliminating interference.

In addition to the increased isolation provided by the vertical antenna pattern, additional isolation can be obtained from the horizontal antenna pattern. For example, preferably by configuring base stations such that the azimuth to the satellite is off-bore or between sectors, several additional dB of isolation can typically be achieved. By keeping this configuration standard for, say, a cluster of base stations, frequency reuse for the terrestrial system can generally be increased.

Interference between satellite user terminals 1804 and terrestrial user terminals 1806 is typically a problem when the units are in relatively close proximity to one another. It is preferred that such interference be substantially reduced or eliminated by, for example, first detecting close proximity before the assignment of a radio channel (i.e., during call initialization), and secondly by providing a hand-off to a non-interfering channel if close proximity occurs after the assignment of a radio channel. The call initialization method shown in FIG. 21 allows for real-time or near real-time operation of this technique.

Figure 22:
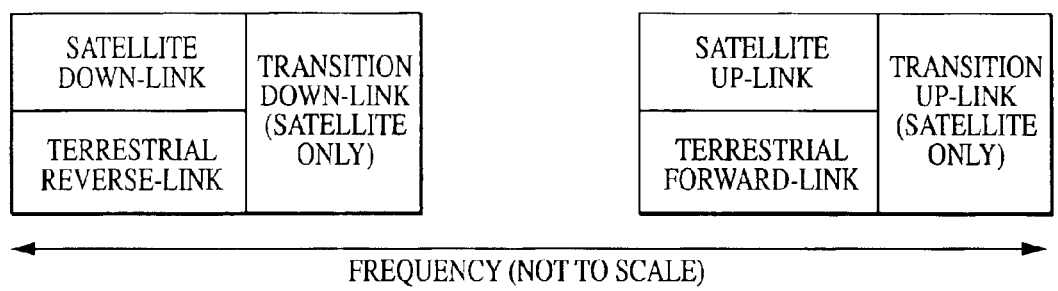
FIG. 22 shows the use of transition channels.

The technique provides optimum or substantially optimum radio resource allocation so that the coexistence of single-mode terminals (satellite mode) and dual-mode terminals can be accomplished. In order for this to work, it is preferred that a relatively small group of channels, called "transition channels", as shown in FIG. 22, be reserved for single-mode terminals. The single-mode terminals preferably use transition channels while inside base station coverage. It is also preferred that dual-mode terminals also use the transition channels under certain circumstances, as will be described in detail herein.

Figures 1, 21:
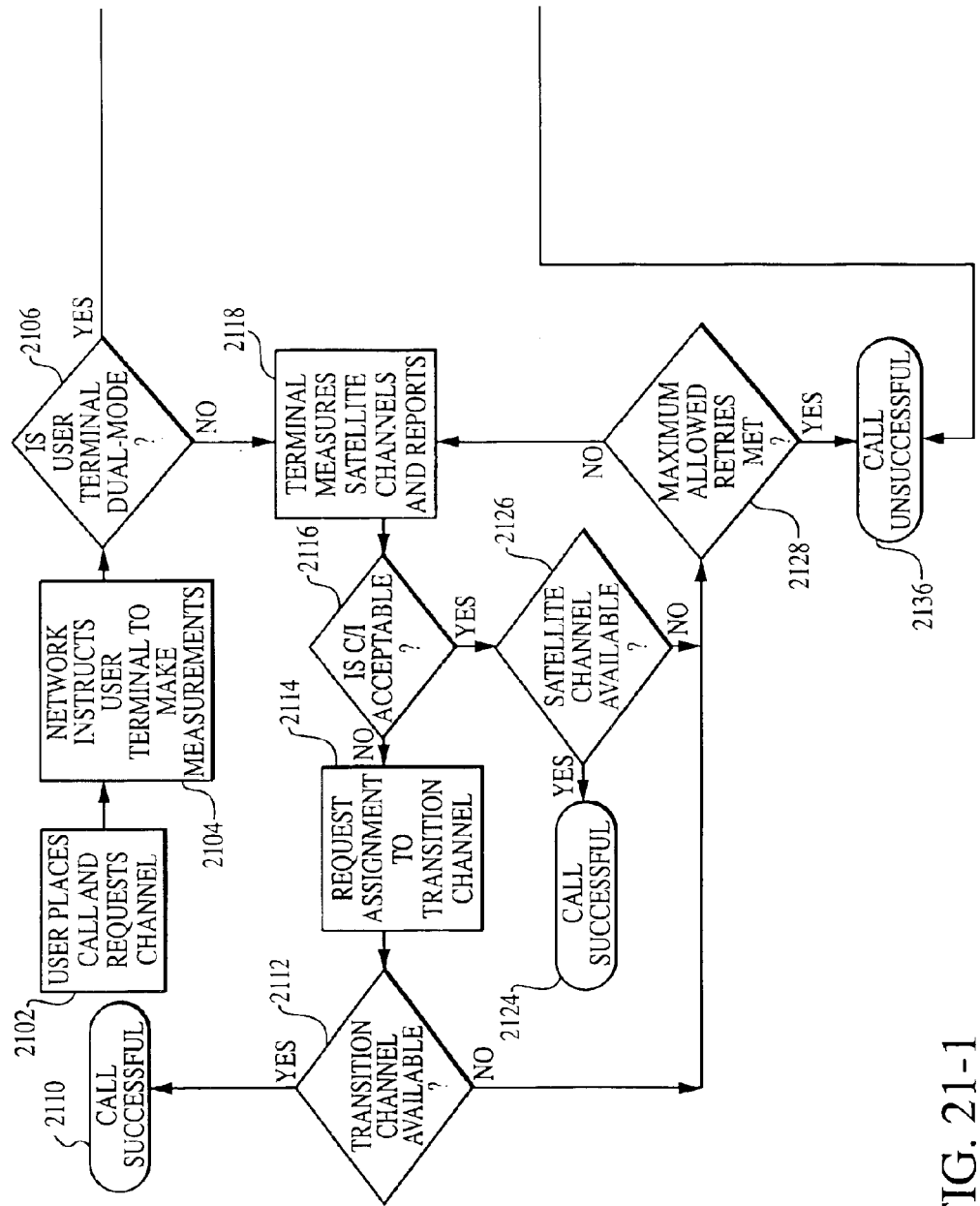
FIG. 21 shows an exemplary method of call initialization.
Figures 2, 21:
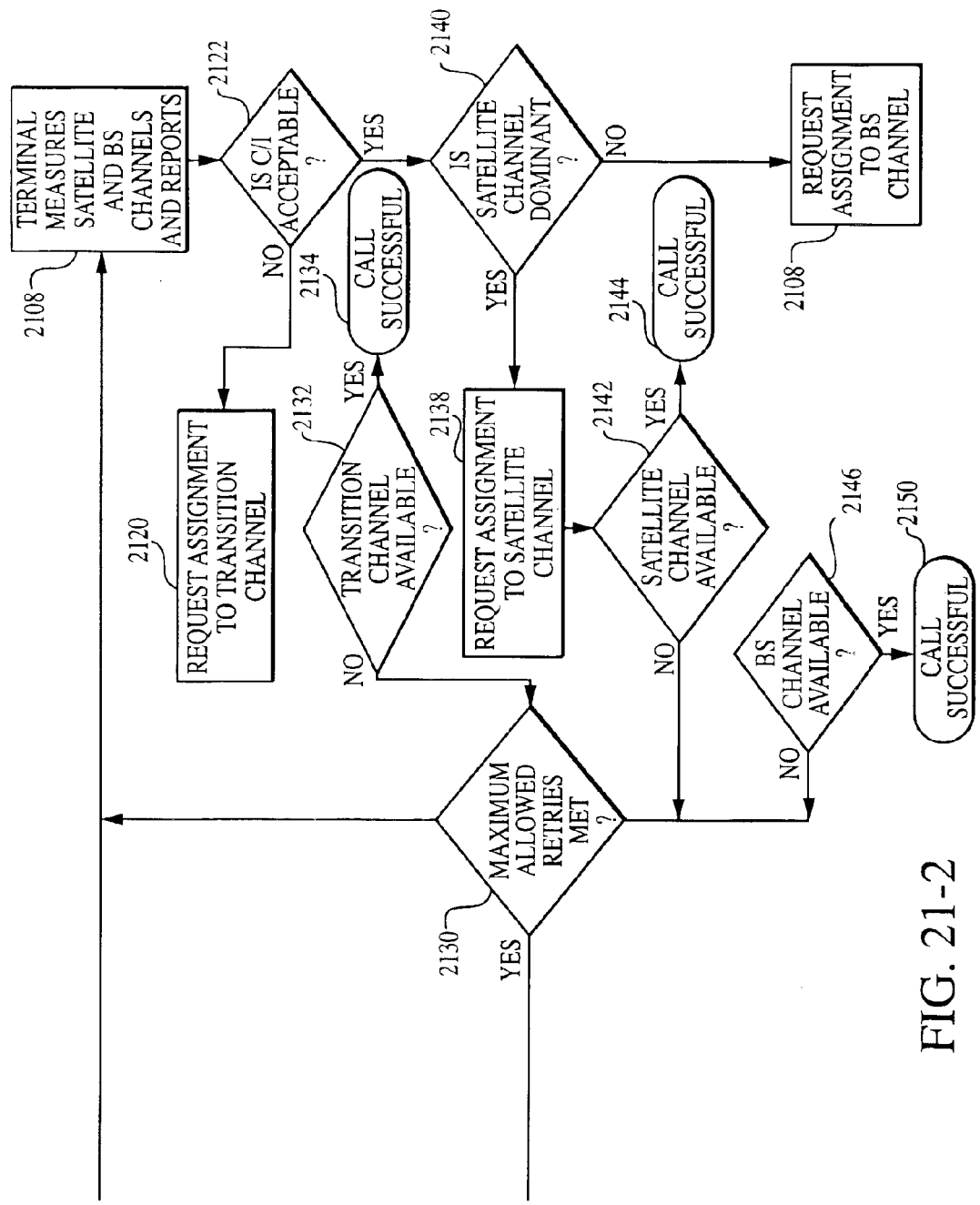

As shown in FIG. 21, when a user places a call at step 2102, the user terminal will request a traffic channel from the network. It is preferred that, at step 2104, the network instruct the terminal to make a series of measurements. If the terminal is single-mode, as determined at decision step 2106, it will, at step 2118, preferably scan satellite channels for signal strength and interference. If interference levels are acceptable, as determined at decision step 2116, and if a satellite channel is available, as determined at decision step 2126, then the terminal will preferably be assigned that channel at step 2124. If a satellite channel is not available, the terminal will preferably retry a fixed number of times, as determined at decision step 2128, starting from the measurements, before the call is determined to be unsuccessful at step 2136. If interference levels are unacceptable, the terminal will preferably request a transition channel at step 2114. If a transition channel is available, as determined at decision step 2112, then the terminal will preferably be assigned that channel at step 2110. If a transition channel is not available, the terminal will preferably retry a fixed number of times starting from the measurements, before the call is determined to be unsuccessful at step 2136.

If, as determined at decision step 2106, the terminal is dual-mode, it will preferably scan both satellite and base station channels for signal strength and interference at step 2108. If interference levels are unacceptable as determined at decision step 2122, the terminal will preferably request a transition channel at step 2120. If a transition channel is available as determined at decision step 2132, then the terminal will preferably be assigned that channel at step 2134. If a transition channel is not available, the terminal will preferably retry a predetermined number of times, as determined at decision step 2130, starting from the measurements, before the call is determined to be unsuccessful at step 2136. If interference is acceptable, the terminal will preferably request the system (i.e., satellite or base station) with the dominant signal, as determined at decision step 2140. If the terminal requests a satellite channel at step 2138, and one is available as determined at decision step 2142, then the terminal will preferably be assigned that channel at step 2144. If a satellite channel is not available, the terminal will preferably retry a fixed number of times starting from the measurements, as determined at decision step 2130, before the call is determined to be unsuccessful at step 2136. If the terminal requests a base station channel at step 2148, and one is available as determined at decision step 2146, then the terminal will preferably be assigned that channel at step 2150. If a base station channel is not available, the terminal will preferably retry a fixed number of times starting from the measurements, as determined at decision step 2130, before the call is determined to be unsuccessful at step 2136. It should be obvious to those skilled in the art that many variations of the FIG. 21 are available that would accomplish the call initialization objective. For example, the specific sequence of steps may be altered or re-ordered, such that the overall functionality is substantially the same or similar. For example, the determination whether the user is in dual-mode may be juxtaposed after measuring satellite and base station channels.

Figure 23:
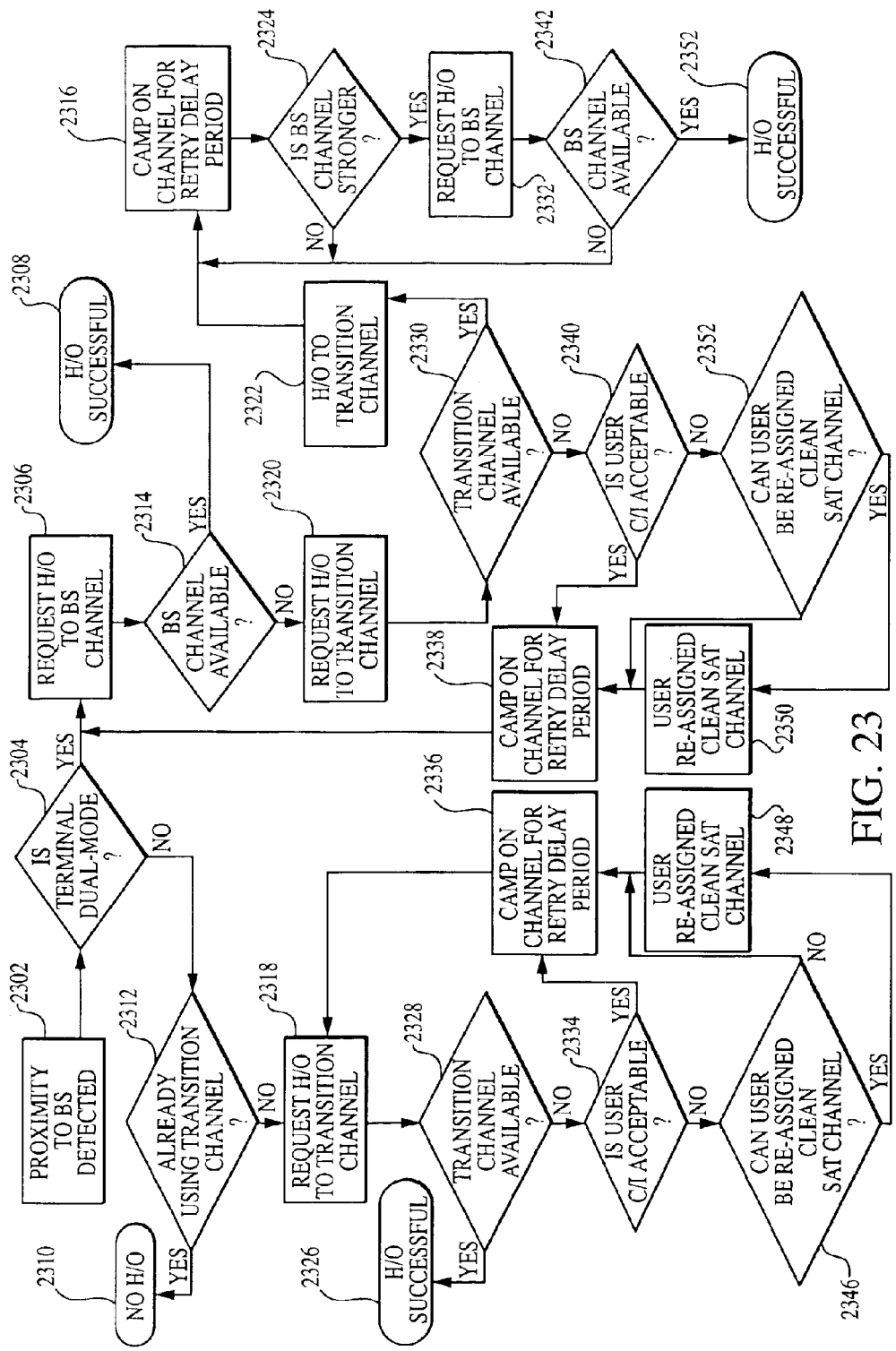
FIG. 23 shows an exemplary method of satellite to base-station proximity-initiated hand-off.

FIG. 23 shows an exemplary method of satellite to base-station proximity-initiated hand-off. As shown in FIG. 23, as a user terminal approaches a base station at step 2302, it will preferably alert the network of its proximity. If, as determined at decision step 2304, the terminal is single-mode, then one of two things can generally happen. If, for example, the single-mode terminal is being served by a transition channel, as determined at decision step 2312, then hand-off is not required 2310. If, for example, the single-mode terminal is being served by a satellite channel, then a request to hand-off to a transition channel is preferably made at step 2318. If a transition channel is available as determined at decision step 2318, then the hand-off procedure preferably takes place at step 2326. If a transition channel is not available, then the terminal preferably checks if its current interference level is acceptable at decision step 2334. If interference is acceptable, then the terminal preferably camps on the satellite at step 2336, preferably for a pre-specified period of time before another request to hand-off to a transition channel is made. If interference is not acceptable, the terminal preferably determines if another satellite channel is available for use at decision step 2346. If not, then the terminal preferably camps on the channel at step 2336. If so, the terminal is preferably re-assigned to a new satellite channel at step 2348, which it camps on at step 2336, preferably for a pre-specified period of time before another request to hand-off to a transition channel is made at step 2318.

If the terminal is dual-mode, then a request to hand-off to a base station channel is preferably made at step 2306. If, as determined at decision step 2314, a base station channel is available, then the hand-off procedure preferably takes place at step 2308. If a base station channel is not available, then a request to hand-off to a transition channel is preferably made at step 2320. If, as determined at decision step 2330, a transition channel is not available, then the terminal preferably checks, at decision step 2340, if its current interference level is acceptable. If interference is acceptable, then the terminal preferably camps on the channel at step 2338, preferably for a pre-specified period of time before another request to hand-off to a base station channel is made at step 2306. If interference is not acceptable, the terminal preferably determines at decision step 2352, if another satellite channel is available for use. If not, then the terminal preferably camps on the satellite at step 2338. If so, the terminal is preferably re-assigned to a new satellite channel at step 2350, which it preferably camps on for a pre-specified period of time at step 2338 before another request to hand-off to a base station channel is made at step 2306.

If the first attempt to hand-off to a transition channel was successful, then the terminal preferably camps on this channel at step 2316, preferably for a pre-specified period of time before comparing the signal levels of the transition channel and base station at decision step 2324. If the base station is not stronger by a pre-specified margin, then the terminal preferably camps on the transition channel at step 2316, preferably until the base station channel becomes the stronger channel. If the base station is stronger by a pre-specified margin, then a request to hand-off to a base station channel is preferably made at step 2332. If, as determined at decision step 2342, a base station channel is available, then the hand-off procedure preferably takes place at step 2356. If a base station channel is not available, then the terminal preferably camps on the transition channel at step 2316, preferably for a pre-specified period of time before comparing the signal levels of the transition channel and base station again. It should be obvious to those skilled in the art that many variations of the FIG. 23 are available that would accomplish the satellite to base station hand-off objective. For example, the specific sequence of steps may be altered or re-ordered, such that the overall functionality is substantially the same or similar.

Figure 24:
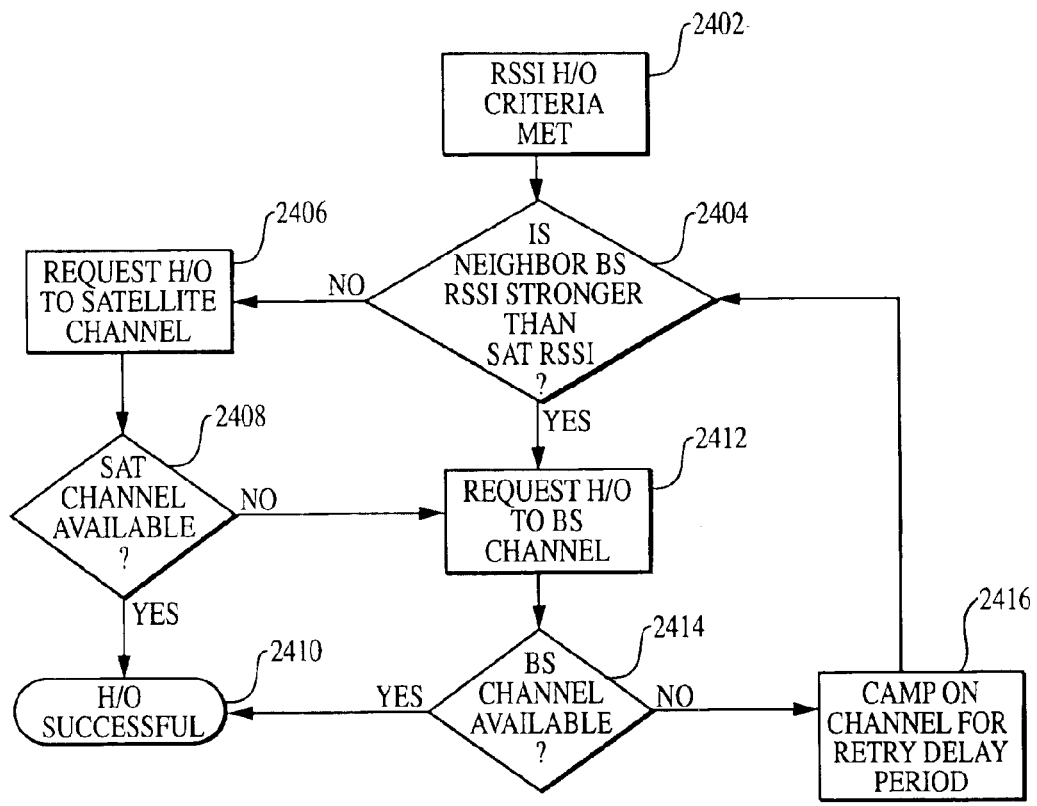
FIG. 24 shows an exemplary method of base station-to-satellite and base station-to-base station proximity-initiated hand-off.

FIG. 24 shows an exemplary method of base station-to-satellite and base station-to-base station proximity-initiated hand-off. As shown in FIG. 24 at step 2402, as a dual-mode terminal moves away from the base station it is served by, it will eventually take appropriate measures upon sensing a stronger channel, either from the satellite, another base station, or a system or device associated therewith. If, as determined at decision step 2404, a satellite channel is stronger than a neighboring base station channel, then a request to hand-off to a satellite channel is preferably made at step 2406. If, as determined at decision step 2408, a satellite channel is available, then the hand-off procedure preferably takes place at step 2410. If a satellite channel is not available or if a neighboring base station channel is stronger than a satellite channel, then a request to hand-off to a base station channel is preferably made at step 2406. If, as determined at decision step 2414, a base station channel is available, then the hand-off procedure preferably takes place at step 2410. If a base station channel is not available, then the terminal preferably camps on its current channel at step 2416, preferably for a pre-specified period of time before making measurement comparisons again at decision step 2404. It should be obvious to those skilled in the art that many variations of FIG. 24 are available that would accomplish the base station-to-satellite and base station-to-base station hand-off objectives. For example, the specific sequence of steps may be altered or re-ordered, such that the overall functionality is substantially the same or similar.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. While the foregoing invention has been described in detail by way of illustration and example of preferred embodiments, numerous modifications, substitutions, and alterations are possible without departing from the scope of the invention defined in the following claims.

Having thus described our invention, what we claim as new and desire to secure by Letters Patent is as follows:

1. A method of at least one of assigning and reusing frequencies between one or more communication systems, comprising the steps of:

configuring a first satellite spot beam having a first set of frequencies associated therewith and comprising a first substantially central portion and a first plurality of subareas, each of the first plurality of subareas extending substantially from a periphery of the first substantially central portion to substantially near a circumference of the first satellite spot beam;

configuring a second satellite spot beam having a second set of frequencies associated therewith and comprising a second substantially central portion and a second plurality of subareas, each of the second plurality of subareas extending substantially from a periphery of the second central portion to substantially near a circumference of the second satellite spot beam;

configuring at least one terrestrial cell that at least partially overlaps the first satellite spot beam having a third set of frequencies associated therewith; and at least one of assigning, reusing and borrowing, by the terrestrial system, at least one of a portion of the second set of frequencies and a portion of the first set of frequencies used in the first central portion, responsive to predetermined criteria associated with the third set of frequencies, including at least one of assigning, reusing and borrowing at least one of the second set of frequencies when the second set of frequencies are at least substantially geographically distant from the first satellite spot beam.

2. The method of claim 1 wherein the first plurality of subareas are substantially equal sized cells having a first size and the second plurality of subareas are substantially equal sized cells having a second size.

3. The method of claim 2 wherein the first size and the second size are approximately equal.

4. The method of claim 1 wherein the second set of frequencies are substantially distant from the first satellite spot beam when they are at least one of assigned, reused and borrowed for use in those first plurality of subareas not sharing a common boundary with the second satellite spot beam.

5. The method of claim 1 wherein the first set of frequencies used in the first central portion comprise at least one of those frequency sets respectively associated with satellite spot beams directly adjacent to the first satellite spot beam.

6. The method of claim 1 wherein said step of assigning, reusing and borrowing is based on prioritization rules.

7. The method of claim 6 wherein the prioritization rules include dynamic load and capacity constraints of cells that frequencies are taken from.

8. The method of claim 1 wherein a subscriber terminal positioned within the first central portion can be assigned, reuse and/or borrow use any of the respective set of frequencies associated with the at least one second satellite spot beam.

9. The method of claim 1 wherein a subscriber terminal positioned within the first central portion can be assigned, reuse and/or borrow use any of the respective set of frequencies associated with any spot beams adjacent the first satellite spot beam.

10. The method of claim 1 wherein a subscriber terminal positioned within a subarea of the first spot beam not sharing at least a portion of a common boundary with the second satellite spot beam can be assigned, reuse and/or borrow any of the second set of frequencies associated with the second satellite spot beam.

11. The method of claim 1 wherein the predetermined criteria is at least one of load balancing, maintaining a reserve of frequencies, and received signal strength interference.

12. The method of claim 1 further comprising the steps of:
configuring a second terrestrial cell that at least partially overlaps the second satellite spot beam having a fourth set of frequencies associated therewith; and
at least one of assigning, reusing and borrowing, by the second terrestrial cell, at least one of the first set of frequencies and the frequencies used in the second central portion, responsive to predetermined criteria associated with the fourth set of frequencies, including at least one of assigning, reusing and borrowing at least one of the first set of frequencies when the first set of frequencies are at least substantially geographically distant from the second satellite spot beam.

13. The method of claim 1 wherein the first central portion and the second central portion comprise approximately twenty five percent of the area covered by the first satellite spot beam and the second satellite spot beam, respectively.

14. The method of claim 1 wherein the first set of frequencies and the second set of frequencies comprise a plurality of paired uplink and downlink frequencies.

15. The method of claim 14 wherein a downlink frequency of a frequency set is used in a first subarea of the first spot beam, and wherein a corresponding one of the uplink frequencies is reused in a second subarea of the first spot beam.

16. The method of claim 1 wherein the area of coverage of a spot beam comprises an area having a radius substantially equal to a distance from a center of the spot beam having a substantially maximum signal strength to a distance from the center of the spot beam where the signal strength of the spot beam is attenuated by approximately 3 dB.

17. The method of claim 1 wherein an area of coverage of at least one of a spot beam and a terrestrial cell comprises an area corresponding to a bit error rate in the range of at least one of $10^{-2}$ to $10^{-3}$ for voice and $10^{-5}$ to $10^{-6}$ for data.

18. The method of claim 1 wherein the number of subareas is equal to a number of spot beams comprising a cluster minus one.

19. A method of making a telephone call using a satellite-terrestrial communications system that at least one of assigns and reuses frequencies between a first satellite spot beam and a second satellite spot beam, comprising the steps of:
a first user using a subscriber terminal to dial a telephone number within an area of a first terrestrial cell associated with a first satellite spot beam having a first set of frequencies associated therewith, the first satellite spot beam comprising a first substantially central portion and a first plurality of subareas, each of the first plurality of subareas extending substantially from a periphery of the first substantially central portion to substantially near a circumference of the first satellite spot beam;
determining because of at least one of unavailability of the first set of frequencies or weak signal strength that a connection cannot be established, using the first set of frequencies, with a communications device having the dialed telephone number associated therewith;
configuring a second satellite spot beam having a second set of frequencies associated therewith; and
establishing a connection between the subscriber terminal and the communications device by at least one of assigning, reusing and borrowing, by the first spot beam, at least one of the second set of frequencies, responsive to predetermined criteria including at least one of assigning, reusing and borrowing at least one of the second set of frequencies when the mobile terminal is substantially geographically distant from the second satellite spot beam.

20. A method of at least one of assigning and reusing frequencies, comprising the steps of:
configuring a first communications area having a first set of frequencies associated therewith and comprising a first substantially central portion and a first plurality of subareas, each of the first plurality of subareas extending substantially from a periphery of the first substantially central portion to substantially near a circumference of the first communications area;
configuring a second communications area having a second set of frequencies associated therewith and comprising a second substantially central portion and a second plurality of subareas, each of the second plurality of subareas extending substantially from a periphery of the central portion to substantially near a circumference of the second communications area;
configuring at least one third communications area that at least partially overlaps the first communications area, having a third set of frequencies associated therewith; and
at least one of assigning, reusing and borrowing, by the third communications area, at least one of a portion of the second set of frequencies and a portion of the first set of frequencies used in the first central portion, responsive to predetermined criteria associated with the third set of frequencies, including at least one of assigning, reusing and borrowing at least one of the second set of frequencies when the second set of frequencies are at least substantially geographically distant from the first satellite spot beam.

21. The method of claim 20 wherein the first plurality of subareas are substantially equal sized cells having a first size and the second plurality of subareas are substantially equal sized cells having a second size.

22. The method of claim 21 wherein the first size and the second size are approximately equal.

23. The method of claim 20 wherein the second set of frequencies are substantially distant from the second communications area when they are at least one of assigned, reused and borrowed for use in those first plurality of subareas not sharing a common boundary with the second communications area.

24. The method of claim 20 wherein the first set of frequencies used in the first central portion comprise at least one of those frequency sets respectively associated with communication areas external to and directly adjacent to the first communications area.

25. The method of claim 20 wherein said step of assigning, reusing and borrowing is based on prioritization rules.

26. The method of claim 25 wherein the prioritization rules include dynamic load and capacity constraints of candidate cells that frequencies are being taken from.

27. The method of claim 20 wherein a user positioned within the first central portion can be assigned, reuse and/or borrow use any of the respective set of frequencies associated with the at least one second satellite spot beam.

28. The method of claim 20 wherein a user positioned within the first central portion can be assigned, reuse and/or borrow use any of the respective set of frequencies associated with any communication areas adjacent the first satellite spot beam.

29. The method of claim 20 wherein a user positioned within a subarea not sharing at least a portion of a common boundary with the second communications area can be assigned, reuse and/or borrow any of the second set of frequencies associated with the second communications area.

30. The method of claim 20 wherein the predetermined criteria is at least one of load balancing, maintaining a reserve of frequencies, and received signal strength interference.

31. The method of claim 20 further comprising the steps of:
    configuring a fourth communications area within the second communications area having a fourth set of frequencies associated therewith; and
    at least one of assigning, reusing and borrowing, by the fourth communications area, at least one of the first set of frequencies and the frequencies used in the second central portion, responsive to predetermined criteria associated with the fourth set of frequencies, including at least one of assigning, reusing and borrowing at least one of the first set of frequencies when the first set of frequencies are at least substantially geographically distant from the second communications area.

32. The method of claim 20 wherein the first central portion and the second central portion comprise approximately twenty five percent of the area covered by the first communications area and the second communications area, respectively.

33. The method of claim 20 wherein the first and second set of frequencies comprise a plurality of paired uplink and downlink frequencies, wherein a downlink frequency of a frequency set is used in a first subarea of the first communications area, and wherein a corresponding one of the uplink frequencies is reused in a second subarea of the first communications area.

34. The method of claim 20 wherein the area of coverage of a communications area comprises an area having a radius substantially equal to a distance from a center of the communications area having a substantially maximum signal strength to a distance from the center of the communications area where the signal strength of the communications area is attenuated by approximately 3 dB.

35. The method of claim 20 wherein an area of coverage of at least one of a spot beam and a terrestrial cell comprises an area corresponding to a bit error rate in the range of at least one of $10^{-2}$ to $10^{-3}$ for voice and $10^{-5}$ to $10^{-6}$ for data.

36. A method of at least one of assigning and reusing frequencies between one or more communication systems, comprising the steps of:
    configuring a first satellite spot beam having a first set of frequencies associated therewith and comprising a first substantially central portion and a first plurality of subareas, each of the first plurality of subareas extending substantially from a periphery of the first substantially central portion to substantially near a circumference of the first satellite spot beam;
    configuring a second satellite spot beam having a second set of frequencies associated therewith and comprising a second substantially central portion and a second plurality of subareas, each of the second plurality of subareas extending substantially from a periphery of the central portion to substantially near a circumference of the second satellite spot beam;
    configuring at least one terrestrial cell that at least partially overlaps the first satellite spot beam having a third set of frequencies associated therewith; and
    at least one of assigning, reusing and borrowing, by the second satellite spot beam, at least one of a portion of the third set of frequencies responsive to predetermined criteria, including at least one of assigning, reusing and borrowing at least one of the third set of frequencies associated with the at least one terrestrial cell when the terrestrial cell is at least substantially geographically distant from the second set of frequencies.

37. A method of at least one of assigning and reusing frequencies between one or more communication systems, comprising the steps of:
    configuring a first satellite spot beam having a first set of frequencies associated therewith and comprising a first substantially central portion and a first plurality of subareas, each of the first plurality of subareas extending substantially from a periphery of the first substantially central portion to substantially near a circumference of the first satellite spot beam;
    configuring a second satellite spot beam having a second set of frequencies associated therewith;
    configuring at least one terrestrial cell that at least partially overlaps the first satellite spot beam having a third set of frequencies associated therewith; and
    at least one of assigning, reusing and borrowing, by the terrestrial cell, at least one of a portion of the second set of frequencies and a portion of the first set of frequencies used in the first central portion, responsive to predetermined criteria associated with the third set of frequencies, including at least one of assigning, reusing and borrowing at least one of the second set of frequencies when the second set of frequencies are at least substantially geographically distant from the terrestrial cell.

38. The method of claim 37 wherein the first plurality of subareas are substantially equal sized.

39. The method of claim 37 wherein the second set of frequencies are substantially distant from the first satellite spot beam when they are at least one of assigned, reused and borrowed for use in those first plurality of subareas not sharing a common boundary with the second satellite spot beam.

40. The method of claim 37 wherein the first set of frequencies used in the first central portion comprise at least one of those frequency sets respectively associated with one or more satellite spot beams directly adjacent to the first satellite spot beam.

41. The method of claim 37 wherein said step of assigning, reusing and borrowing is based on prioritization rules.

42. The method of claim 41 wherein the prioritization rules include dynamic load and capacity constraints of candidate cells that frequencies are being taken from.

43. The method of claim 37 wherein a user positioned within the first central portion can be assigned, reuse and/or borrow use any of the respective set of frequencies associated with the second satellite spot beam.

44. The method of claim 37 wherein a subscriber terminal positioned within the first central portion can be assigned, reuse and/or borrow use any of the respective set of frequencies associated with any spot beams adjacent the first satellite spot beam.

45. The method of claim 37 wherein a subscriber terminal positioned within a subarea of the first spot beam not sharing at least a portion of a common boundary with the second satellite spot beam can be assigned, reuse and/or borrow any of the second set of frequencies associated with the second satellite spot beam.

46. The method of claim 37 wherein the predetermined criteria is at least one of load balancing, maintaining a reserve of frequencies, and received signal strength interference.

47. The method of claim 37 further comprising the steps of:
  configuring a second terrestrial cell that at least partially overlaps the second satellite spot beam having a fourth set of frequencies associated therewith; and
  at least one of assigning, reusing and borrowing, by the second terrestrial cell, at least one of the first set of frequencies and the frequencies used in the second central portion, responsive to predetermined criteria associated with the fourth set of frequencies, including at least one of assigning, reusing and borrowing at least one of the first set of frequencies when the first set of frequencies are at least substantially geographically distant from the second terrestrial cell.

48. The method of claim 37 wherein the first central portion comprises approximately twenty five percent of the area covered by the first satellite spot beam.

49. The method of claim 37 wherein the first and second set of frequencies comprise a plurality of paired uplink and downlink frequencies, wherein a downlink frequency of a frequency set is used in a first subarea of the first spot beam, and wherein a corresponding one of the uplink frequencies is reused in a second subarea of the first spot beam.

50. The method of claim 37 wherein the area of coverage of a spot beam comprises an area having a radius substantially equal to a distance from a center of the spot beam having a substantially maximum signal strength to a distance from the center of the spot beam where the signal strength of the spot beam is attenuated by approximately 3 dB.

51. The method of claim 37 wherein an area of coverage of at least one of a spot beam and a terrestrial cell comprises an area corresponding to a bit error rate in the range of at least one of $10^{-2}$ to $10^{-3}$ for voice and $10^{-5}$ to $10^{-6}$ for data.

52. A method of at least one of assigning and reusing frequencies between one or more communication systems, comprising the steps of:
  configuring a first satellite spot beam having a first set of frequencies associated therewith and comprising a first plurality of subareas, each of the first plurality of subareas extending from a substantially center area of the first satellite spot beam to substantially near a circumference of the first satellite spot beam in a fan-like manner thereby forming the first plurality of subareas;
  configuring a second satellite spot beam having a second set of frequencies associated therewith;
  configuring at least one terrestrial cell that at least partially overlaps the first satellite spot beam having a third set of frequencies associated therewith; and
  at least one of assigning, reusing and borrowing, by the at least one terrestrial cell, at least one of a portion of the second set of frequencies and a portion of the first set of frequencies used in the first central portion, responsive to predetermined criteria associated with the third set of frequencies for communication therewith, including at least one of assigning, reusing and borrowing at least one of the second set of frequencies when the second set of frequencies are at least substantially geographically distant from the first spot beam.

53. The method of claim 52 wherein the first plurality of subareas are substantially equal sized.

54. The method of claim 52 wherein the second set of frequencies are substantially distant from the second satellite spot beam when they are at least one of assigned, reused and borrowed for use in those first plurality of subareas not sharing a common boundary with the second satellite spot beam.

55. The method of claim 52 wherein the first set of frequencies used in the first central portion comprise those frequency sets respectively associated with at least one of the satellite spot beams directly adjacent to the first satellite spot beam.

56. The method of claim 52 wherein said step of assigning, reusing and borrowing is based on prioritization rules.

57. The method of claim 56 wherein the prioritization rules include dynamic load and capacity constraints of candidate cells that frequencies are being taken from.

58. The method of claim 56 wherein the prioritization rules further include at least one of signal strength and quality of service.

59. The method of claim 52 wherein a user positioned within the first central portion can be assigned, reuse and/or borrow use any of the respective set of frequencies associated with the second satellite spot beam.

60. The method of claim 52 wherein a user positioned within the first central portion can be assigned, reuse and/or borrow use any of the respective set of frequencies associated with any spot beams adjacent the first satellite spot beam.

61. The method of claim 52 wherein a user positioned within a subarea not sharing at least a portion of a common boundary with the second satellite spot beam can be assigned, reuse and/or borrow any of the second set of frequencies associated with the second satellite spot beam.

62. The method of claim 52 wherein the predetermined criteria comprise at least one of load balancing, maintaining a reserve of frequencies, and received signal strength interference.

63. The method of claim 52 further comprising the steps of:

configuring a terrestrial cell that at least partially overlaps the second satellite spot beam having a fourth set of frequencies associated therewith; and at least one of assigning, reusing and borrowing, by the terrestrial cell, at least one of the first set of frequencies and the frequencies used in the second central portion, responsive to predetermined criteria associated with the fourth set of frequencies, including at least one of assigning, reusing and borrowing at least one of the first set of frequencies when the first set of frequencies are at least substantially geographically distant from the terrestrial cell.

64. The method of claim 52 wherein the first and second set of frequencies comprise a plurality of paired uplink and downlink frequencies.

65. The method of claim 64 wherein a downlink frequency of a frequency set is used in a first subarea of the first spot beam, and wherein a corresponding one of the uplink frequencies is used in a second subarea of the first spot beam.

66. The method of claim 52 wherein the area of coverage of a spot beam comprises an area having a radius substantially equal to a distance from a center of the spot beam having a substantially maximum signal strength to a distance from the center of the spot beam where the signal strength of the spot beam is attenuated by approximately 3 dB.

67. The method of claim 52 wherein an area of coverage of at least one of a spot beam and a terrestrial cell comprises an area corresponding to a bit error rate in the range of $10^{-2}$ to $10^{-3}$ for voice and $10^{-5}$ to $10^{-6}$ for data.

68. A system for at least one of assigning and reusing frequencies between one or more communication systems, comprising:

at least one satellite capable of configuring: a) a first spot beam having a first set of frequencies associated therewith, the first spot beam comprising a first substantially central portion and a first plurality of subareas, each of the first plurality of subareas extending substantially from a periphery of the first substantially central portion to substantially near a circumference of the first satellite spot beam, and b) a second satellite spot beam having a second set of frequencies associated therewith, the second spot beam comprising a second substantially central portion and a second plurality of subareas, each of the second plurality of subareas extending substantially from a periphery of the second central portion to substantially near a circumference of the second satellite spot beam;

a terrestrial base station positioned within the first satellite spot beam for configuring a terrestrial cell having at least partially overlapping coverage with the first spot beam, the terrestrial cell having a third set of frequencies associated therewith and an area coverage at least partially overlapping with an area of coverage associated with the first spot beam;

a first subscriber terminal positioned within the terrestrial base station area of coverage; and a network operations center (NOC) for at least one of assigning, reusing and borrowing, by the terrestrial base station and for use by said first subscriber terminal in communicating with at least one of a second subscriber terminal and other communications device, at least one of a portion of the second set of frequencies and a portion of the first set of frequencies used in the first central portion, responsive to predetermined criteria associated with the third set of frequencies, including at least one of assigning, reusing and borrowing at least one of the second set of frequencies when the second set of frequencies are at least substantially geographically distant from the second satellite spot beam.

69. The system of claim 68 wherein the first plurality of subareas are substantially equal sized and having a first size, and the second plurality of subareas are substantially and having a second size.

70. The system of claim 69 wherein the first size and the second size are approximately equal.

71. The system of claim 68 wherein the second set of frequencies are substantially distant from the second satellite spot beam when they are at least one of assigned, reused and borrowed for use by subscriber terminals positioned in those first plurality of subareas not sharing a common boundary with the second satellite spot beam.

72. The system of claim 68 wherein the first set of frequencies used by subscriber terminals positioned in the first central portion comprise at least one of those frequency sets respectively associated with one or more satellite spot beams directly adjacent to the first satellite spot beam.

73. The system of claim 68 wherein at least one of assigning, reusing and borrowing is based on prioritization rules.

74. The system of claim 73 wherein the prioritization rules include dynamic load and capacity constraints of cells that frequencies are taken from.

75. The system of claim 68 wherein a subscriber terminal positioned within the first central portion can be assigned, reuse and/or borrow any of the respective set of frequencies associated with the at least one second satellite spot beam.

76. The system of claim 68 wherein a subscriber terminal positioned within the first central portion can be assigned, reuse and/or borrow use any of the respective set of frequencies associated with any spot beam directly adjacent the first satellite spot beam.

77. The system of claim 68 wherein a subscriber terminal positioned within a subarea of the first spot beam not sharing at least a portion of a common boundary with the second satellite spot beam can be assigned, reuse and/or borrow any of the second set of frequencies associated with the second satellite spot beam.

78. The system of claim 68 wherein the predetermined criteria is at least one of load balancing, maintaining a reserve of frequencies, and received signal strength interference.

79. The system of claim 68 further comprising:

a second terrestrial base station positioned within the second satellite spot beam and having at least partially overlapping coverage with the first spot beam, for configuring at least one terrestrial cell therein, wherein the terrestrial cell has a fourth set of frequencies associated therewith; and at least one of assigning, reusing and borrowing, by said second terrestrial base station, at least one of the first set of frequencies and the frequencies used in the second central portion, responsive to predetermined criteria associated with the fourth set of frequencies for establishing communication between the second subscriber unit positioned within an area of coverage of said second base station and at least one of the first subscriber terminal and other communications device, including at least one of assigning, reusing and borrowing at least one of the first set of frequencies when the first set of frequencies are at least substantially geographically distant from the second satellite spot beam.

80. The system of claim 68 wherein the first central portion and the second central portion comprise approximately twenty five percent of the area covered by the first satellite spot beam and the second satellite spot beam, respectively.

81. The system of claim 68 wherein the first and second set of frequencies comprise a plurality of paired uplink and downlink frequencies.

82. The system of claim 81 wherein a downlink frequency of a frequency set is used in a first subarea of the first spot beam, and wherein a corresponding one of the uplink frequencies is reused in a second subarea of the first spot beam.

83. The system of claim 68 wherein the area of coverage of a spot beam comprises an area having a radius substantially equal to a distance from a center of the spot beam having a substantially maximum signal strength to a distance from the center of the spot beam where the signal strength of the spot beam is attenuated by approximately 3 dB.

84. The system of claim 68 wherein an area of coverage of at least one of a spot beam and a terrestrial cell comprises an area corresponding to a bit error rate in the range of $10^{-2}$ to $10^{-3}$ for voice and $10^{-5}$ to $10^{-6}$ for data.

85. The system of claim 68 wherein the number of subareas is equal to a number of spot beams comprising a cluster minus one.

86. A system for making a telephone call using a satellite-terrestrial communications system that at least one of assigns and reuses frequencies between a first satellite spot beam and a second satellite spot beam, comprising:
   a subscriber terminal for dialing a telephone number to communicate with at least a second communications device;
   a first terrestrial cell having said subscriber terminal positioned therein;
   at least one satellite for configuring: a) a first satellite spot beam associated with said first terrestrial cell and having a first set of frequencies associated therewith, the first satellite spot beam comprising a first substantially central portion and a first plurality of subareas, each of the first plurality of subareas extending substantially from a periphery of the first substantially central portion to substantially near a circumference of the first satellite spot beam, and b) a second satellite spot beam having the second communications device positioned therein and a second set of frequencies associated therewith; and
   a network operations controller that establishes a connection between the subscriber terminal and at least the second communications device, by at least one of assigning, reusing and borrowing, by the first spot beam, at least one of the second set of frequencies, responsive to predetermined criteria including at least one of assigning, reusing and borrowing at least one of the second set of frequencies when the subscriber terminal is substantially geographically distant from the second satellite spot beam.

87. A system for use in at least one of assigning and reusing frequencies, comprising:
   at least a first satellite for: a) configuring a first communications area having a first set of frequencies associated therewith, the communications area comprising a first substantially central portion and a first plurality of subareas, each of the first plurality of subareas extending substantially from a periphery of the first substantially central portion to substantially near a circumference of the first communications area, and for b) configuring a second communications area having a second set of frequencies associated therewith and comprising a second substantially central portion and a second plurality of subareas, each of the second plurality of subareas extending substantially from a periphery of the central portion to substantially near a circumference of the second communications area;
   a terrestrial base station positioned within the first communications area and having at least partially overlapping coverage with the first communications area, that configures at least a third communications area within the first communications area, the third communications area having a third set of frequencies associated therewith; and
   a network operations controller that at least one of assigns, reuses and borrows, by said terrestrial base station, at least one of a portion of the second set of frequencies and a portion of the first set of frequencies used in the first central portion for facilitating communications between a subscriber terminal positioned within the first communications area and a second communications device, and responsive to predetermined criteria associated with the third set of frequencies, including at least one of assigning, reusing and borrowing at least one of the second set of frequencies when the second set of frequencies are at least substantially geographically distant from the first satellite spot beam.

88. The system of claim 87 wherein the first plurality of subareas are substantially equal sized and having a first size and the second plurality of subareas are substantially equal sized and having a second size.

89. The system of claim 88 wherein the first size and the second size are approximately equal.

90. The system of claim 87 wherein the second set of frequencies are substantially distant from the second communications area when they are at least one of assigned, reused and borrowed for use in those first plurality of subareas not sharing a common boundary with the second communications area.

91. The system of claim 87 wherein the first set of frequencies used in the first central portion comprise those frequency sets respectively associated with communication areas external to and directly adjacent to the first communications area.

92. The system of claim 87 wherein the assigning, reusing and borrowing is based on prioritization rules.

93. The system of claim 92 wherein the prioritization rules comprise dynamic load and capacity constraints of candidate cells that frequencies are being taken from.

94. The system of claim 87 wherein a user positioned within the first central portion can be assigned, reuse and/or borrow use any of the respective set of frequencies associated with the second communications area.

95. The system of claim 87 wherein when the subscriber terminal is positioned within the first central portion it can be assigned, reuse and/or borrow any of the respective set of frequencies associated with any communication areas adjacent the first communications area.

96. The system of claim 87 wherein when the subscriber terminal is positioned within a subarea of the first communications area not sharing at least a portion of a common boundary with the second communications area it can be assigned, reuse and/or borrow any of the second set of frequencies associated with the second communications area.

97. The system of claim 87 wherein the predetermined criteria is at least one of load balancing, maintaining a reserve of frequencies, and received signal strength interference.

98. The system of claim 87, further comprising:
a second terrestrial base station positioned within the second communications area and having at least partially overlapping coverage with the second communications area, wherein the second communications area comprises at least one terrestrial cell within the second communications area, and wherein said second terrestrial base station has a fourth set of frequencies associated therewith; and
at least one of assigning, reusing and borrowing, by said second terrestrial base station, at least one of the first set of frequencies and the frequencies used in the second central portion, responsive to predetermined criteria associated with the fourth set of frequencies, for establishing communication between a second subscriber unit positioned within an area covered by said second terrestrial base station and at least one of the first subscriber unit and the second communication device, including at least one of assigning, reusing and borrowing at least one of the first set of frequencies when the first set of frequencies are at least substantially geographically distant from the second terrestrial base station.

99. The system of claim 87 wherein the first central portion and the second central portion comprise approximately twenty five percent of the area covered by the first communications area and the second communications area, respectively.

100. The system of claim 87 wherein the first and second set of frequencies comprise a plurality of paired uplink and downlink frequencies, wherein a downlink frequency of a frequency set is used in a first subarea of the first communications area, and wherein a corresponding one of the uplink frequencies is reused in a second subarea of the first communications area.

101. The system of claim 87 wherein the area of coverage of a communications area comprises an area having a radius substantially equal to a distance from a center of the communications area having a substantially maximum signal strength to a distance from the center of the communications area where the signal strength of the communications area is attenuated by approximately 3 dB.

102. The system of claim 87 wherein an area of coverage of at least one of a spot beam and a terrestrial cell comprises an area corresponding to a bit error rate in the range of $10^{-2}$ to $10^{-3}$ for voice and $10^{-5}$ to $10^{-6}$ for data.

103. A system for at least one of assigning and reusing frequencies between a plurality of communication systems, comprising:
at least one satellite capable of: a) configuring a first satellite spot beam having a first set of frequencies associated therewith and comprising a first substantially central portion and a first plurality of subareas, each of the first plurality of subareas extending substantially from a periphery of the first substantially central portion to substantially near a circumference of the first satellite spot beam, and b) configuring a second satellite spot beam having a second set of frequencies associated therewith and comprising a second substantially central portion and a second plurality of subareas, each of the second plurality of subareas extending substantially from a periphery of the central portion to substantially near a circumference of the second satellite spot beam;
a terrestrial base station positioned within the first satellite spot beam and having at least partially overlapping coverage with the first spot beam, for configuring at least one terrestrial cell within the first satellite spot beam having a third set of frequencies associated therewith and having an area of coverage at least partially overlapping with the first satellite spot beam; and
a network operations controller for at least one of assigning, reusing and borrowing, by the second satellite spot beam, at least one of a portion of the third set of frequencies responsive to predetermined criteria, including at least one of assigning, reusing and borrowing at least one of the third set of frequencies associated with the at least one terrestrial cell when the portion is at least substantially geographically distant from the second set of frequencies.

104. A system of at least one of assigning and reusing frequencies between a plurality of communication systems, comprising:
a first satellite capable of: a) configuring a first satellite spot beam having a first set of frequencies associated therewith and comprising a first substantially central portion and a first plurality of subareas, each of the first plurality of subareas extending substantially from a periphery of the first substantially central portion to substantially near a circumference of the first satellite spot beam, and b) configuring a second satellite spot beam having a second set of frequencies associated therewith;
a terrestrial base station positioned within the first satellite spot beam and having at least partially overlapping coverage with the first spot beam, for configuring at least one terrestrial cell within the first satellite spot beam, the terrestrial cell having a third set of frequencies associated therewith and having an area of coverage at least partially overlapping with an area of coverage of the first satellite spot beam; and
a network operations controller for at least one of assigning, reusing and borrowing, by the terrestrial base station for use in establishing communications between a first subscriber terminal positioned within an area of coverage of said terrestrial base station and at least one of a second subscriber terminal and communications device, at least one of a portion of the second set of frequencies and a portion of the first set of frequencies used in the first central portion, responsive to predetermined criteria associated with the third set of frequencies, including at least one of assigning, reusing and borrowing at least one of the second set of frequencies when the second set of frequencies are at least substantially geographically distant from the first satellite spot beam.

105. The system of claim 104 wherein the first plurality of subareas are substantially equal sized.

106. The system of claim 104 wherein the second set of frequencies are substantially distant from the second satellite spot beam when they are at least one of assigned, reused and borrowed for use in those first plurality of subareas not sharing a common boundary with the second satellite spot beam.

107. The system of claim 104 wherein the first set of frequencies used in the first central portion comprise those frequency sets respectively associated with satellite spot beams directly adjacent to the first satellite spot beam.

108. The system of claim 104 wherein the assigning, reusing and borrowing is based on prioritization rules.

109. The system of claim 108 wherein the prioritization rules include dynamic load and capacity constraints of candidate cells that frequencies are being taken from.

110. The system of claim 104 wherein a subscriber terminal positioned within the first central portion can be assigned, reuse and/or borrow any of the respective set of frequencies associated with the second satellite spot beam.

111. The system of claim 104 wherein a subscriber terminal positioned within the first central portion can be assigned, reuse and/or borrow any of the respective set of frequencies associated with any spot beams adjacent the first satellite spot beam.

112. The system of claim 104 wherein a subscriber terminal positioned within a subarea not sharing at least a portion of a common boundary with the second satellite spot beam can be assigned, reuse and/or borrow any of the second set of frequencies associated with the second satellite spot beam.

113. The system of claim 104 wherein the predetermined criteria is at least one of load balancing, maintaining a reserve of frequencies, and received signal strength interference.

114. The system of claim 104 further comprising:
a second terrestrial base station positioned within the second satellite spot beam and having at least partially overlapping coverage with the second spot beam, wherein the second satellite spot beam further comprises at least one terrestrial cell having a fourth set of frequencies associated therewith, wherein said network operations controller facilitates at least one of assigning, reusing and borrowing, by said second terrestrial base station for use with a second subscriber terminal positioned within an area covered by said second terrestrial base station, at least one of the first set of frequencies and the frequencies used in the second central portion, responsive to predetermined criteria associated with the fourth set of frequencies for establishing communication between the second subscriber terminal and at least one of the first subscriber terminal and communications device, including at least one of assigning, reusing and borrowing at least one of the first set of frequencies when the first set of frequencies are at least substantially geographically distant from the second satellite spot beam.

115. The system of claim 104 wherein the first central portion comprises approximately twenty five percent of the area covered by the first satellite spot beam.

116. The system of claim 104 wherein the first and second set of frequencies comprise a plurality of paired uplink and downlink frequencies, wherein a downlink frequency of a frequency set is used in a first subarea of the first spot beam, and wherein a corresponding one of the uplink frequencies is reused in a second subarea of the first spot beam.

117. The system of claim 104 wherein an area of coverage of at least one of a spot beam and a terrestrial cell comprises an area corresponding to a bit error rate in the range of $10^{-2}$ to $10^{-3}$ for voice and $10^{-5}$ to $10^{-6}$ for data.

118. The system of claim 104 wherein the area of coverage of a spot beam comprises an area having a radius substantially equal to a distance from a center of the spot beam having a substantially maximum signal strength to a distance from the center of the spot beam where the signal strength of the spot beam is attenuated by approximately 3 dB.

119. A system of at least one of assigning and reusing frequencies between a plurality of communication systems, comprising:

a first satellite capable of: a) configuring a first satellite spot beam having a first set of frequencies associated therewith and comprising a first plurality of subareas, each of the first plurality of subareas extending from a substantially center area of the first satellite spot beam to substantially near a circumference of the first satellite spot beam in a fan-like manner thereby forming the first plurality of subareas, and b) configuring a second satellite spot beam having a second set of frequencies associated therewith;

a terrestrial base station positioned within the first satellite spot beam and having at least partially overlapping coverage with the first spot beam, for configuring a terrestrial cell, the terrestrial cell having a third set of frequencies associated therewith and having an area of coverage at least partially overlapping with an area of coverage associated with the first spot beam; and a network controller for at least one of assigning, reusing and borrowing, by said terrestrial base station and for use by a first subscriber terminal in communicating with at least one of a second subscriber terminal or communications device, at least one of a portion of the second set of frequencies and a portion of the first set of frequencies used in the first central portion, responsive to predetermined criteria associated with the third set of frequencies, including at least one of assigning, reusing and borrowing at least one of the second set of frequencies when the second set of frequencies are at least substantially geographically distant from the first satellite spot beam.

120. The system of claim 119 wherein the first plurality of subareas are substantially equal sized.

121. The system of claim 119 wherein the second set of frequencies are substantially distant from the second satellite spot beam when they are at least one of assigned, reused and borrowed for use in those first plurality of subareas not sharing a common boundary with the second satellite spot beam.

122. The system of claim 119 wherein the assigning, reusing and borrowing is based on prioritization rules.

123. The system of claim 122 wherein the prioritization rules include dynamic load and capacity constraints of candidate cells that frequencies are being taken from.

124. The system of claim 119 wherein a subscriber terminal positioned within a subarea not sharing at least a portion of a common boundary with the second satellite spot beam can be assigned, reuse and/or borrow any of the second set of frequencies associated with the second satellite spot beam.

125. The system of claim 119 wherein the predetermined criteria is at least one of load balancing, maintaining a reserve of frequencies, and received signal strength interference.

126. The system of claim 119 further comprising:
a second terrestrial base station positioned within the second satellite spot beam and having at least partially overlapping coverage with the second spot beam, and associated with a terrestrial cell having a fourth set of frequencies associated therewith; and
at least one of assigning, reusing and borrowing, by said second terrestrial base station, at least one of the first set of frequencies and the frequencies used in spot beams adjacent to the second spot beam, responsive to predetermined criteria associated with the fourth set of frequencies, for establishing communication between a second subscriber terminal positioned within the area of coverage of said second terrestrial base station and at least one of a subscriber terminal and communications device, including at least one of assigning, reusing and borrowing at least one of the first set of frequencies when the first set of frequencies are at least substantially geographically distant from the second satellite spot beam.

127. The system of claim 119 wherein the first and second frequencies comprise a plurality of paired uplink and downlink frequencies, wherein one of the frequency sets is used in a first subarea of the first spot beam, and wherein a corresponding one of the uplink frequencies is reused in a second subarea of the first spot beam.

128. The system of claim 119 wherein an area of coverage of at least one of a spot beam and a terrestrial cell comprises an area corresponding to a bit error rate in the range of $10^{-2}$ to $10^{-3}$ for voice and $10^{-5}$ to $10^{-6}$ for data.

129. The system of claim 119 wherein the area of coverage of a spot beam comprises an area having a radius substantially equal to a distance from a center of the spot beam having a substantially maximum signal strength to a distance from the center of the spot beam where the signal strength of the spot beam is attenuated by approximately 3 dB.

130. A system for at least one of assigning and reusing frequencies between one or more communication systems, comprising:
   means for configuring: a) a first spot beam having a first set of frequencies associated therewith, the first spot beam comprising a first substantially central portion and a first plurality of subareas, each of the first plurality of subareas extending substantially from a periphery of the first substantially central portion to substantially near a circumference of the first satellite spot beam, and b) a second satellite spot beam having a second set of frequencies associated therewith, the second spot beam comprising a second substantially central portion and a second plurality of subareas, each of the second plurality of subareas extending substantially from a periphery of the second central portion to substantially near a circumference of the second satellite spot beam;
   means positioned within the first satellite spot beam for configuring a terrestrial cell having at least partially overlapping coverage with the first spot beam, the terrestrial cell having a third set of frequencies associated therewith and an area coverage at least partially overlapping with an area of coverage associated with the first spot beam;
   a first subscriber terminal positioned within the terrestrial base station area of coverage; and
   means for at least one of assigning, reusing and borrowing, by the terrestrial base station and for use by said first subscriber terminal in communicating with at least one of a second subscriber terminal and other communications device, at least one of a portion of the second set of frequencies and a portion of the first set of frequencies used in the first central portion, responsive to predetermined criteria associated with the third set of frequencies, including at least one of assigning, reusing and borrowing at least one of the second set of frequencies when the second set of frequencies are at least substantially geographically distant from the second satellite spot beam.

131. A system for making a telephone call using a satellite-terrestrial communications system that at least one of assigns and reuses frequencies between a first satellite spot beam and a second satellite spot beam, comprising:
   a subscriber terminal for dialing a telephone number to communicate with at least a second communications device;
   a first terrestrial cell having said subscriber terminal positioned therein;
   means for configuring: a) a first satellite spot beam associated with said first terrestrial cell, having a first set of frequencies associated therewith, and having at least partially overlapping coverage with the first terrestrial cell, the first satellite spot beam comprising a first substantially central portion and a first plurality of subareas, each of the first plurality of subareas extending substantially from a periphery of the first substantially central portion to substantially near a circumference of said first satellite spot beam, and b) a second satellite spot beam having the second communications device positioned therein and a second set of frequencies associated therewith; and
   means for establishing a connection between said subscriber terminal and at least the second communications device, by at least one of assigning, reusing and borrowing, by the first spot beam, at least one of the second set of frequencies, responsive to predetermined criteria including at least one of assigning, reusing and borrowing at least one of the second set of frequencies when the subscriber terminal is substantially geographically distant from the second satellite spot beam.

132. A system for use in at least one of assigning and reusing frequencies, comprising:
   means for configuring: a) a first communications area having a first set of frequencies associated therewith, the communications area comprising a first substantially central portion and a first plurality of subareas, each of the first plurality of subareas extending substantially from a periphery of the first substantially central portion to substantially near a circumference of the first communications area, and b) a second communications area having a second set of frequencies associated therewith and comprising a second substantially central portion and a second plurality of subareas, each of the second plurality of subareas extending substantially from a periphery of the central portion to substantially near a circumference of the second communications area;
   means positioned within the first satellite spot beam for configuring at least a third communications area within the first communications area, the third communications area having a third set of frequencies associated therewith and having at least partially overlapping coverage with the first spot beam; and
   means for at least one of assigning, reusing and borrowing, by said terrestrial base station, at least one of a portion of the second set of frequencies and a portion of the first set of frequencies used in the first central portion for facilitating communications between a subscriber terminal positioned within the first spot beam and a second communications device, and responsive to predetermined criteria associated with the third set of frequencies, including at least one of assigning, reusing and borrowing at least one of the second set of frequencies when the second set of frequencies are at least substantially geographically distant from the first satellite spot beam.

133. A system for at least one of assigning and reusing frequencies between a plurality of communication systems, comprising:

means for: a) configuring a first satellite spot beam having a first set of frequencies associated therewith and comprising a first substantially central portion and a first plurality of subareas, each of the first plurality of subareas extending substantially from a periphery of the first substantially central portion to substantially near a circumference of the first satellite spot beam, and b) configuring a second satellite spot beam having a second set of frequencies associated therewith and comprising a second substantially central portion and a second plurality of subareas, each of the second plurality of subareas extending substantially from a periphery of the central portion to substantially near a circumference of the second satellite spot beam;

means positioned within the first satellite spot beam for configuring at least one terrestrial cell within the first satellite spot beam having a third set of frequencies associated therewith and having an area of coverage at least partially overlapping with the first satellite spot beam; and means for at least one of assigning, reusing and borrowing, by the second satellite spot beam, at least one of a portion of the third set of frequencies responsive to predetermined criteria, including at least one of assigning, reusing and borrowing at least one of the third set of frequencies associated with the at least one terrestrial cell when the portion is at least substantially geographically distant from the second set of frequencies.

134. A system of at least one of assigning and reusing frequencies between a plurality of communication systems, comprising:

means for: a) configuring a first satellite spot beam having a first set of frequencies associated therewith and comprising a first substantially central portion and a first plurality of subareas, each of the first plurality of subareas extending substantially from a periphery of the first substantially central portion to substantially near a circumference of the first satellite spot beam, and b) configuring a second satellite spot beam having a second set of frequencies associated therewith;

means positioned within the first satellite spot beam for configuring at least one terrestrial cell within the first satellite spot beam, the terrestrial cell having a third set of frequencies associated therewith and having an area of coverage at least partially overlapping with an area of coverage of the first satellite spot beam; and means for at least one of assigning, reusing and borrowing, by the terrestrial base station for use in establishing communications between a first subscriber terminal positioned within an area of coverage of said terrestrial base station and at least one of a second subscriber terminal and communications device, at least one of a portion of the second set of frequencies and a portion of the first set of frequencies used in the first central portion, responsive to predetermined criteria associated with the third set of frequencies, including at least one of assigning, reusing and borrowing at least one of the second set of frequencies when the second set of frequencies are at least substantially geographically distant from the first satellite spot beam.

135. A system of at least one of assigning and reusing frequencies between a plurality of communication systems, comprising:

means for: a) configuring a first satellite spot beam having a first set of frequencies associated therewith and comprising a first plurality of subareas, each of the first plurality of subareas extending from a substantially center area of the first satellite spot beam to substantially near a circumference of the first satellite spot beam in a fan-like manner thereby forming the first plurality of subareas, and b) configuring a second satellite spot beam having a second set of frequencies associated therewith;

means positioned within the first satellite spot beam for configuring a terrestrial cell, the terrestrial cell having a third set of frequencies associated therewith and having an area of coverage at least partially overlapping with an area of coverage associated with the first spot beam; and means for at least one of assigning, reusing and borrowing, by said terrestrial base station and for use by a first subscriber terminal in communicating with at least one of a second subscriber terminal or communications device, at least one of a portion of the second set of frequencies and a portion of the first set of frequencies used in the first central portion, responsive to predetermined criteria associated with the third set of frequencies, including at least one of assigning, reusing and borrowing at least one of the second set of frequencies when the second set of frequencies are at least substantially geographically distant from the first satellite spot beam.

136. A method of at least one of assigning and reusing frequencies between one or more communication systems, comprising the steps of:

configuring a first satellite spot beam having a first set of frequencies associated therewith and comprising a first substantially central portion;

configuring a second satellite spot beam having a second set of frequencies associated therewith and comprising a second substantially central portion configuring at least one terrestrial cell within the first satellite spot beam having a third set of frequencies associated therewith and having at least partially overlapping coverage with the first spot beam; and at least one of assigning, reusing and borrowing, by the terrestrial system, at least one of a portion of the second set of frequencies and a portion of the first set of frequencies used in the first central portion, responsive to predetermined criteria associated with the third set of frequencies, including at least one of assigning, reusing and borrowing at least one of the second set of frequencies when the second set of frequencies are at least substantially geographically distant from the first satellite spot beam.

137. The method of claim 136 wherein the second set of frequencies are substantially distant from the first satellite spot beam when they are used in subareas of the second spot beam that do not share a common boundary with the first satellite spot beam.

138. The system of claim 137 wherein an area of coverage of at least one of a spot beam and a terrestrial cell comprises an area corresponding to a bit error rate in the range of $10^{-2}$ to $10^{-3}$ for voice and $10^{-5}$ to $10^{-6}$ for data.

139. The method of claim 136 wherein the first set of frequencies used in the first central portion comprise at least one of those frequency sets respectively associated with satellite spot beams directly adjacent to the first satellite spot beam.

140. The method of claim 136 wherein said step of assigning, reusing and borrowing is based on prioritization rules.

141. The method of claim 140 wherein the prioritization rules include dynamic load and capacity constraints of cells that frequencies are taken from.

142. The method of claim 136 wherein a subscriber terminal positioned within the first central portion can be assigned, reuse and/or borrow use any of the respective set of frequencies associated with the at least one second satellite spot beam.

143. The method of claim 136 wherein a subscriber terminal positioned within the first central portion can be assigned, reuse and/or borrow use any of the respective set of frequencies associated with any spot beams adjacent the first satellite spot beam.

144. The method of claim 136 wherein the predetermined criteria is at least one of load balancing, maintaining a reserve of frequencies, and received signal strength interference.

145. The method of claim 136 further comprising the steps of:
  configuring a second terrestrial cell within the second satellite spot beam having a fourth set of frequencies associated therewith and having at least partially overlapping coverage with the second spot beam; and
  at least one of assigning, reusing and borrowing, by the second terrestrial cell, at least one of the first set of frequencies and the frequencies used in the second central portion, responsive to predetermined criteria associated with the fourth set of frequencies, including at least one of assigning, reusing and borrowing at least one of the first set of frequencies when the first set of frequencies are at least substantially geographically distant from the second satellite spot beam.

146. The method of claim 136 wherein the first central portion and the second central portion comprise approximately twenty five percent of the area covered by the first satellite spot beam and the second satellite spot beam, respectively.

147. The method of claim 136 wherein the first set of frequencies and the second set of frequencies comprise a plurality of paired uplink and downlink frequencies, wherein a downlink frequency of a frequency set is used in the first spot beam, and wherein a corresponding one of the uplink frequencies is reused in the second spot beam.

148. The method of claim 136 wherein the area of coverage of a spot beam comprises an area having a radius substantially equal to a distance from a center of the spot beam having a substantially maximum signal strength to a distance from the center of the spot beam where the signal strength of the spot beam is attenuated by approximately 3 dB.

149. A method of making a telephone call using a satellite-terrestrial communications system that at least one of assigns and reuses frequencies between a first satellite spot beam and a second satellite spot beam, comprising the steps of:
  a first user using a subscriber terminal to dial a telephone number within an area of a first terrestrial cell associated with a first satellite spot beam having a first set of frequencies associated therewith, the first satellite spot beam comprising a first substantially central portion;
  determining because of at least one of unavailability of the first set of frequencies or weak signal strength that a connection cannot be established, using the first set of frequencies, with a communications device having the dialed telephone number associated therewith;
  configuring a second satellite spot beam having a second set of frequencies associated therewith and having at least partially overlapping coverage with the second spot beam; and
  establishing a connection between the subscriber terminal and the communications device by at least one of assigning, reusing and borrowing, by the first spot beam, at least one of the second set of frequencies, responsive to predetermined criteria including at least one of assigning, reusing and borrowing at least one of the second set of frequencies when the mobile terminal is substantially geographically distant from the second satellite spot beam.

* * * * *